(12) United States Patent
Ribble et al.

(10) Patent No.: US 6,435,116 B2
(45) Date of Patent: Aug. 20, 2002

(54) PROCESS FOR MANUFACTURING SHIRTS WITH RAGLAN SLEEVES

(75) Inventors: Brendon Frank Ribble, Menasha; Joseph Richard Alberts, Greenville; Michael Joseph Nelson, Neenah, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/875,584

(22) Filed: Jun. 6, 2001

Related U.S. Application Data

(60) Provisional application No. 60/210,127, filed on Jun. 7, 2000.

(51) Int. Cl.[7] ............................ D05B 25/00; D05B 9/00; D05B 37/08
(52) U.S. Cl. .................. 112/475.06; 112/475.09
(58) Field of Search ................. 112/475.06, 475.04, 112/475.05, 475.07, 475.09, 121, 3, 304; 2/111, 114

(56) References Cited

U.S. PATENT DOCUMENTS

| | | |
|---|---|---|
| 3,230,546 A | 1/1966 | Sabee |
| 3,338,992 A | 8/1967 | Kinney |

(List continued on next page.)

FOREIGN PATENT DOCUMENTS

| | | |
|---|---|---|
| FR | 1545871 | 11/1968 |
| JP | 903081 | 7/1949 |

OTHER PUBLICATIONS

American Society for Testing Materials (ASTM) Designation: D 1175–80, "Standard Text Methods for Abrasion Resistence of Textile Fabrics (Oscillatory Cylinder and Uniform Abrasion Methods)," 13 pages, published May 1980. Discontinued in 1982 and replaced by D 4157–92 and D 4158–92.

American Society for Testing Materials (ASTM) Designation: D 4157–92, "Standard Test Method for Abrasion Resistance of Textile Fabrics (Oscillatory Cylinder Method)," pp. 351–354, published Aug. 1992.

(List continued on next page.)

*Primary Examiner*—Ismael Izaguirre
(74) *Attorney, Agent, or Firm*—Patricia A. Charlier

(57) ABSTRACT

The present invention provides a continuous process for the manufacture of a garment. A web of fabric including opposing web side edges wherein one of the opposing web side edges is proximate the garment bottom edge of the garment is provided. The web of fabric is cut, thereby forming a fabric web wherein the fabric web includes one of the opposing web side edges opposed to an octagonal shape pattern defining pairs of shoulder side edges having a side edge located between the shoulder side edges of each pair of the shoulder side edges and edges located between the pairs of shoulder side edges. The side edges of the fabric web are cut, thereby forming edges defining neck openings in the fabric web. The fabric web is cut, thereby defining discrete garment-sized pieces wherein each of the discrete garment-sized pieces of the fabric web includes at least one neck opening, a front panel having a pair of opposing garment side edges, a garment end portion, and a bottom edge.

56 Claims, 15 Drawing Sheets

U.S. PATENT DOCUMENTS

| | | | |
|---|---|---|---|
| 3,341,394 A | | 9/1967 | Kinney |
| 3,502,763 A | | 3/1970 | Hartmann |
| 3,542,615 A | | 11/1970 | Dobo et al. |
| 3,692,618 A | | 9/1972 | Dorschner et al. |
| 3,699,591 A | * | 10/1972 | Breitkopf et al. |
| 3,802,817 A | | 4/1974 | Matsuki et al. |
| 3,849,241 A | | 11/1974 | Butin et al. |
| 3,873,999 A | * | 4/1975 | Artzt |
| 4,011,599 A | | 3/1977 | Chaney et al. |
| 4,041,203 A | | 8/1977 | Brock et al. |
| 4,089,279 A | * | 5/1978 | Hess et al. ................. 112/304 |
| 4,176,408 A | | 12/1979 | de Polo |
| 4,340,563 A | | 7/1982 | Appel et al. |
| 4,510,626 A | | 4/1985 | Bowditch |
| 4,628,545 A | | 12/1986 | Metzler |
| 4,685,407 A | | 8/1987 | Jünemann |
| 4,821,658 A | | 4/1989 | Hiramatsu et al. |
| 4,870,918 A | | 10/1989 | Hiramatsu et al. |
| 4,875,240 A | | 10/1989 | Barrett |
| 4,931,115 A | | 6/1990 | Pajunen |
| 4,938,753 A | | 7/1990 | Van Gompel et al. |
| 4,957,054 A | | 9/1990 | Sakuma et al. |
| 5,060,588 A | | 10/1991 | Sadlack et al. |
| 5,145,727 A | | 9/1992 | Potts et al. |
| 5,169,706 A | | 12/1992 | Collier, IV et al. |
| 5,178,931 A | | 1/1993 | Perkins et al. |
| 5,188,885 A | | 2/1993 | Timmons et al. |
| 5,349,913 A | | 9/1994 | Schramayr et al. |
| 5,390,614 A | | 2/1995 | Adamski, Jr. et al. |
| 5,505,149 A | | 4/1996 | Schramayr et al. |
| 5,513,590 A | | 5/1996 | Allison et al. |
| 5,555,835 A | | 9/1996 | Compolucci |
| 5,611,095 A | | 3/1997 | Schneider |
| 5,621,917 A | | 4/1997 | Howsden |
| 5,628,264 A | * | 5/1997 | Adamski, Jr. et al. .. 112/475.04 |
| 5,642,681 A | | 7/1997 | Adamski, Jr. et al. |
| 5,680,653 A | | 10/1997 | Mathis et al. |
| 5,724,674 A | | 3/1998 | Covington et al. |
| 5,795,433 A | * | 8/1998 | Niedermeyer .......... 112/475.06 |
| 5,907,872 A | | 6/1999 | Alberts et al. |
| 6,098,557 A | * | 8/2000 | Couillard et al. ...... 112/475.06 |
| 6,240,561 C1 | | 6/2001 | Mc Ginnis |

OTHER PUBLICATIONS

American Society for Testing Materials (ASTM) Designation: D 4158–92, "Standard Test Method for Abrasion Resistance of Textile Fabrics (Uniform Abrasion Method)," pp. 355–360, published Aug. 1992.

American Society for Testing Materials (ASTM) Designation: D 1682–64 (Reapproved 1975), "Standard Test Methods for Breaking Load and Elongation of Textile Fabrics," pp. 454–459, published Oct. 1964.

American Society for Testing Materials (ASTM) Designation: D 1776–98, "Standard Practice for Conditioning and Testing Textiles," pp. 432–435, published Feb. 1999.

TAPPI Official Test Method T 402 om–93, "Standard Conditioning and Testing Atmospheres For Paper, Board, Pulp Handsheets, and Related Products," published by the TAPPI Press, Atlanta, Georgia, revised 1993, pp. 1–3.

* cited by examiner

PROCESS FOR MANUFACTURING SHIRTS WITH RAGLAN SLEEVES

This application claims priority from Provisional application Ser. No. 60/210,127, filed Jan. 7, 2000.

BACKGROUND OF THE INVENTION

This invention pertains to a continuous process for the manufacture of garments such as shirts intended for everyday wear, and more particularly to a process for the continuous manufacture of tee-shirt type garments.

Manufacturers are always looking for new, cost-effective, high-speed continuous processes for manufacturing inexpensive clothing, both disposable and reusable garments, for everyday use. In addition, consumers are interested in dress and active wear that is comfortable and relatively inexpensive.

Previous methods used in clothing manufacture require pieces of fabric, such as cloth or woven material, to be cut from a larger bolt of the fabric into specific patterns. The pieces are then sewn together in a multi-step cut and piece process for assembly into finished articles of clothing. Such cut and piece processes are labor and time intensive. The process speeds typically depend on the speed of the final sewing stages of the cut and piece process.

SUMMARY OF THE INVENTION

Thus, there is a need to provide an improved process for manufacturing garments, include washable and disposable garments. There is also a need to provide comfortable and inexpensive active wear garments. In addition, the garments need to be easy to put on and durable during wear. In response to these needs, an improved cost effective, high speed process for manufacturing shirts, tee-shirts, wraps, robes, gowns, jackets, coats, and the like has been discovered.

One embodiment of the present invention is a continuous process for the manufacture of a shirt-type garment to be worn about the upper body.

Numerous features and advantages of the present invention will appear from the following description. In the description, reference is made to the accompanying drawings which illustrate desired embodiments of the invention. Such embodiments do not represent the full scope of the invention. Reference should, therefore, be made to the claims herein for interpreting the full scope of the invention.

BRIEF DESCRIPTION OF THE DRAWINGS

The above-mentioned and other features of the present invention and the manner of attaining them will become more apparent, and the invention itself will be better understood by reference to the following description of the invention, taken in conjunction with the accompanying drawings, wherein.

DEFINITIONS

Figure 1:
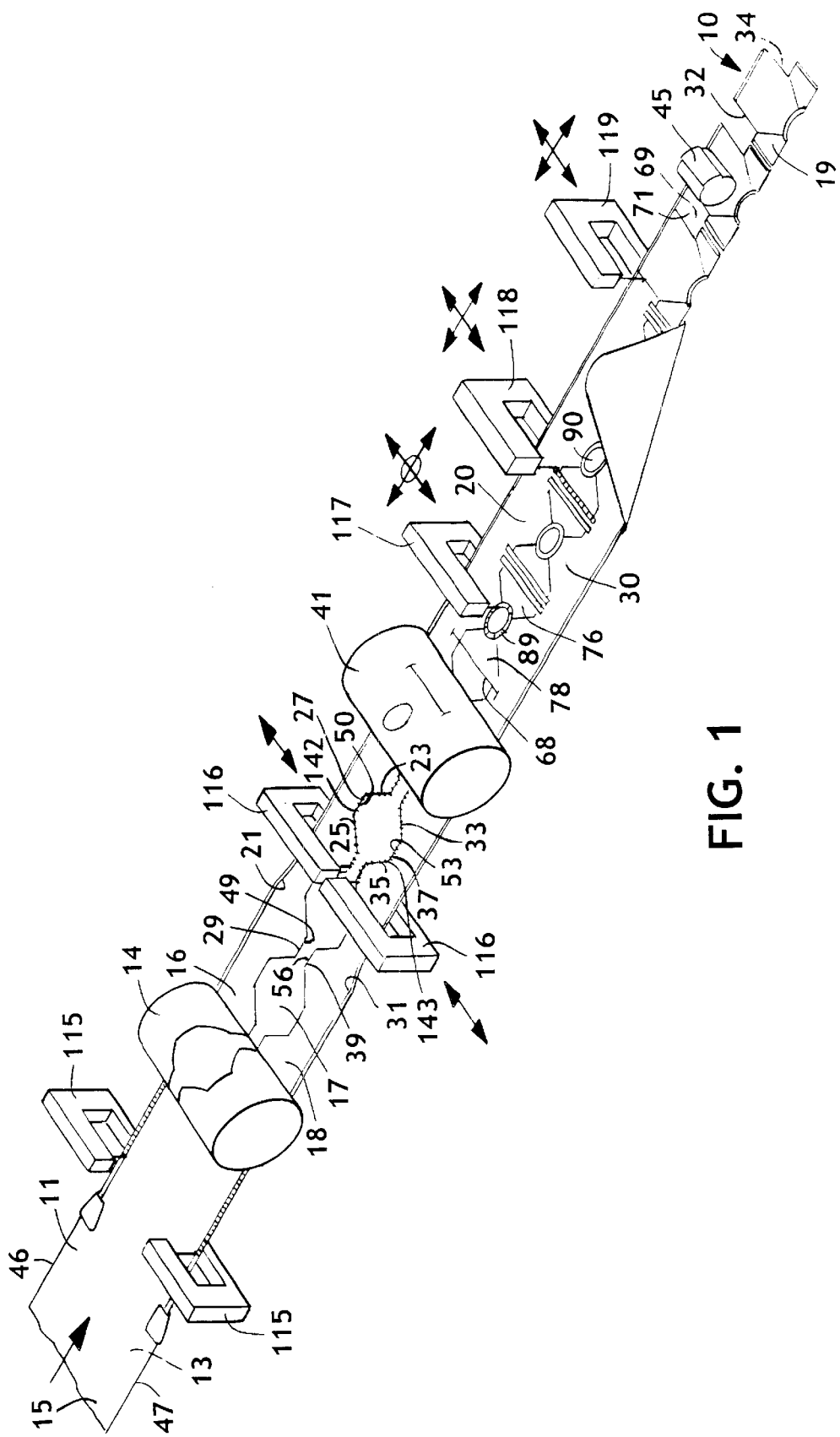
FIG. 1 is a diagram of one embodiment of the present invention.

Within the context of this specification, each term or phrase below will include the following meaning or meanings:

(a) "Bonded" refers to the joining, adhering, connecting, attaching, or the like, of two elements. Two elements will be considered to be bonded together when they are bonded directly to one another or indirectly to one another, such as when each is directly bonded to intermediate elements. The act of bonding, joining, adhering, connecting, attaching, or the like, of two elements is understood to include the two elements, such as edges, or regions adjacent the elements, such as edges.

(b) "Bonded carded fabric or web", "bonded carded web", and "bonded carded fabric" refer to fabric or webs made from staple fibers which are sent through a combing or carding unit, which breaks apart and aligns the staple fibers in the machine direction to form a generally machine direction-oriented fibrous nonwoven web. Such fibers are usually purchased in bales which are placed in a picker which separates the fibers prior to the carding unit. Once the web or fabric is formed, it is then bonded by one or more of several known bonding methods. Once such bonding method is powder bonding, wherein a powdered adhesive is distributed through the web or fabric and then activated, usually by heating the fabric and adhesive with hot air. Another suitable bonding method is pattern boding, wherein heated calendar rolls or ultrasonic bonding equipment are used to bond the fibers together, usually in a localized bond pattern, though the fabric may be bonded across its entire surface if so desired. Another suitable and well-known bonding method, particularly when using bi-component staple fibers, is through-air bonding.

(c) "Cross machine direction" means a direction generally perpendicular to the machine direction.

(d) "Disposable" includes being disposed of after use, and not intended to be washed and reused.

(e) "Disposed", "disposed on", "disposed with", "disposed at", "disposed near", and variations thereof are intended to mean that one element can be integral or unitary with another element, or that one element can be a separate structure joined to or connected to or placed with or placed near another element.

(f) "Elasticity" and "elastic" include that property of a material by virtue of which it tends to substantially recover to its original size and shape after removal of a force causing deformation of the material.

(g) "Elastically connected" and "elastically connecting" refer to two elements being separated by and bonded to an elastic member, where the relative position of the two elements may change due to extension of the elastic member.

(h) "Elongation" includes the ratio of the extension of a material to the length of a material prior to the extension. Elongation is expressed in percent.

(i) "Extension", "extend", and "extended" include the change in length of a material due to stretching. Extension is expressed in units of length.

(j) "Fabric" is used to refer to all of the woven, knitted, and nonwoven webs.

(k) "Flexible" refers to materials or fabrics that are compliant and readily conform to the general shape and contours of an individual's body.

(l) "Force" includes a physical influence exerted by one body on another which produces acceleration of bodies that are free to move and deformation of bodies that are not free to move. Force is expressed in grams-force.

(m) "Foreshortened" and "foreshortening" include to shorten beforehand, that is, before a subsequent step.

(n) "Front" and "back" are used to designate relationships relative to the garment itself, rather than to suggest any position the garment assumes when it is positioned on a wearer.

(o) "Gatherable" material is one which, when bonded to the reticular web with the latter under tension, will gather, with the formation of puckers or gathers, to accommodate contraction of the reticulated web upon release of the tensioning forces.

(p) "Machine direction" means the direction in which it is produced or the length of fabric moving in the direction of the machine operations.

(q) "Meltblown fibers" means fibers formed by extruding a molten thermoplastic material through a plurality of fine, usually circular, die capillaries as molten threads or filaments into converging high velocity, usually hot gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example in U.S. Pat. No. 3,849,241 to Butin, et al. Meltblown fibers are microfibers which may be continuous or discontinuous, are generally smaller than 10 microns in average diameter, and are generally tacky when deposited onto a collecting surface.

(r) "Member" when used in the singular can have the dual meaning of a single element or a plurality of elements.

(s) "Multi-layer laminate" means a laminate wherein some of the layers are spunbond and some are meltblown such as a spunbond/meltblown/spunbond (SMS) laminate and others as disclosed in U.S. Pat. No. 4,041,203 to Brock et al., U.S. Pat. No. 5,169,706 to Collier et al., U.S. Pat. No. 5,145,727 to Potts et al., U.S. Pat. No. 5,178,931 to Perkins, et al., and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 0.1 to 12 osy (6 to 400 gsm), or more particularly from about 0.75 to about 3 osy. Multi-layer laminates may also have various numbers of meltblown layers or multiple spunbond layers in many different configurations and may include other materials like films or coform materials.

(t) "Neckable material" means any material which can be necked.

(u) "Necked material" refers to any material which has been constricted in at least one dimension by processes such as, for example, drawing or gathering.

(v) "Non-elastic" or "inelastic" refers to any material that does not fall within the definition of "elastic".

(w) "Nonwoven fabric or web", "nonwoven web", and "nonwoven fabric" mean a web having a structure of individual fibers or threads which are interlaid, but not in an identifiable manner as in a knitted fabric. Nonwoven fabrics or webs have been formed from many processes such as, for example, meltblowing processes, spunbonding processes, and bonded carded web processes. The basis weight of nonwoven fabrics is usually expressed in ounces of material per square yard (osy) or grams per square meter (gsm) and the fiber diameters are usually expressed in microns.

(x) "Operatively joined" with reference to the attachment of an elastic member to another element means that the elastic member when attached to or connected to or treated with heat with the element gives that element elastic properties. With reference to the attachment of a non-elastic member to another element, it means that the member and element can be attached in any suitable manner that permits or allows them to perform the intended or described function of the joinder. The joining, attaching, connecting or the like can be either directly, such as joining either member directly to an element, or can be indirectly by means of another member or element disposed between the first member and the first element.

(y) "Pattern" includes any geometric or non-geometric form that can include, among others, a series of connected or unconnected lines or curves, a series of parallel or non-parallel or intersecting lines or curves, a series of linear or curvilinear lines, and the like, or any combinations thereof. The pattern can include a repeating form and/or non-repeating form.

(z) "Rupture" includes the breaking or tearing apart of a material. In tensile testing, rupture refers to the total separation of a material into two parts, either all at once or in stages, or the development of a hole in some materials.

(aa) "Stretch bonded" refers to an elastomeric strand being bonded to another member while the elastomeric strand is elongated at least about 25 percent of its relaxed length. Desirably, the term "stretch bonded" refers to the situation wherein the elastomeric strand is elongated at least about 50 percent, more desirably at least about 300 percent, of its relaxed length when it is bonded to the other member.

(bb) "Stretch bonded laminate" ("SBL") refers to a composite material having at least two layers in which one layer is a gatherable layer and the other layer is a stretchable, that is, elastic, layer. The layers are joined together when the stretchable layer is in a stretched condition so that upon relaxing the layers, the gatherable layer is gathered.

(cc) "Spunbonded fibers" refers to small diameter fibers which are formed by extruding molten thermoplastic material as filaments from a plurality of fine, usually circular capillaries or spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

(dd) "Tension" includes a uni-axial force tending to cause the extension of a body or the balancing force within that body resisting the extension.

(ee) "Two-dimensional" refers to a garment, such as a diaper, that can be opened and laid in a flat condition without destructively tearing any structure. This type of garment does not have continuous leg and waist openings when opened and laid flat, and requires a fastening device, such as adhesive tapes, to attach the garment about the wearer.

(ff) "Three-dimensional" refers to a finished garment similar to shorts or pants in that they have continuous leg and waist openings that are bounded by the material of which the garment is made. This type of garment can be opened and laid flat only by destructively tearing it. This type of garment may or may not have manually tearable seams.

(gg) "Ultimate elongation" includes the elongation at the point of rupture.

These definitions are not intended to be limiting and these terms may be defined with additional language in the remaining portion of the specification.

DETAILED DESCRIPTION

Figure 5:
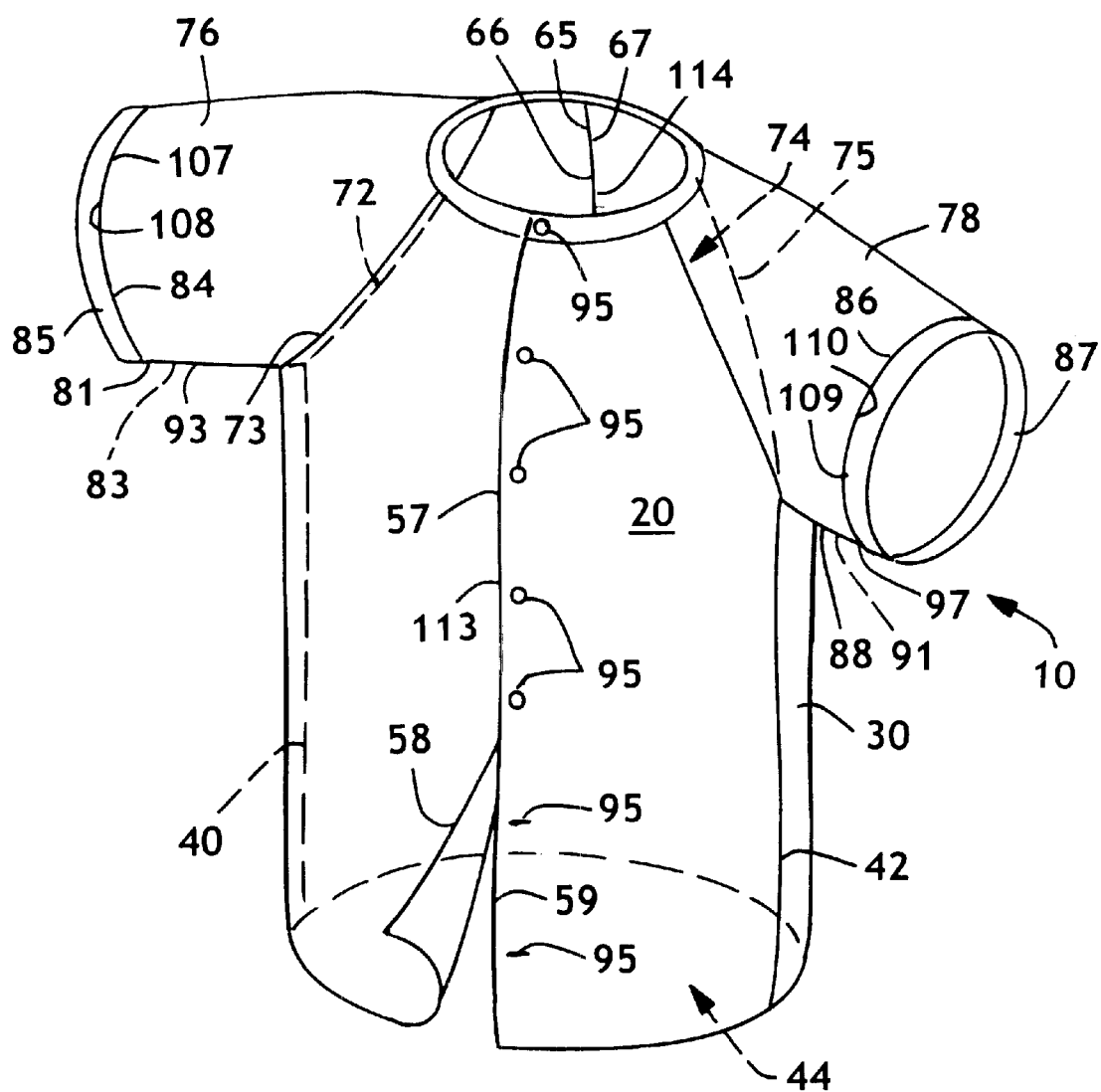
FIG. 5 is a perspective view of the front of a garment made by the present invention.
Figure 9:
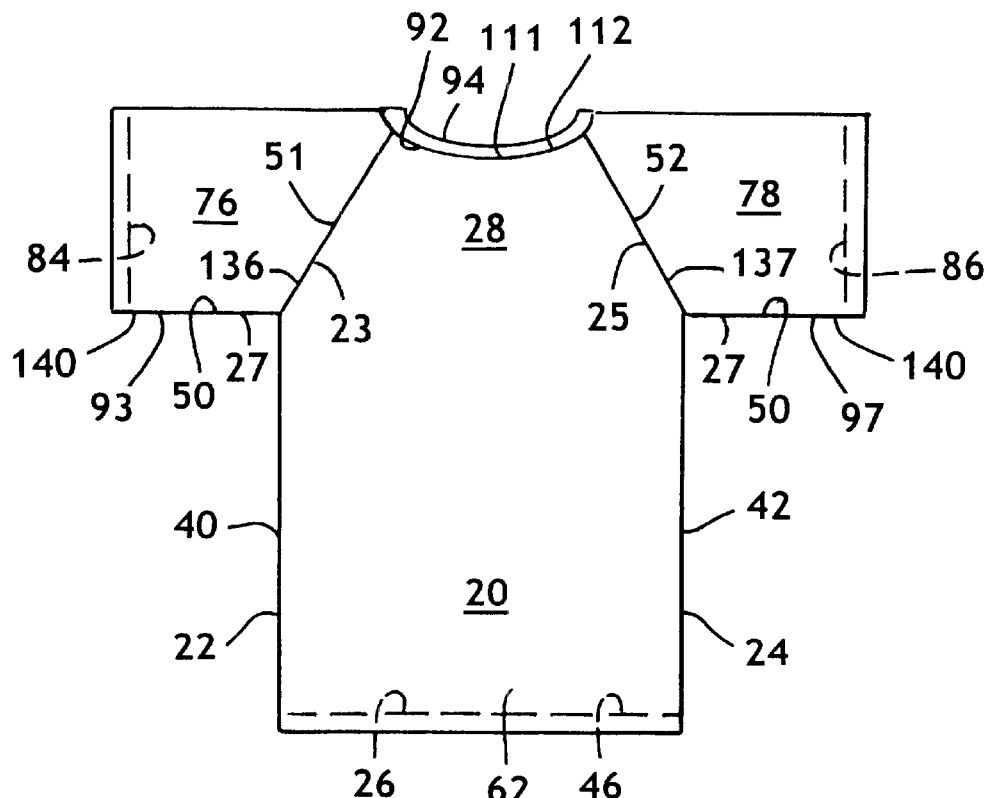
FIG. 9 is a front plan view of a garment made by the present invention in a post-assembled flat configuration.
Figure 10:
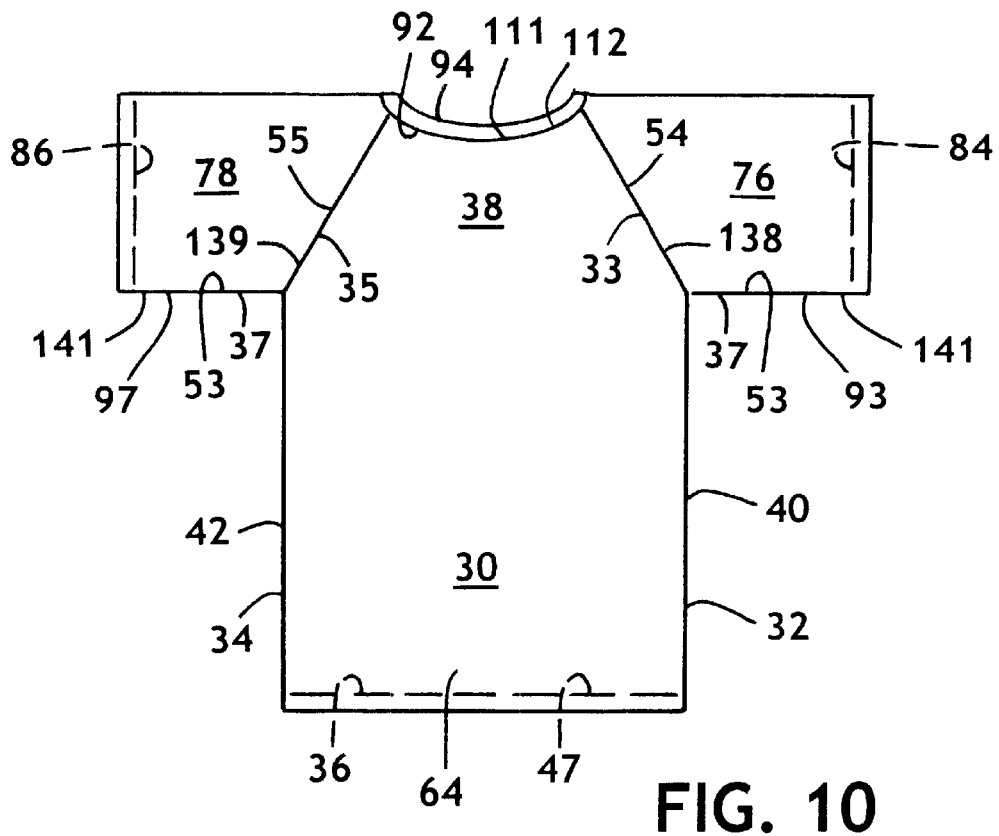
FIG. 10 is a back plan view of a garment made by the present invention in a post-assembled flat configuration.

The garment 10 is illustrated in FIGS. 5, 9, and 10. The garment 10 includes opposing inner and outer surfaces 11 and 13, respectively. Within this application, the term "garment" is understood to mean shirt, tee-shirt, wrap, robe, gown, jacket, coat, or any type of upper body covering garment having variable lengths of the garment 10 itself and the sleeves (if any) as well as a variety of neck openings and garment openings, such as plackets.

According to the preferred embodiment, see FIG. 5, the garment 10 desirably comprises a front panel 20 and a back panel 30. The front panel 20 has a pair of garment side edges 22 and 24, a garment bottom edge 26, a pair of shoulder side edges 23 and 25, and a shoulder region 28 positioned between the shoulder side edges 23 and 25. The back panel 30 has a pair of garment side edges 32 and 34, a garment bottom edge 36, a pair of shoulder side edges 33 and 35, and a shoulder region 38 positioned between the shoulder side edges 33 and 35.

The garment side edge 22 is joined to the garment side edge 32 to form the garment side seam 40. The garment side edge 24 is joined to the garment side edge 34 to form the garment side seam 42.

The finished garment 10 may include arm coverings or sleeves 76 and 78 of which may be attached at to the shoulder side edges 23, 33, 25, and 35, so as to surround, at least partially, the arm openings 72 and 74, respectively, of the garment 10. In some embodiments, only one sleeve 76 or 78 may be included in the finished garment 10. The attachment of the sleeves 76 and 78 may be made non-refastenable by means as discussed below. In the alternative, the attachment of the sleeves 76 and 78 may be made refastenable by means as discussed below. The length of the sleeves 76 and 78 may vary from a length intended to at least cover the entire arm of the wearer to a caplet length or shorter. The sleeve opening end edges 84 and 86 of the sleeves 76 and 78, respectively, can be hemmed. For easier manufacture, the sleeve openings end edges 84 and 86 may be left unhemmed, facilitating easy machine cutoff.

In the embodiments of the garments 10 that do not include the sleeves 76 and 78, the shoulder side edges 23, 33, 25, and 35, more specifically, the arm opening edges 73 and 75 defining the arm openings 72 and 74, may be hemmed. For easier manufacture, the shoulder side edges 23, 33, 25, and 35 (or, alternately, the arm opening edges 73 and 75) may be left unhemmed, facilitating easy machine cutoff.

A neck opening 90, defined about its perimeter by an edge 92, is located in at least one of the shoulder regions 28 and 38. The neck opening 90 is typically centered between the shoulder side edges 23, 25, 33, and 35, although such placement of the neck opening 90 is not required. The neck opening 90 may take on a variety of sizes and shapes, such as circular, oval, triangular, square, rectangular, multi-faceted, asymmetric or irregular, or the like. While the placement of the neck opening 90 may be symmetrical between the shoulder regions 28 and 38, as well as between the shoulder side edges 23, 25, 33, and 35, typically, the placement of the neck opening 90 is configured so that a larger portion of the neck opening 90 is located within the front shoulder region 28.

Additionally, while the shape of the neck opening 90 may be symmetrical, typically, the shape of the neck opening 90 is asymmetrical as dictated by fashion and comfort. In some embodiments of the garment 10, the edge 92 of the neck opening 90 may be hemmed. For easier manufacture, the edge 92 of the neck opening 90 may be left unhemmed, facilitating easy machine cutoff.

Various styles of a collar 94 may also be attached to the edge 92 of the neck opening 90. The attachment of the collar 94 may be made non-refastenable by means as discussed above. In the alternative, the attachment of the collar 94 may be made refastenable by means as discussed above. The collars 94 include, but are not limited to, turtlenecks, mock turtlenecks, cowls, shirt collars, tee-shirt shirt ribbed edging, decorative edging, and the like known in the garment industry.

The garment bottom edges 26 and 36 of the garment 10 may also be hemmed. (Sewing equipment 115 is shown in FIG. 1). For easier manufacture, the garment bottom edges 26 and 36 of the garment 10 may be left unhemmed, facilitating easy machine cutoff.

The front panel 20, the back panel 30, or both may be cut or otherwise opened to form a slit 57 or 65, respectively (shown in FIGS. 5, 9, and 10) such as a placket. The garment 10, including one or both slits 57 and 65, can be used as a wrap gown, robe, or the like. The slit 57 includes two edges 58 and 59. The slit 65 includes two edges 66 and 67. Various fastening means, such as adhesive and mechanical type fasteners 95, see the discussion below, may be used to refastenably attach or secure the edges 58 and 59 or the edges 66 and 67 together to form reclosable or refastenable garments 10. The slits 57 and 65 of the front and back panels 20 and 30, respectively, may extend from the edge 92 of the neck opening 90 to the garment bottom edges 26 and 36, respectively. In the alternative, the slits 57 and 65 may extend over only a portion of the panels 20 and 30 between the edge 92 of the neck opening 90 to the garment bottom edges 26 and 36, respectively. When the garment 10 comprises both a slit 57 in the front panel 20 and a slit 65 in the back panel 30, the slits 57 and 65 may be similar or dissimilar in size, structure, shape, and the like. It is understood that the term 'similar' as used herein is interpreted to include identical and varying levels of similarity. It is also understood that the term 'dissimilar' as used herein is interpreted to include different and varying levels of dissimilarity.

Another embodiment of the present invention is a continuous process for the manufacture of a garment 10 (see FIG. 1) for wearing about the upper body comprising at least a front panel 20, a back panel 30, a neck opening 90 defined about its perimeter by edge 92, arm openings 72 and 74 defined about their perimeters by arm opening edges 73 and 75, respectively, a lower body opening 44 defined about its perimeter by garment bottom edges 26 and 36. The garment 10 comprises an inner surface 11 and an outer surface 13. The garment 10 may comprise a single layer web of fabric 15 or may comprise a multi-layer laminate web of fabric 15. In some embodiments, the garment 10 may comprise multiple layers of the web of fabric 15. The web of fabric 15 may be made up of multiple webs of fabric positioned in side by side alignment or other arrangements to make up a web of fabric 15. The present invention requires at least one web of fabric 15 in a single continuous process to create the garments 10.

Other embodiments of the present invention may include three fabric webs 16, 17, and 18 in a single continuous process to create the garments 10. The fabric webs 16, 17, and 18 may be made of the similar or dissimilar material to each other. The fabric webs 16, 17, and 18 may be the result of cutting or otherwise severing the web of fabric 15. In other embodiments, various combinations of webs of fabric, overall having sufficient width of fabric to make the garments 10, may be used to provide the fabric webs 16, 17, and 18. It is understood in the discussion below of the web of fabric 15, that the description of the web of fabric 15 also applies to the fabric webs 16, 17, and 18 as well in the present invention.

In one embodiment of the present invention (see FIG. 1), one web of fabric 15 of sufficient width of fabric to make the garment 10 is provided to produce the garments 10. The desired web of fabric 15 is a nonwoven although any disposable or washable fabric may be used. (See the discussion below). The web of fabric 15 is typically unwound from a roll or other source (not shown).

The web of fabric 15 is desirably compliant and soft feeling to the wearer. The following description of materials from which the web of fabric 15 may be formed would also be used for the materials to form the inner surface 11 and the outer surface 13 of a multi-layer laminate web of fabric 15.

The web of fabric 15 may be any suitable material, such as a woven material, a nonwoven material, a fibrous or a polymeric film material and may be, although they need not necessarily be, an elastic material or of a stretchable nature. Suitable fibrous webs may utilize any suitable natural and/or synthetic fibers, for example, woven or nonwoven webs of fibers made of acrylic polymers, polyester, polyamide, glass, polyolefins, e.g., polyethylene and polypropylene, cellulosic derivatives such as rayon, cotton, silk, wool, pulp, paper and the like, as well as blends or combinations of any two or more of the foregoing. The web of fabric 15 may also comprise polymeric film layers such as polyethylene, polypropylene, polyamide, polyester, acrylic polymers, and compatible mixtures, blends and copolymers thereof.

The web of fabric 15 may be liquid pervious, permitting liquids to readily penetrate into its thickness, or impervious, resistant to the penetration of liquids into its thickness. The web of fabric 15 may be made from a wide range of materials, such as natural fibers (e.g. rayon, wood, or cotton fibers), synthetic fibers (e.g. polyester or polypropylene fibers), or from a combination of natural and synthetic fibers or reticulated foams and apertured plastic films. The web of fabric 15 may be woven, nonwoven, or film such as spunbonded, carded, or the like. A suitable web of fabric 15 may be carded, and thermally bonded by means well known to those skilled in the fabric art.

Alternatively, the web of fabric 15 may be derived from a spunbonded web. In a desired embodiment, the web of fabric 15 is spunbonded polypropylene nonwoven, meltblown polypropylene nonwoven and spunbonded polypropylene nonwoven laminate (SMS). The total basis weight is from about 0.4 to about 1.0 osy (more desirably 0.6 osy) and is made with about 86% spunbonded nonwoven and 14% meltblown nonwoven. A pigment such as titanium dioxide may be incorporated into the web of fabric 15. Such a spunbonded meltblown nonwoven laminate material is available from Kimberly-Clark Corporation, Roswell, Ga. The basis weight of the SMS material may vary from about 0.4 to about 1.0 osy.

In other desired embodiments, the web of fabric 15 is spunbonded polypropylene nonwoven with a wire-weave bond pattern having a grab tensile of 19 pounds as measured by ASTM D1682 and D1776, a Taber 40 mcycle abrasion rating of 3.0 as measured by ASTM D1175 and Handle-O-Meter MD value of 6.6 grams and CD value of 4.4 grams using TAPPI method T402. Such a spunbonded material is available from Kimberly-Clark Corporation, Roswell, Ga. The web of fabric 15 has a weight of from about 0.5 oz. per square yard (osy) to about 1.5 osy, desirably about 0.7 osy.

The web of fabric 15 may be constructed of a single spunbonded polypropylene nonwoven web having a basis weight of about 0.5 oz/yd$^2$ (17 gsm) to about 1.5 oz/yd$^2$ (51 gsm). In the structure of the garment 10, the web of fabric 15 desirably comprises a material having a basis weight of from about 0.5 oz/yd$^2$ (17 gsm) to about 1.5 oz/yd$^2$ (51 gsm). Lesser or greater basis weights may be used in the other regions of the garment 10, such as the sleeves 76 and 78, the cuffs 85 and 87, and the collar 94. Since the garment 10 is typically intended for active wear, the web of fabric 15 or portions thereof, may be made of materials having a basis weight that is abrasion resistant.

The web of fabric 15 may be any soft and flexible sheet. The web of fabric 15 may permit submersion in fresh water or salt water or treated water (chlorinated or brominated) and still retain its integrity. The web of fabric 15 may comprise, for example, a nonwoven web or sheet of a spunbonded, meltblown or bonded-carded web composed of synthetic polymer filaments, such as polypropylene, polyethylene, polyesters or the like, or a web of natural polymer filaments such as rayon or cotton. The web of fabric 15 may be selectively embossed or perforated with discrete slits or holes extending therethrough.

The web of fabric 15 may be further dyed, pigmented, or imprinted with any suitable color. Desirably, the web of fabric 15 is dyed, pigmented, or printed with a material which does not irritate or bleed the color onto the skin of the wearer.

For embodiments wherein the web of fabric 15 is a multi-layer laminate, both the outer surface 13 and the inner surface 11 are desirably compliant and soft feeling to the wearer. The following description of materials from which the outer surface 13 may be formed may also be used to form the material of the inner surface 11.

The outer surface 13 may be any suitable gatherable material, such as a woven material, a nonwoven material, a fibrous or a polymeric film material and may be, although they need not necessarily be, an elastic material or of a stretchable nature. Suitable fibrous gatherable webs may utilize any suitable natural and/or synthetic fibers, for example, woven or nonwoven webs of fibers made of acrylic polymers, polyester, polyamide, glass, polyolefins, e.g., polyethylene and polypropylene, cellulosic derivatives such as rayon, cotton, silk, wool, pulp, paper and the like, as well as blends or combinations of any two or more of the foregoing. The gatherable webs may also comprise polymeric film layers such as polyethylene, polypropylene, polyamide, polyester, acrylic polymers, and compatible mixtures, blends and copolymers thereof.

The outer surface 13 may be liquid pervious, permitting liquids to readily penetrate into its thickness, or impervious, resistant to the penetration of liquids into its thickness. The outer surface 13 may be made from a wide range of materials, such as natural fibers (e.g. rayon, wood, or cotton fibers), synthetic fibers (e.g. polyester or polypropylene fibers), or from a combination of natural and synthetic fibers or reticulated foams and apertured plastic films. The outer surface 13 may be woven, nonwoven or film such as spunbonded, carded, or the like. A suitable material for the outer surface 13 may be carded, and thermally bonded by means well known to those skilled in the fabric art.

Alternatively, the outer surface 13 may be derived from a spunbonded web. In a desired embodiment, the outer surface 13 is spunbonded polypropylene nonwoven, meltblown polypropylene nonwoven and spunbonded polypropylene nonwoven laminate (SMS). The total basis weight is from about 0.4 to about 1.0 osy (more desirably 0.6 osy) and is made with about 86% spunbonded nonwoven and 14% meltblown nonwoven. A pigment such as titanium dioxide may be incorporated into the outer surface 13 and the inner surface 11. Such spunbonded meltblown nonwoven laminate material is available from Kimberly-Clark Corporation, Roswell, Ga. The basis weight of the SMS material may vary from about 0.4 to about 1.0 osy.

In other desired embodiments, the outer surface 13 is spunbonded polypropylene nonwoven with a wire-weave bond pattern having a grab tensile of 19 pounds as measured by ASTM D1682 and D1776, a Taber 40 cycle abrasion rating of 3.0 as measured by ASTM D1175 and Handle-O-Meter MD value of 6.6 grams and CD value of 4.4 grams using TAPPI method T402. Such spunbonded material is available from Kimberly-Clark Corporation, Roswell, Ga. The outer surface 13 has a weight of from about 0.5 oz. per square yard (osy) to about 1.5 osy, desirably about 0.7 osy.

The outer surface 13 may be constructed of a single spunbonded polypropylene nonwoven web having a basis weight of about 0.5 oz/yd$^2$ (17 gsm) to about 1.5 oz/yd$^2$ (51 gsm). In the structure of the garment 10, the outer surface 13 desirably comprises a material having a basis weight of from about 0.5 oz/yd$^2$ (17 gsm) to about 1.5 oz/yd$^2$ (51 gsm). Lesser or greater basis weights may be used in the other regions of the garment 10. Since the garment 10 is typically intended for active wear, the outer surface 13 or portions thereof, may be made of materials having a basis weight which is abrasion resistant.

The inner surface 11 may be any soft and flexible sheet. The inner surface 11 may permit submersion in fresh water or salt water or treated water (chlorinated or brominated) and still retain its integrity. The inner surface 11 may comprise, for example, a nonwoven web or sheet of a spunbonded, meltblown, or bonded-carded web composed of synthetic polymer filaments, such as polypropylene, polyethylene, polyesters, or the like, or a web of natural polymer filaments such as rayon or cotton. The inner surface 11 may be selectively embossed or perforated with discrete slits or holes extending therethrough. Suitable adhesives for adhering the laminate layers may be obtained from Findley Adhesives, Inc. of Wauwatosa, Wis.

The outer surface 13 and the inner surface 11 may be further dyed, pigmented, or imprinted with any suitable color. Desirably, the inner surface 11 is either dyed, pigmented, or printed with a material which does not irritate or bleed the color onto the skin of the wearer.

The web of fabric 15 includes a pair of opposing web side edges 46 and 47. The web of fabric 15 is cut or otherwise severed by a die cutter 14 into 3 separate fabric webs 16, 17, and 18. (See FIG. 1). The cutting operation may be accomplished by a die cut operation, an ultrasonic operation, or any other suitable method of operation. The fabric web 17 includes the shoulder side edges 51, 52, 54, and 55, the side edges 50 and 53, and the edges 49 and 56 as well as an inner surface 11 and an outer surface 13. In the preferred embodiment, the fabric web 17 is cut in a repeating pattern of connected octagonal shapes as shown in FIG. 1. In other embodiments, the fabric web 17 may be cut into other shapes having an overall appearance of the connected octagonal shape, including straight, curved, multi-faceted, asymmetric or irregular shoulder side edges 51, 52, 54, and 55, side edges 50 and 53, and edges 49 and 56. In addition, the shape of the shoulder side edges 51, 52, 54, and 55, the side edges 50 and 53, and the edges 49 and 56 of the fabric web 17 may be different from each other or from any combination of the shoulder side edges 51, 52, 54, and 55, the side edges 50 and 53, and the edges 49 and 56. The connected octagonal shapes of the fabric web 17 may take on a variety of sizes as well.

In addition, the length of the shoulder side edges 51, 52, 54, and 55, the side edges 50 and 53, and the edges 49 and 56 of the fabric web 17 may be different from each other or from any combination of the shoulder side edges 51, 52, 54, and 55, the side edges 50 and 53, and the edges 49 and 56. The pattern of the fabric web 17 is restricted only by fashion and the minimum amount of the material of the fabric web 17 that is necessary to complete the remaining steps or operations of the process of manufacture.

The fabric web 16 includes a web side edge 21 which may in some embodiments correspond to the web side edge 46 of the web of fabric 15, the side edges 27, the edges 29, and the shoulder side edges 23 and 25 as well as an inner surface 11 and an outer surface 13. It is understood that while the web side edge 46 of the web of fabric 15 may typically become the web side edge 21 of the fabric web 16, fabric may be removed from or added to the web side edge 46 to create the web side edge 21. The shape formed by the side edges 27, the edges 29, and the shoulder side edges 23 and 25 of the fabric web 16 together typically form a shape complimentary to the shape formed by the side edges 50, the edges 49, and the shoulder side edges 51 and 52 of the fabric web 17. As discussed above, in the preferred embodiment of the present invention, the side edges 27, the edges 29, and the shoulder side edges 23 and 25 of the fabric web 16 form a portion of repeating connected octagonal shapes complimentary to the shape of the fabric web 17. In other embodiments, the fabric web 16 may be cut into other shapes having an overall appearance of the connected octagonal shapes including straight, curved, multi-faceted, asymmetric or irregular shoulder side edges 23 and 25, edges 29, and side edges 27.

In addition, the shape of the edges 29, the side edges 27, and the shoulder side edges 23 and 25 of the fabric web 16 may be different from each other or from any combination of the edges 29, the side edges 27, and the shoulder side edges 23 and 25. The portion of the connected octagonal shape of the fabric web 16 may take on a variety of sizes as well. In addition, the length of the shoulder side edges 23 and 25, the side edges 27, and the edges 29 of the fabric web 16 may be different from each other or from any combination of the shoulder side edges 23 and 25, the side edges 27, and the edges 29. The pattern of the material of the fabric web 16 is restricted only by fashion and the minimum amount of material of the fabric web 16 that is necessary to complete the remaining steps or operations of the process of manufacture.

The fabric web 18 includes a web side edge 31 which may in some embodiments correspond to the web side edge 47 of the web of fabric 15, the side edges 37, the edges 39, and the shoulder side edges 33 and 35 as well as an inner surface 11 and an outer surface 13. It is understood that while the web side edge 47 of the web of fabric 15 may typically become the web side edge 31 of the fabric web 18, fabric may be removed from or added to the web side edge 47 to create the web side edge 31. The shape formed by the side edges 37, the edges 39, and the shoulder side edges 33 and 35 of the fabric web 18 together typically form a shape complimentary to the shape formed by the side edges 53, the edges 56, and the shoulder side edges 54 and 55 of the fabric web 17. As discussed above, in the preferred embodiment of the present invention, the side edges 37, the edges 39, and the shoulder side edges 33 and 34 of the fabric web 18 form a portion of repeating connected octagonal shapes complimentary to the shape of the fabric web 17. In other embodiments, the fabric web 18 may be cut into other shapes having an overall appearance of the connected octagonal shapes including straight, curved, multi-faceted, asymmetric or irregular shoulder side edges 33 and 35, edges 39, and side edges 37.

In addition, the shape of the edges 39, the side edges 37, and the shoulder side edges 33 and 35 of the fabric web 18 may be different from each other or from any combination of the edges 39, the side edges 37, and the shoulder side edges 33 and 35. The portion of the connected octagonal shape of the fabric web 18 may take on a variety of sizes as well. In addition, the length of the shoulder side edges 33 and 35, the side edges 37 and the edges 39 of the fabric web 18 may be different from each other or from any combination of the shoulder side edges 33 and 35, the side edges 37, and the edges 39. The pattern of the material of the fabric web 18 is restricted only by fashion and the minimum amount of material of the fabric web 18 that is necessary to complete the remaining steps or operations of the process of manufacture.

The fabric webs 16, 17, and 18 can be cut from one web of fabric 15 in a nested or a non-nested arrangement. (See FIG. 1). It is also understood that while the shapes of the fabric webs 16 and 18 are complimentary to the shape of the fabric web 17, the shapes of the fabric webs 16 and 18 as compared to the shape of the fabric web 17 do not have to be complementary to the shape of the fabric web 17. The shape of the fabric web 16 may be similar, dissimilar, complementary, or not to the shape of the fabric web 18.

The opposing web side edges 46 and 47 of the web of fabric 15, in the preferred embodiment, become the garment bottom edges 26 and 36, respectively, of the finished garment 10. It is understood that while the web side edges 46 and 47 of the web of fabric 15 may typically become the garment bottom edges 26 and 36, respectively, in the finished garment 10, fabric may be removed from or added to the web side edges 46 and 47 of the web of fabric 15 forming the garment bottom edges 26 and 36, respectively, in the finished garment 10. The resulting garment bottom edges 26 and 36 so formed are then proximate the web side edges 46 and 47 of the web of fabric 15.

Alternatively, the web side edges 21 and 31 of the fabric webs 16 and 18, respectively, in the preferred embodiment, become the garment bottom edges 26 and 36, respectively, of the finished garment 10. It is understood that while the web side edges 21 and 31 of the fabric webs 16 and 18, respectively, may typically become the garment bottom edges 26 and 36, respectively, in the finished garment 10, fabric may be removed from or added to the web side edges 21 and 31 of the fabric webs 16 and 18, respectively, forming the garment bottom edges 26 and 36, respectively, in the finished garment 10.

The web of fabric 15 is cut into discrete garment-sized pieces 19 by a die cutter 45. In some embodiments of the present invention, the web of fabric 15 is cut into the three fabric webs 16, 17, and 18 prior to being cut into discrete garment-sized pieces 19. In other embodiments of the present invention, the web of fabric 15 is cut into discrete garment-sized pieces 19 prior to the web of fabric 15 being cut into the three fabric webs 16, 17, and 18. The fabric webs 16, 17, and 18 are then combined to form the discrete garment-sized pieces of fabric 19.

Each discrete garment-sized piece 19 contains at least an opening 89, a pair of opposing sleeves 76 and 78, one pair of opposing garment side edges 22 and 24, one pair of opposing garment side edges 32 and 34, and opposing garment end portions 62 and 64. The cutting operation may be accomplished by a die cut operation, an ultrasonic operation, or any other suitable method of operation. The location of the opposing garment end portions 62 and 64 corresponds to the garment bottom edge 26 of the front panel 20 and the garment bottom edge 36 of the back panel 30, respectively, in the finished garment 10. Each discrete garment-sized piece 19 of the fabric webs 16, 17, and 18 is transported, typically by vacuum screens, belts, or conveyors, through hemming, folding, and fastening operations.

The side edges 27, the shoulder side edges 23 and 25, and the edges 29 of the fabric web 16 may be attached to the side edges 50, the shoulder side edges 51 and 52, and the edges 49 of the fabric web 17, respectively. The attachment of the edges 29 of the fabric web 16 to the edges 49 of the fabric web 17 form seams 142. The attachment of the shoulder side edges 23 and 25 of the fabric web 16 to the shoulder side edges 51 and 52 of the fabric web 17, respectively, form shoulder seams 136 and 137, respectively. The attachment of the side edges 27 of the fabric web 16 to the side edges 50 of the fabric web 17 form sleeve seams 140.

The side edges 37, the shoulder side edges 33 and 35, and the edges 39 of the fabric web 18 may be attached to the side edges 53, the shoulder side edges 54 and 55, and the edges 56 of the fabric web 17, respectively. The attachment of the edges 39 of the fabric web 18 to the edges 56 of the fabric web 17 form seams 143. The attachment of the shoulder side edges 33 and 35 of the fabric web 18 to the shoulder side edges 54 and 55 of the fabric web 17, respectively, form shoulder seams 138 and 139, respectively. The attachment of the side edges 37 of the fabric web 18 to the side edges 53 of the fabric web 17 form sleeve seams 141.

In various embodiments of the present invention, one or both of the seams 142 and 143 can be constructed as non-refastenable seams or as refastenable seams. Any excess material of the fabric webs 16, 17, or 18 may be removed from the edges of the seams 142 and 143. The non-refastenable seams 142 and 143 may be formed by any suitable means such as ultrasonic sealing, adhesive bonding, tape, heat sealing, sewing, or any method of fastening known in the art. (Sewing equipment 116 is shown in FIG. 1). The seams may be constructed on a continuous or intermittent basis. One suitable method of forming such seams 142 and 143 is disclosed in U.S. Pat. No. 4,938,753 issued Jul. 3, 1990, to Van Gompel et al., which is incorporated herein by reference. The seams 142 and 143 may be bonded together to form non-refastenable seams 142 and 143.

In other embodiments of the present invention, the edges 29 and 49 and the edges 39 and 56 may be held together in the finished garment 10 to form refastenable seams 142 and 143, respectively. The refastenable means for securing the edges 29 and 49 and the edges 39 and 56 of the garment 10 include refastenable adhesive and mechanical type fasteners 95. The adhesive and mechanical type fasteners 95 include buttons and button holes, snaps, buckles, clasps, hooks and loops, end extensions, tabs, tapes, and the like which are designed or adapted to interlock or engage some type of a complementary device or the outer surface 13 or the inner surface 11 of the garment 10.

In addition, elasticized fasteners 95 may also be used in assuring better fit of the garment 10. If the garment 10 includes refastenable seams 142 and 143, the refastenable means are desirably strategically placed on the web of fabric 15 (or, alternatively, the fabric webs 16, 17, or 18) before the web of fabric 15 (or, alternatively, the fabric webs 16, 17, and 18) is cut into discrete garment-sized pieces 19.

Figure 16:
FIG. 16 is a cross sectional view of a seam.

The seams 142 and 143 of the present invention may take on a variety of structures or configurations known in the art. The seams 142 and 143 may be configured the same as each other or different from each other. One embodiment of the seams 142 and 143 is an out-turned configuration as illustrated in FIG. 16. Such configured seams 142 and 143 are formed by securing together at least a portion of the out-turned portions of the edges 29 and 49 and the edges 39 and 56, respectively, of the garment 10. The inner surface 11 of the edges 29 and 39 are brought into contact with the inner surface 11 of the edges 49 and 56, respectively.

Figure 17:
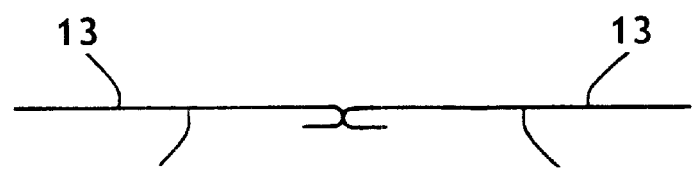
FIG. 17 is a cross sectional view of a seam.

Another embodiment of the seams 142 and 143 is an in-turned configuration as illustrated in FIG. 17. Such configured seams 142 and 143 are formed by securing together at least a portion of the in-turned portions of the edges 29 and 49 and the edges 39 and 56, respectively, of the garment 10. The outer surface 13 of the edges 29 and 39 are brought into contact with the outer surface 13 of the edges 49 and 56, respectively.

Figure 15:
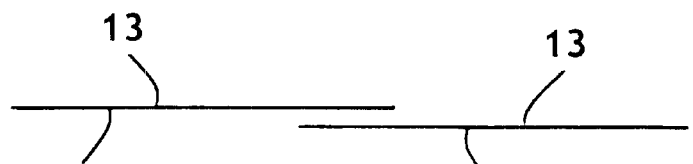
FIG. 15 is a cross sectional view of a seam.

Another embodiment of the seams 142 and 143 is an over-lapped configuration as illustrated in FIG. 15. Such configured seams 142 and 143 are formed by securing together at least a portion of the over-lapped portions of the edges 29 and 49 and the edges 39 and 56, respectively, of the garment 10. The inner surface 11 of one of the edges 29 and 49 and one of the edges 39 and 56 is brought into contact with the outer surface 13 of the other edge 29 or 49 and the edge 39 or 56, respectively.

Figure 18:
FIG. 18 is a cross sectional view of a seam.

Another embodiment of the seams 142 and 143 is an over-lapped configuration as illustrated in FIG. 18. Such a configured seam 142 is formed by folding the edge 29 or the edge 49. The outer surface 13 of the folded portion and the inner surface 11 of the unfolded portion of the edge 29 or the edge 49 and the corresponding portion of the fabric web 16 or the fabric web 17, respectively, is brought into contact with the inner surface 11 or the outer surface 13 of the non-folded edge 49 or the edge 29 and the corresponding portion of the fabric web 17 or the fabric web 16.

The seam 143 is formed by folding back the edge 39 or the edge 56. The outer surface 13 of the folded portion and the inner surface 11 of the unfolded portion of the edge 39 or the edge 56 and the corresponding portion of the fabric web 18 or the fabric web 17, respectively, is brought into contact with the inner surface 11 or the outer surface 13 of the non-folded edge 56 or the edge 39 and the corresponding portion of the fabric web 17 or the fabric web 18. It is understood that the folding back of an edge 29, 49, 39, or 56 could be performed such that the inner surface 11 would be exposed along the fold.

In various embodiments of the present invention, one or both of the sleeve seams 140 and 141 can be constructed as non-refastenable seams or as refastenable seams. Any excess material of the fabric webs 16, 17, or 18 may be removed from the edges of the sleeve seams 140 and 141. The non-refastenable sleeve seams 140 and 141 may be formed by any suitable means such as ultrasonic sealing, adhesive bonding, tape, heat sealing, sewing, or any method of fastening known in the art. (Sewing equipment 116 is shown in FIG. 1). The seams may be constructed on a continuous or intermittent basis. One suitable method of forming such sleeve seams 140 and 141 is disclosed in U.S. Pat. No. 4,938,753 issued Jul. 3, 1990, to Van Gompel et al., which is incorporated herein by reference. The sleeve seams 140 and 141 may be bonded together to form non-refastenable sleeve seams 140 and 141.

In other embodiments of the present invention, the side edges 27 and 50 and the side edges 37 and 53 may be held together in the finished garment 10 to form refastenable sleeve seams 140 and 141, respectively. The refastenable means for securing the side edges 27 and 50 and the side edges 37 and 53 of the garment 10 include refastenable adhesive and mechanical type fasteners 95. The adhesive and mechanical type fasteners 95 include buttons and button holes, snaps, buckles, clasps, hooks and loops, end extensions, tabs, tapes, and the like which are designed or adapted to interlock or engage some type of a complimentary device or the outer surface 13 or the inner surface 11 of the garment 10.

In addition, elasticized fasteners 95 may also be used in assuring better fit of the garment 10. If the garment 10 includes refastenable sleeve seams 140 and 141, the refastenable means are desirably strategically placed on the web of fabric 15 (or, alternatively, the fabric webs 16, 17, or 18) before the web of fabric 15 (or, alternatively, the fabric webs 16, 17, and 18) is cut into discrete garment-sized pieces 19.

The sleeve seams 140 and 141 of the present invention may take on a variety of structures or configurations known in the art. The sleeve seams 140 and 141 may be configured the same as each other or different from each other. One embodiment of the sleeve seams 140 and 141 is an out-turned configuration as illustrated in FIG. 16. Such configured sleeve seams 140 and 141 are formed by securing together at least a portion of the out-turned portions of the side edges 27 and 50 and the side edges 37 and 53, respectively, of the garment 10. The inner surface 11 of the side edges 27 and 37 are brought into contact with the inner surface 11 of the side edges 50 and 53, respectively.

Another embodiment of the sleeve seams 140 and 141 is an in-turned configuration as illustrated in FIG. 17. Such configured sleeve seams 140 and 141 are formed by securing together at least a portion of the in-turned portions of the side edges 27 and 50 and the side edges 37 and 53, respectively, of the garment 10. The outer surface 13 of the side edges 27 and 37 are brought into contact with the outer surface 13 of the side edges 50 and 53, respectively.

Another embodiment of the sleeve seams 140 and 141 is an over-lapped configuration as illustrated in FIG. 15. Such configured sleeve seams 140 and 141 are formed by securing together at least a portion of the over-lapped portions of the side edges 27 and 50 and the side edges 37 and 53, respectively, of the garment 10. The inner surface 11 of one of the side edges 27 and 50 and one of the side edges 37 and 53 is brought into contact with the outer surface 13 of the other side edge 27 or 50 and the side edge 37 or 53, respectively.

Another embodiment of the sleeve seams 140 and 141 is an over-lapped configuration as illustrated in FIG. 18. Such a configured sleeve seam 140 is formed by folding the side edge 27 or the side edge 50. The outer surface 13 of the folded portion and the inner surface 11 of the unfolded portion of the side edge 27 or the side edge 50 and the corresponding portion of the fabric web 16 or the fabric web 17, respectively, is brought into contact with the inner surface 11 or the outer surface 13 of the non-folded side edge 50 or the side edge 27 and the corresponding portion of the fabric web 17 or the fabric web 16.

The sleeve seam 141 is formed by folding back the side edge 37 or the side edge 53. The outer surface 13 of the folded portion and the inner surface 11 of the unfolded portion of the side edge 37 or the side edge 53 and the corresponding portion of the fabric web 18 or the fabric web 17, respectively, is brought into contact with the inner surface 11 or the outer surface 13 of the non-folded side edge 53 or the side edge 37 and the corresponding portion of the fabric web 17 or the fabric web 18. It is understood that the folding back of a side edge 27, 50, 37, or 53 could be performed such that the inner surface 11 would be exposed along the fold.

In various embodiments of the present invention, one or more of the shoulder seams 136, 137, 138, and 139 can be constructed as non-refastenable seams or as refastenable seams. Any excess material of the fabric webs 16, 17, or 18 may be removed from the edges of the shoulder seams 136, 137, 138, and 139. The non-refastenable shoulder seams 136, 137, 138, and 139 may be formed by any suitable means such as ultrasonic sealing, adhesive bonding, tape, heat sealing, sewing, or any method of fastening known in the art. (Sewing equipment 116 is shown in FIG. 1). The seams may be constructed on a continuous or intermittent basis. One suitable method of forming such shoulder seams 136, 137, 138, and 139 is disclosed in U.S. Pat. No. 4,938,753 issued Jul. 3, 1990, to Van Gompel et al., which is incorporated herein by reference. The shoulder seams 136, 137, 138, and 139 may be bonded together to form non-refastenable shoulder seams 136, 137, 138, and 139.

In other embodiments of the present invention, the shoulder side edges 23 and 51, the shoulder side edges 25 and 52, the shoulder side edges 33 and 54, and the shoulder side edges 35 and 55 may be held together in the finished garment 10 to form refastenable shoulder seams 136, 137, 138, and 139, respectively. The refastenable means for securing the shoulder side edges 23 and 51, the shoulder side edges 25 and 52, the shoulder side edges 33 and 54, and the shoulder side edges 35 and 55 of the garment 10 include refastenable adhesive and mechanical type fasteners 95. The adhesive and mechanical type fasteners 95 include buttons and button holes, snaps, buckles, clasps, hooks and loops, end extensions, tabs, tape, and the like which are designed or adapted to interlock or engage some type of a complementary device or the outer surface 13 or the inner surface 11 of the garment 10.

In addition, elasticized fasteners 95 may also be used in assuring better fit of the garment 10. If the garment 10 includes refastenable shoulder seams 136, 137, 138, and 139, the refastenable means are desirably strategically placed on the web of fabric 15 (or, alternatively, the fabric webs 16, 17, or 18) before the web of fabric 15 (or, alternatively, the fabric webs 16, 17, and 18) is cut into discrete garment-sized pieces 19.

The shoulder seams 136, 137, 138, and 139 of the present invention may take on a variety of structures or configurations known in the art. The shoulder seams 136, 137, 138, and 139 may be configured the same as each other or different from each other. One embodiment of the shoulder seams 136, 137, 138, and 139 is an out-turned configuration as illustrated in FIG. 16. Such configured shoulder seams 136, 137, 138, and 139 are formed by securing together at least a portion of the out-turned portions of the shoulder side edges 23 and 51, the shoulder side edges 25 and 52, the shoulder side edges 33 and 54, and the shoulder side edges 35 and 55, respectively, of the garment 10. The inner surface 11 of the shoulder side edges 23, 25, 33, and 35 is brought into contact with the inner surface 11 of the shoulder side edges 51, 52, 54, and 55, respectively.

Another embodiment of the shoulder seams 136, 137, 138, and 139 is an in-turned configuration as illustrated in FIG. 17. Such configured shoulder seams 136, 137, 138, and 139 are formed by securing together at least a portion of the in-turned portions of the shoulder side edges 23 and 51, the shoulder side edges 25 and 52, the shoulder side edges 33 and 54, and the shoulder side edges 35 and 55, respectively, of the garment 10. The outer surface 13 of the shoulder side edges 23, 25, 33, and 35 is brought into contact with the outer surface 13 of the shoulder side edges 51, 52, 54, and 55, respectively.

Another embodiment of the shoulder seams 136, 137, 138, and 139 is an over-lapped configuration as illustrated in FIG. 15. Such configured shoulder seams 136, 137, 138, and 139 are formed by securing together at least a portion of the over-lapped portions of the shoulder side edges 23 and 51, the shoulder side edges 25 and 52, the shoulder side edges 33 and 54, and the shoulder side edges 35 and 55, respectively, of the garment 10. The inner surface 11 of one of the shoulder side edges 23 and 51, one of the shoulder side edges 25 and 52, one of the shoulder side edges 33 and 54, and one of the shoulder side edges 35 and 55 are brought into contact with the outer surface 13 of the other shoulder side edge 23 or 51, the shoulder side edge 25 or 52, the shoulder side edge 33 or 54, and the shoulder side edge 35 or 55, respectively.

Another embodiment of the shoulder seams 136, 137, 138, and 139 is an over-lapped configuration as illustrated in FIG. 18. Such a configured shoulder seam 136 is formed by folding the shoulder side edge 23 or the shoulder side edge 51. The outer surface 13 of the folded portion and the inner surface 11 of the unfolded portion of the shoulder side edge 23 or the shoulder side edge 51 and the corresponding portion of the fabric web 16 or the fabric web 17, respectively, are brought into contact with the inner surface 11 or the outer surface 13 of the non-folded shoulder side edge 51 or the shoulder side edge 23 and the corresponding portion of the fabric web 17 or the fabric web 16.

The shoulder seam 137 is formed by folding the shoulder side edge 25 or the shoulder side edge 52. The outer surface 13 of the folded portion and the inner surface 11 of the unfolded portion of the shoulder side edge 25 or the shoulder side edge 52 and the corresponding portion of the fabric web 16 or the fabric web 17, respectively, are brought into contact with the inner surface 11 or the outer surface 13 of the non-folded shoulder side edge 52 or the shoulder side edge 25 and the corresponding portion of the fabric web 17 or the fabric web 16.

The shoulder seam 138 is formed by folding the shoulder side edge 33 or the shoulder side edge 54. The outer surface 13 of the folded portion and the inner surface 11 of the unfolded portion of the shoulder side edge 33 or the shoulder side edge 54 and the corresponding portion of the fabric web 18 or the fabric web 17, respectively, are brought into contact with the inner surface 11 or the outer surface 13 of the non-folded shoulder side edge 54 or the shoulder side edge 33 and the corresponding portion of the fabric web 17 or the fabric web 18.

The shoulder seam 139 is formed by folding the shoulder side edge 35 or the shoulder side edge 55. The outer surface 13 of the folded portion and the inner surface 11 of the unfolded portion of the shoulder side edge 35 or the shoulder side edge 55 and the corresponding portion of the fabric web 18 or the fabric web 17, respectively, are brought into contact with the inner surface 11 or the outer surface 13 of the non-folded shoulder side edge 55 or the shoulder side edge 35 and the corresponding portion of the fabric web 17 or the fabric web 18. It is understood that the folding back of a shoulder side edge 23, 25, 33, 35, 51, 52, 54, or 55 could be performed such that the inner surface 11 would be exposed along the fold.

A repeating series of openings 89 are cut by the die cutter 41 into at least the fabric web 17 (or, alternatively, the web of fabric 15). In some embodiments of the present invention, the openings 89 may be cut into all three of the fabric webs 16, 17, and 18, or any combination of the fabric webs 16, 17, and 18. The location of the opening 89 corresponds to the neck opening 90 in the finished garment 10. The openings 89 may be produced by a die cut operation, an ultrasonic operation, or any other suitable method of operation. The material to be removed from the openings 89 may be removed by any method known in the art, desirably a vacuum source (not shown). The opening 89 may take on a variety of sizes and shapes, such as slit, circular, oval, triangular, square, rectangular, multi-faceted, asymmetric or irregular, or the like. The pattern of the opening 89 is restricted only by fashion and the minimum amount of fabric web 17 (or, alternatively, the web of fabric 15 or any combination of the fabric webs 16, 17, and 18) that must remain having a sufficient integrity to withstand the remaining steps or operations of the process of manufacture.

The placement of the opening 89 in relation to a pair of opposing sleeves 76 and 78, while in a typical garment 10, the opening 89 is centrally located between or intermediate the pair of opposing sleeves 76 and 78, is restricted only by fashion and the minimum amount of fabric web 17 (or, alternatively, the web of fabric 15 or any combination of the fabric webs 16, 17, and 18) that must remain having sufficient integrity to withstand the remaining steps or operations of the process of manufacture. For example, the placement of the opening 89 between the pair of opposing sleeves 76 and 78 may be symmetrically or asymmetrically located.

The edge 92 of the neck opening 90 may be hemmed by any method or style known in the art. In some embodiments, it may be desirable to leave the edge 92 of the neck opening 90 unhemmed.

In other embodiments, a collar 94 may be attached to the edge 92 of the neck opening 90 of the garment 10, thereby forming a collar seam 112. The attachment of the collar 94 may be made non-refastenable by means as discussed above. (Sewing equipment 117 is shown in FIG. 1). In the alternative, the attachment of the collar 94 may be made refastenable by means as discussed above. The collar seam 112 may be constructed on a continuous or intermittent basis. The collar 94 may take on a variety of sizes and shapes. The pattern of the collar 94 is restricted only by the fashion and the minimum amount of the material of the collar 94 that is necessary to complete the remaining steps or operations of the process of manufacture.

The collar seam 112 of the present invention may take on a variety of structures or configurations known in the art. One embodiment of the collar seam 112 is an out-turned configuration as illustrated in FIG. 16. Such a configured collar seam 112 is formed by securing together at least a portion of the out-turned portions of the collar edge 111 of the collar 94 and the edge 92 of the neck opening 90 of the garment 10. The inner surface 11 of the collar edge 111 of the collar 94 is brought into contact with the inner surface 11 of the edge 92 of the neck opening 90.

Another embodiment of the collar seam 112 is an in-turned configuration as illustrated in FIG. 17. Such a configured collar seam 112 is formed by securing together at least a portion of the in-turned portions of the collar edge 111 of the collar 94 and the edge 92 of the neck opening 90 of the garment 10. The outer surface 13 of the collar edge 111 of the collar 94 is brought into contact with the outer surface 13 of the edge 92 of the neck opening 90.

Another embodiment of the collar seam 112 is an over-lapped configuration as illustrated in FIG. 15. Such a configured collar seam 112 is formed by securing together at least a portion of the over-lapped portions of the collar edge 111 of the collar 94 and the edge 92 of the neck opening 90 of the garment 10. The inner surface 11 of the collar edge 111 of the collar 94 or the edge 92 of the neck opening 90 is brought into contact with the outer surface 13 of the other, the collar edge 111 or the edge 92.

Another embodiment of the collar seam 112 is an over-lapped configuration as illustrated in FIG. 18. Such a configured collar seam 112 is formed by folding back the collar edge 111 of the collar 94 or the edge 92 of the neck opening 90. The outer surface 13 of the folded portions and the inner surface 11 of the unfolded portions of the collar edge 111 of the collar 94 or the edge 92 of the neck opening 90 and the corresponding portions of the collar 94 or the front or back panels 20 and 30 are brought into contact with the inner surface 11 or the outer surface 13 of the unfolded collar edge 111 of the collar 94 or the edge 92 of the neck opening 90 and the corresponding portions of the collar 94 or the front and back panels 20 and 30. It is understood that the folding back of the collar edge 111 of the collar 94 or the edge 92 of the neck opening 90 could be performed such that the inner surface 11 would be exposed along the fold.

Figure 19:
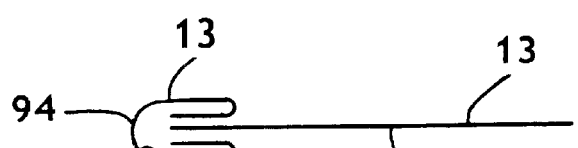
FIG. 19 is a cross sectional view of a seam.

Another embodiment of the collar seam 112 is an over-lapped configuration as illustrated in FIG. 19. Such a configured collar seam 112 is formed by folding the collar 94 about or over the edge 92 of the neck opening 90. The collar edges 111 of the collar 94 may be folded under bringing the outer surface 13 of the collar 94 into contact with the edge 92 of the neck opening and any portion of the adjacent material of the front panel 20, the back panel 30, or both as desired. The collar edges 111 may be left exposed by not being folding under.

Figure 20:
FIG. 20 is a cross sectional view of a seam.

Another embodiment of the collar seam 112 is an over-lapped configuration as illustrated in FIG. 20. Such a configured collar seam 112 is formed by folding the collar edge 111 such that the inner surface 11 of the collar 94 is brought into contact with itself. The edge 92 of the neck opening 90 is folded such that the outer surface 13 of the front panel 20, the back panel 30, or both are brought into contact with itself. The collar edge 111 is inserted into the fold of the edge 92 of the neck opening 90. The edge 92 of the neck opening 90 is inserted into the fold of the collar edge 111. In another embodiment, the collar edge 111 is folded such that the outer surface 13 of the collar 94 is brought into contact with itself. The edge 92 of the neck opening 90 is folded such that the inner surface 11 of the front panel 20, the back panel 30, or both are brought into contact with itself. This configured collar seam 112 may be used with any seam describe herein.

The materials used for the collar 94 may be the same as the materials used for the other portions of the garment 10. In some embodiments, it is desirable that the materials used for the collar 94 have an elastic element such that the collar 94 will conform to the portion of the wearer's neck that comes into contact with the collar 94.

An I-shaped cut 68 is cut by the die cutter 41 into the fabric web 16, 17, and 18 between the web side edge 21 of the fabric web 16 and the web side edge 31 of the fabric web 18. The I-shaped cut 68 may be produced by a die cut operation, an ultrasonic operation, or any other suitable method of operation. It is understood that while FIG. 1 shows the die cutter 41 cutting the I-shaped cut 68 and the opening 89, these operations could be performed by separate devices and at different stages within the manufacturing process. The I-shaped cut 68 severs the sleeve seams 140 and 141 (or in the alternative, side edges 27, 37, 50, and 53). The placement of the I-shaped cut 68 in relation to the web side edges 21 and 31 and the sleeve seams 140 and 141 (or in the alternative, side edges 27, 37, 50, and 53), while in a typical garment 10, the I-shaped cut 68 is centered between the web side edges 21 and 31 and bisecting the center point of the sleeve seams 140 and 141 (or in the alternative, side edges 27, 37, 50, and 53), is restricted only by fashion and the minimum amount of the fabric webs 16, 17, and 18 that must remain having sufficient integrity to withstand the remaining steps or operations of the process of manufacture. For example, the placement of the I-shaped cut 68 between the web side edges 21 and 31 and along the sleeve seams 140 and 141 (or in the alternative, side edges 27, 37, 50, and 53) may be symmetrically or asymmetrically located.

The I-shaped cut 68 provides the sleeve opening end edges 84 and 86 of the sleeves 76 and 78, respectively. The I-shaped cut 68 also creates at least a portion of the sleeve side edges 81 and 83 of the sleeve 76 and at least a portion of the sleeve side edges 88 and 91 of the sleeve 78.

The sleeve opening end edges 84 and 86 of the sleeves 76 and 78, respectively, may be hemmed by any method or style known in the art. (Sewing equipment 118 is shown in FIG. 1). The hemming of the sleeve opening edge 84 of the sleeve 76 may be accomplished by folding the sleeve opening end edge 84 back such that the sleeve side edges 81 and 83 are folded back on to themselves, bringing the outer surface 13 or the inner surface 11 of the sleeve 76 into contact with itself. The hemming of the sleeve opening edge 86 of the sleeve 78 may be accomplished in a similar manner such that the sleeve side edges 88 and 91 are folded back on to themselves, bringing the outer surface 13 or the inner surface 11 of the sleeve 78 into contact with itself. In some embodiments, it may be desirable to leave the sleeve opening end edges 84 and 86 unhemmed.

In other embodiments, cuffs 85 and 87 may be attached to the sleeve opening end edges 84 and 86, respectively, of the sleeves 76 and 78, respectively, of the garment 10, forming cuff seams 108 and 110, respectively. The attachment of the cuffs 85 and 87 may be made non-refastenable by means as discussed above. In the alternative, the attachment of the cuffs 85 and 87 may be made refastenable by means as discussed above. The cuffs 85 and 87 may take on a variety of sizes and shapes. The cuffs 85 and 87 may be similar or dissimilar in shape, structure, material, size, and the like from each other within the finished garment 10. The pattern of the cuffs 108 and 110 is restricted only by the fashion and the minimum amount of the material of the cuffs 85 and 87 that are necessary to complete the remaining steps or operations of the process of manufacture.

The cuff seams 108 and 110 of the present invention may take on a variety of structures or configurations known in the art. One embodiment of the cuff seams 108 and 110 is an out-turned configuration as illustrated in FIG. 16. Such configured cuff seams 108 and 110 are formed by securing together at least a portion of the out-turned portions of the cuff edge 107 and the sleeve opening end edge 84 and the cuff edge 109 and the sleeve opening end edge 86, respectively, of the garment 10. The inner surface 11 of the cuff edges 107 and 109 of the cuffs 85 and 87, respectively, are brought into contact with the inner surface 11 of the sleeve opening edges 84 and 86 of the sleeves 76 and 78, respectively.

Another embodiment of the cuff seams 108 and 110 is an in-turned configuration as illustrated in FIG. 17. Such configured cuff seams 108 and 110 are formed by securing together at least a portion of the in-turned portions of the cuff edge 107 and the sleeve opening edge 84 and the cuff edge 109 and the sleeve opening edge 86, respectively, of the garment 10. The outer surface 13 of the cuff edges 107 and 109 of the cuffs 85 and 87, respectively, are brought into contact with the outer surface 13 of the sleeve opening edges 84 and 86 of the sleeves 76 and 78, respectively.

Another embodiment of the cuff seams 108 and 110 is an over-lapped configuration as illustrated in FIG. 15. Such configured cuff seams 108 and 110 are formed by securing together at least a portion of the over-lapped portions of the cuff edge 107 and the sleeve opening edge 84 and the cuff edge 109 and the sleeve opening edge 86 of the sleeves 76 and 78, respectively. The inner surface 11 of one of the cuff edge 107 or the sleeve opening edge 84 and the cuff edge 109 or the sleeve opening edge 86, is brought into contact with the outer surface 13 of the other cuff edge 107 or the sleeve opening edge 84 and the cuff edge 109 or the sleeve opening edge 86 of the sleeves 76 and 78, respectively.

Another embodiment of the cuff seams 108 and 110 is an over-lapped configuration as illustrated in FIG. 18. Such configured cuff seams 108 and 110 are formed by folding back the cuff edge 107 or the sleeve opening end edge 84 and the cuff edge 109 or the sleeve opening end edge 84 and the cuff edge 109 or the sleeve opening end edge 86 of the sleeves 76 and 78, respectively. The outer surface 13 of the folded portions and the inner surface 11 of the unfolded portions of the cuff edge 107 or the sleeve opening end edge 84 and the cuff edge 109 or the sleeve opening end edge 86 and the corresponding portions of the cuffs 85 and 87 or the sleeves 76 and 78 are brought into contact with the inner surface 11 or the outer surface 13 of the unfolded cuff edge 107 or 109 or the sleeve opening end edge 84 or 86 and the corresponding portions of the cuffs 85 and 87 or the sleeves 76 and 78. It is understood that the folding back of a cuff edge 107 or 109 or a sleeve opening end edge 84 or 86 could be performed such that the inner surface 11 would be exposed along the fold.

The materials used for the cuffs 85 and 87 may be the same as the materials used for the other portions of the garment 10. In some embodiments, it is desirable that the materials used for the cuffs 85 and 87 have an elastic element such that the cuffs 85 and 87 will conform to the portion of the wearer's arms that come into contact with the cuffs 85 and 87.

The fabric webs 16 and 18 include a pair of opposing web side edges 21 and 31. A repeating series of pairs of opposing indentations 69 and 71 are cut by the die cutter 45 into the web side edges 21 and 31, respectively, of the fabric webs 16 and 18, respectively (or, alternatively, the web side edges 46 and 47 of the web of fabric 15). (See FIG. 1). The location of the pairs of opposing indentations 69 and 71 corresponds to the garment side edges 22 and 24, and 32 and 34, and the sleeve side edges 81 and 88, and 83 and 91, of the finished garment 10. The opposing indentations 69 and 71 may be produced by a die cut operation, an ultrasonic operation, or any other suitable method of operation. In addition, the opposing indentations 69 and 71 may be cut into the web side edges 46 and 47 of the web of fabric 15 prior to the web of fabric 15 being cut into the fabric webs 16, 17, and 18 or after the web of fabric 15 is cut into the fabric webs 16, 17, and 18.

The pairs of opposing indentations 69 and 71 may take on a variety of sizes and shapes, such as oval, triangular, square, rectangular, multi-faceted, asymmetric or irregular, or the like. The pattern of the opposing indentations 69 and 71 is restricted only by fashion and the minimum amount of the fabric webs 16 and 18 (or, alternatively, the web of fabric 15) that must remain having a sufficient integrity to withstand the remaining steps or operations of the process of manufacture. The indentations 69 and 71 may be similar or dissimilar in shape, structure, size, and the like from each other within the finished garment 10.

In some embodiments, the operation of cutting the pairs of opposing indentations 69 and 71 into the side edges 21 and 31 of the fabric webs 16 and 18 (or, alternatively, the web side edges 46 and 47 of the web of fabric 15) may be eliminated. The material to be removed from the opposing indentations 69 and 71 may be removed by any method known in the art, desirably a vacuum source (not shown). As the pattern of the garment 10 is restricted only by fashion and the minimum amount of the fabric webs 16 and 18 (or, alternatively, the web of fabric 15) that must remain having a sufficient integrity to withstand the operations or steps of the process of manufacture, one can simply design the garment 10 such that this operation of cutting the opposing indentations 69 and 71 into the fabric webs 16 and 18 (or, alternatively, the web of fabric 15) is not required.

The fabric webs 16, 17, and 18 are folded by a folder 43 so as to bring together the opposing garment end portions 62 and 64 of the garment 10 such that the garment side edge 22 of the front panel 20 and the garment side edge 32 of the back panel 30 are brought together. The folding operations are desirably carried out by tuckers and folders, as well as any other known means. The folding operations also bring together the garment side edge 24 of the front panel 20 and the garment side edge 34 of the back panel 30. The mating of the garment side edge 22 and the garment side edge 32 as well as t he mating of the garment side edge 24 and the garment side edge 34 form the garment side seams 40 and 42, respectively, of the garment 10. It may be desirable to redirect (or reorient) the garment-sized piece 19 of the fabric webs 16, 17, and 18 to allow easy bonding of the garment side seams 40 and 42 of the garment 10. Each discrete garment-sized piece 19 of the web of fabric 15 (or, alternatively, the fabric webs 16, 17, and 18) is transported, typically by vacuum screens, belts, or conveyors, through hemming, folding, and fastening operations (not shown). The turning operations are desirably carried out by turn rolls and turn tables, as well as any other known means. The garment-sized piece 19 of the fabric webs 16, 17, and 18 may be reoriented 90 degrees (not shown).

In various embodiments of the present invention, one or both of the garment side seams 40 and 42 may be constructed as non-refastenable seams or as refastenable seams. Any excess fabric webs 16 and 18 may be removed from the edges of the garment side seams 40 and 42 to reduce and smooth out the garment side seams 40 and 42. The non-refastenable garment side seams 40 and 42 may be formed by any suitable means such as ultrasonic sealing, adhesive bonding, tape, heat sealing, sewing, or the like. (Sewing equipment 119 is shown in FIG. 1). The non-refastenable garment side seams 40 and 42 may be constructed on a continuous or intermittent basis. One suitable method of forming such garment side seams 40 and 42 is disclosed in U.S. Pat. No. 4,938,753 issued Jul. 3, 1990, to Van Gompel et al., which is incorporated herein by reference.

In other embodiments of the present invention, one or both of the garment side seams 40 and 42 may be refastenable. Refastenable means for securing the garment side edges 22 and 32 and the garment side edges 24 and 34 of the garment 10 include refastenable adhesive and mechanical type fasteners 95. The adhesive and mechanical type fasteners 95 include buttons and button holes, snaps, buckles, clasps, hooks and loops, end extensions, tabs, and the like which are designed or adapted to interlock or engage some type of complimentary device or the inner surface 11 or outer surface 13 of the garment 10.

In addition, elasticized fasteners 95 may also be used in assuring better fit of the garment 10. If the garment 10 includes refastenable garment side seams 40 and 42, the refastenable means are desirably strategically placed on the fabric webs 16 and 18 before the fabric webs 16, 17, and 18 are cut into discrete garment-sized pieces 19. The folding and redirection operations may be eliminated when refastenable garment side seams 40 and 42 are included in the garment 10. However, there may be packaging reasons for which one would still carry out these two steps.

The garment side seams 40 and 42 of the present invention may take on a variety of structures or configurations known in the art. One embodiment of the garment side seams 40 and 42 is an out-turned configuration as illustrated in FIG. 16. Such configured garment side seams 40 and 42 are formed by securing together at least a portion of the out-turned portions of the garment side edges 22 and 32 and the garment side edges 24 and 34, respectively. The inner surface 11 of the garment side edges 22 and 24 of the front panel 20 and the garment side edges 32 and 34 of the back panel 30, respectively, are brought into contact with each other, respectively.

Another embodiment of the garment side seams 40 and 42 is an in-turned configuration as illustrated in FIG. 17. Such configured garment side seams 40 and 42 are formed by securing together at least a portion of the in-turned portions of the garment side edges 22 and 32 and the garment side edges 24 and 34, respectively. The outer surface 13 of the garment side edges 22 and 24 of the front panel 20 and the garment side edges 32 and 34 of the back panel 30 are brought into contact with each other, respectively.

Another embodiment of the garment side seams 40 and 42 is an over-lapped configuration as illustrated in FIG. 15. Such configured garment side seams 40 and 42 are formed by securing together at least a portion of the over-lapped portions of the garment side edges 22 and 32 and the garment side edges 24 and 34, respectively. The inner surface 11 of one of the garment side edges 22 and 32 and one of the garment side edges 24 and 34 are brought into contact with the outer surface 13 of the other garment side edge of each pair of garment side edges.

Another embodiment of the garment side seams 40 and 42 is an over-lapped configuration as illustrated in FIG. 18. Such a configured garment side seam 40 is formed by folding the garment side edge 22 or the garment side edge 32. The outer surface 13 of the folded portion and the inner surface 11 of the unfolded portion of the garment side edge 22 or the garment side edge 32 and the corresponding portion of the front panel 20 or the back panel 30, respectively, are brought into contact with the inner surface 11 or the outer surface 13 of the non-folded garment side edges 32 or the garment side edges 22 and the corresponding portion of the back panel 30 or the front panel 20.

The garment side seam 42 is formed by folding back the garment side edges 24 or the garment side edge 34. The outer surface 13 of the folded portion and the inner surface 11 of the unfolded portion of the garment side edges 24 or the garment side edge 34 and the corresponding portion of the front panel 20 or the back panel 30, respectively, are brought into contact with the inner surface 11 or the outer surface 13 of the non-folded garment side edge 34 or the garment side edge 24 and the corresponding portion of the back panel 30 or the front panel 20. It is understood that the folding back of a garment side edge 22, 24, 32, or 34 could be performed such that the inner surface 11 would be exposed along the fold.

The garment end portions 62 and 64 of the discrete garment-sized pieces 19 of the fabric webs 16 and 18 may be hemmed in the finished garment 10. The garment end portions 62 and 64 may be hemmed by any method or style known in the art. In some embodiments, it may be desirable to leave the garment end portions 62 and 64 unhemmed. The garment bottom edges 26 and 36 of the discrete garment-sized pieces 19 of the fabric webs 16 and 18 may be hemmed in the finished garment 10. The garment bottom edges 26 and 36 can be hemmed by any method or style known in the art. In some embodiments, it may be desirable to leave the garment end edges 26 and 36 unhemmed.

The folding of the fabric webs 16, 17, and 18 (or, alternatively, the discrete garment-sized piece 15) also brings the sleeve side edges 81 and 83 of the sleeve 76 together and the sleeve side edges 88 and 91 of the sleeve 78 together. The mating of the sleeve side edges 81 and 83 and the sleeve side edges 88 and 91 form the sleeve seams 93 and 97, respectively, of the sleeves 76 and 78, respectively.

It may be desirable to redirect (or reorient) the discrete garment-sized pieces 19 to allow easy fastening of the sleeve seams 93 and 97 of the sleeves 76 and 78, respectively, of the garment 10. The turning operations are desirably carried out by turn rolls and turn tables, as well as any other known means. The discrete garment-sized pieces 19 may be reoriented 90 degrees (not shown). The sleeve seams 93 and 97 can be non-refastenable seams or refastenable seams. Any excess material of the fabric of the sleeve seams 93 and 97 can be removed from the edges of the sleeve seams 93 and 97 to reduce and smooth out the sleeve seams 93 and 97. The non-refastenable sleeve seams 93 and 97 may be formed by any suitable means such as ultrasonic sealing, adhesive bonding, tape, heat sealing, sewing, or other methods of fastening as known in the art, as discussed above. The non-refastenable sleeve seams 93 and 97 may be constructed on a continuous or intermittent basis.

In other embodiments, the opposing pair of the sleeve side edges 81 and 83 and the opposing pair of the sleeve side edges 88 and 91 of the sleeves 76 and 78, respectively, may be held together in the finished garment 10 to form refastenable sleeve seams 93 and 97. The refastenable means for securing the opposing pair of the sleeve side edges 81 and 83 and the opposing pair of the sleeve side edges 88 and 91 of the sleeves 76 and 78, respectively, include refastenable adhesive and mechanical type fasteners 95. The adhesive and mechanical type fasteners 95 include buttons and button holes, snaps, buckles, clasps, hooks and loops, end extensions, tabs, tape, and the like which are designed or adapted to interlock or engage some type of a complementary device or the inner surface 11 or the outer surface 13 of the garment 10. The refastenable sleeve seams 93 and 97 may be constructed on a continuous or intermittent basis.

In addition, elasticized fasteners 95 may also be used in assuring better fit of the sleeves 76 and 78 of the garment 10. If the garment 10 includes refastenable sleeve seams 93 and 97, the refastenable means id desirably strategically placed on the sleeves 76 and 78 before or after the fabric webs 16 and 18 are cut into the discrete garment-sized pieces 19. The folding and redirection operations may be eliminated when refastenable sleeve seams 93 and 97 are included in the garment 10. However, there may be packaging reasons for which one would still carry out these two steps.

The sleeve seams 93 and 97 of the present invention may take on a variety of structures or configurations known in the art. One embodiment of the sleeve seams 93 and 97 is an out-turned configuration as illustrated in FIG. 16. Such configured sleeve seams 93 and 97 are formed by securing together at least a portion of the out-turned portions of the sleeve side edges 81 and 83 and the sleeve side edges 88 and 91 of the sleeves 76 and 78, respectively. The inner surface 11 of the sleeve side edges 81 and 83 and the sleeve side edges 88 and 91 of the sleeves 76 and 78, respectively, are brought into contact with each other of the pair.

Another embodiment of the sleeve seams 93 and 97 is an in-turned configuration as illustrated in FIG. 17. Such configured sleeve seams 93 and 97 are formed by securing together at least a portion of the in-turned portions of the sleeve side edges 81 and 83 and the sleeve side edges 88 and 91 of the sleeves 76 and 78, respectively. The outer surface 13 of the sleeve side edges 81 and 83 and the sleeve side edges 88 and 91 of sleeves 76 and 78, respectively, are brought into contact with each other.

Another embodiment of the sleeve seams 93 and 97 is an over-lapped configuration as illustrated in FIG. 15. Such configured sleeve seams 93 and 97 are formed by securing together at least a portion of the over-lapped portions of the sleeve side edges 81 and 83 and the sleeve side edges 88 and 91 of the sleeves 76 and 78, respectively. The inner surface 11 of one of the sleeve side edges 81 or 83 and the sleeve side edges 88 or 91 of the sleeves 76 and 78 are brought into contact with the outer surface 13 of the other sleeve side edge 81 or 83 and the sleeve side edge 88 or 91 of the sleeve 76 and 78, respectively.

Another embodiment of the sleeve seams 93 and 97 is an over-lapped configuration as illustrated in FIG. 18. Such configured sleeve seams 93 and 97 are formed by folding back the sleeve side edge 81 or 83 and the sleeve side edge 88 or 91 of the sleeves 76 and 78, respectively. The outer surface 13 of the folded portions and the inner surface 11 of the unfolded portions of the sleeve side edge 81 or 83 and the sleeve side edge 88 or 91 and the corresponding portions of the sleeves 76 and 78, respectively, are brought into contact with the inner surface 11 or the outer surface 13 of the non-folded sleeve side edge 81 or 83 and the sleeve side edge 88 or 91 and the corresponding portions of the sleeves 76 and 78, respectively. It is understood that the folding back of the sleeve side edge 81, 83, 88, or 91 could be performed such that the inner surface 11 would be exposed along the fold.

In various embodiments of the present invention, the front panel 20, the back panel 30, or both panels 20 and 30 may be cut or otherwise opened to form a slit 57 or 65 (shown in FIG. 5) such as a placket. The slits 57 and 65 may be produced by a die cut operation, an ultrasonic operation, or any other suitable means. The slit 57 has two edges 58 and 59. The slit 65 has two edges 66 and 67. The slits 57 and 65 of the front and back panels 20 and 30, respectively, may extend from the edge 92 of the neck opening 90 to the garment bottom edges 26 and 36, respectively. In the alternative, the slits 57 and 65 may extend over only a portion of the panels 20 and 30 between the edge 92 of the neck opening 90 to the garment bottom edges 26 and 36, respectively. When the garment 10 comprises both a slit 57 in the front panel 20 and a slit 65 in the back panel 30, the slits 57 and 65 may be similar or dissimilar in size, structure, shape, and the like.

In some embodiments, the edges 58 and 59 of the slit 57 and the edges 66 and 67 of the slit 65 may be refastenably attached or secured to each other. The edges 58 and 59 may be secured together to form the front seam 113. The edges 66 and 67 may be secured together to form the back seam 114. Various fastening means, such as adhesive or mechanical type fasteners 95, see the discussion above, may be used to refastenably 30 attach or secure the edges 58 and 59 and the edges 66 and 67 together of the slits 57 and 65, respectively.

Figure 6:
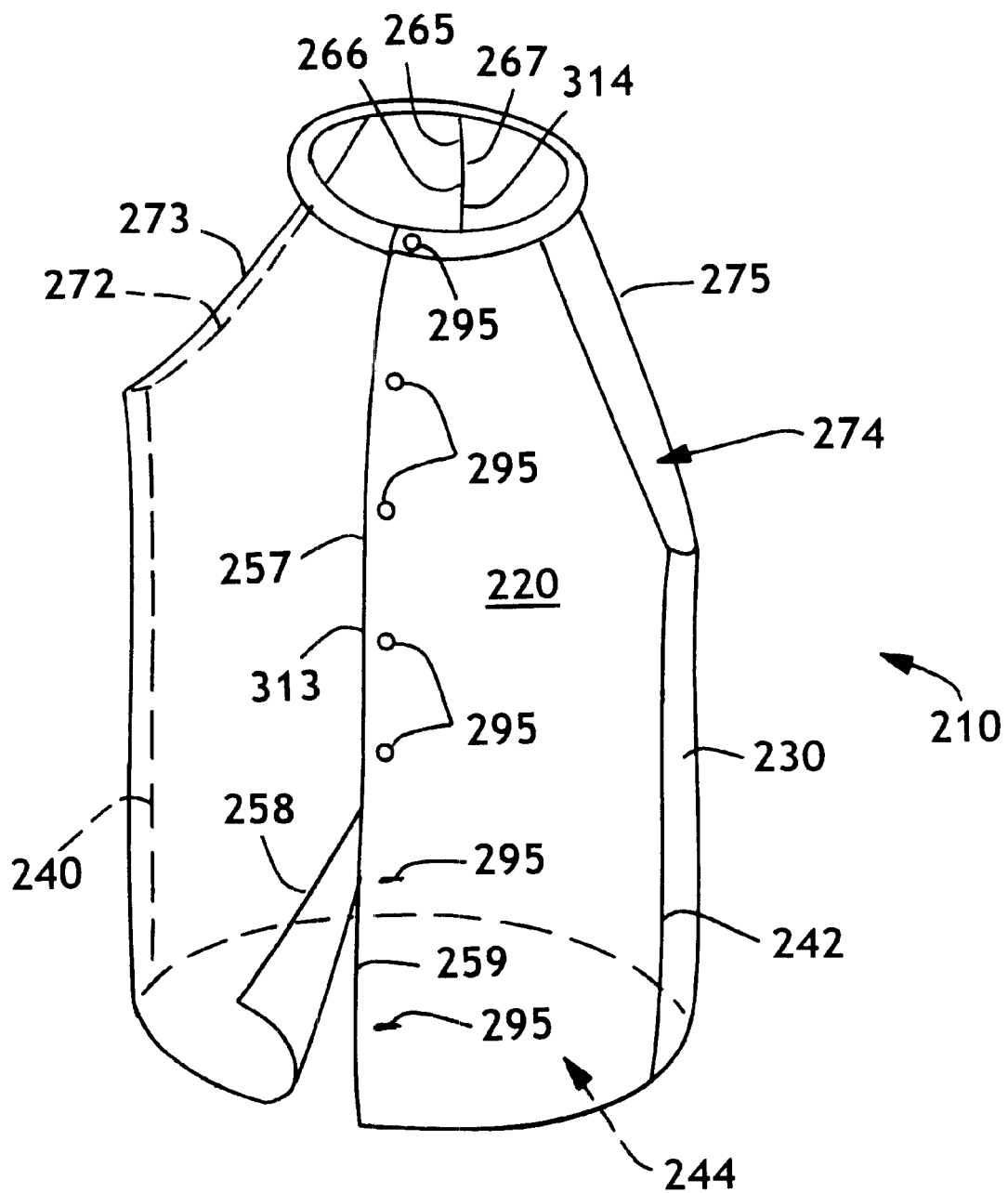
FIG. 6 is a perspective view of the front of a garment made by the present invention.
Figure 7:
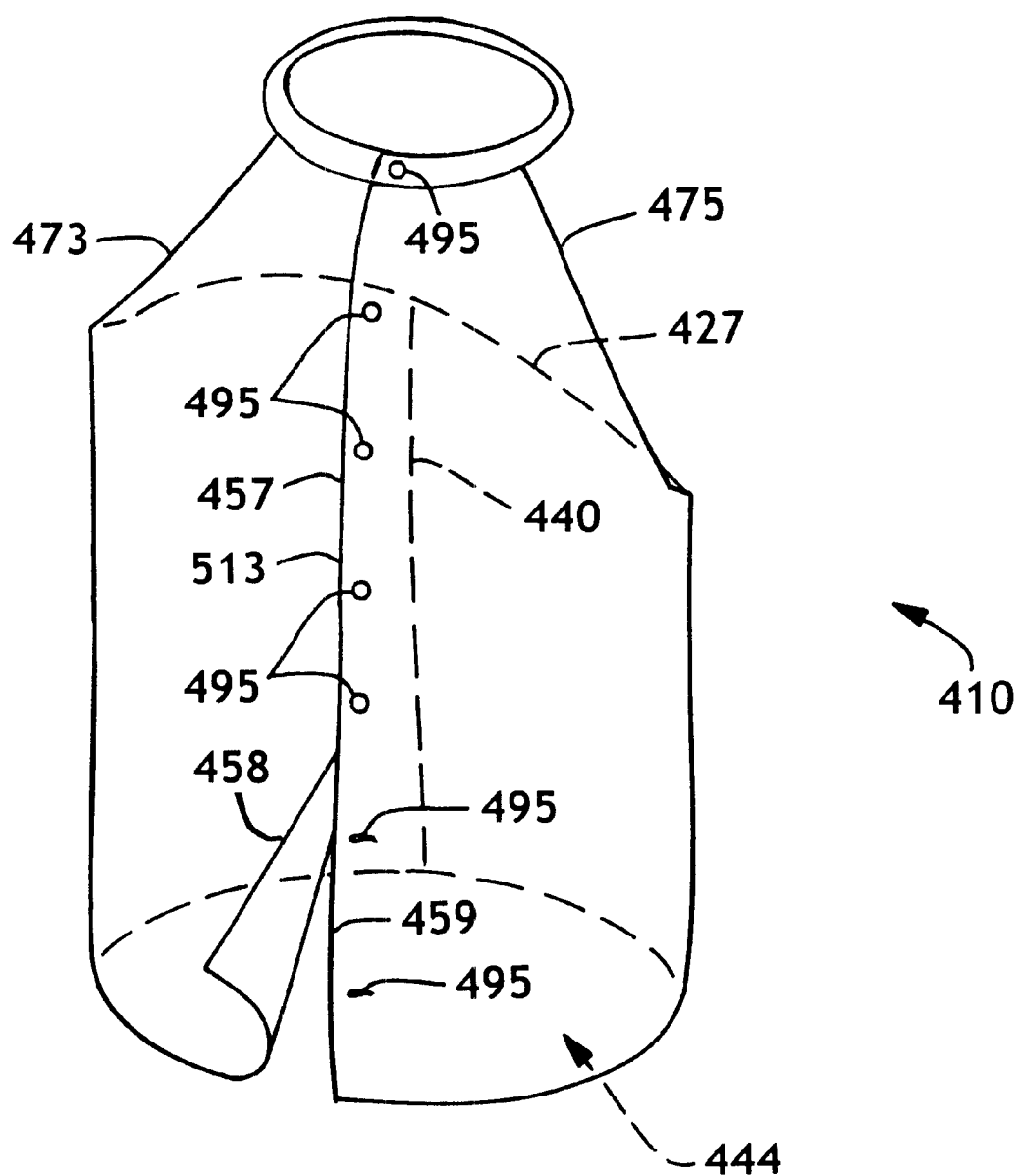
FIG. 7 is a perspective view of the front of a garment made by the present invention.
Figure 8:
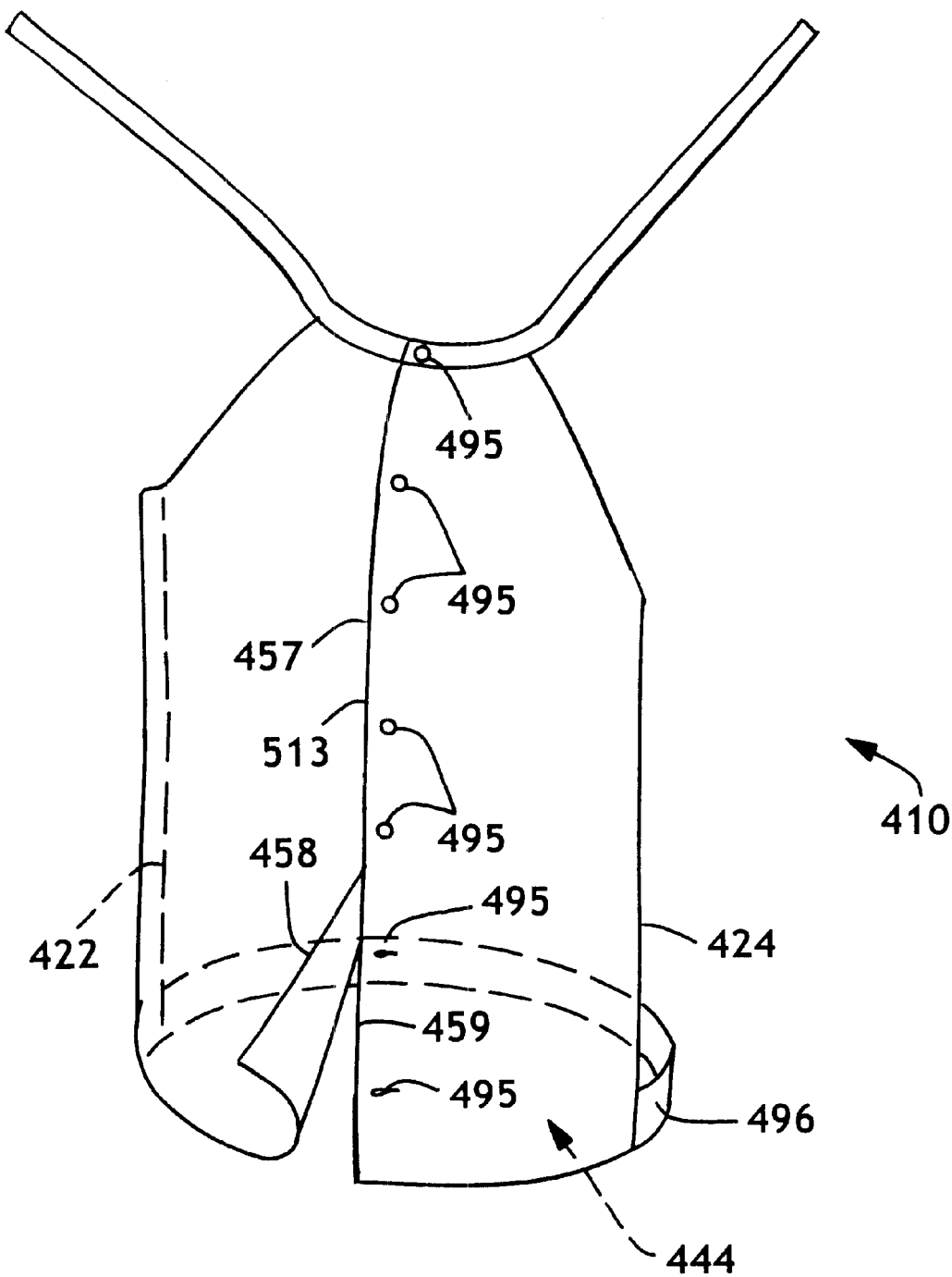
FIG. 8 is a perspective view of the front of a garment made by the present invention.
Figure 11:
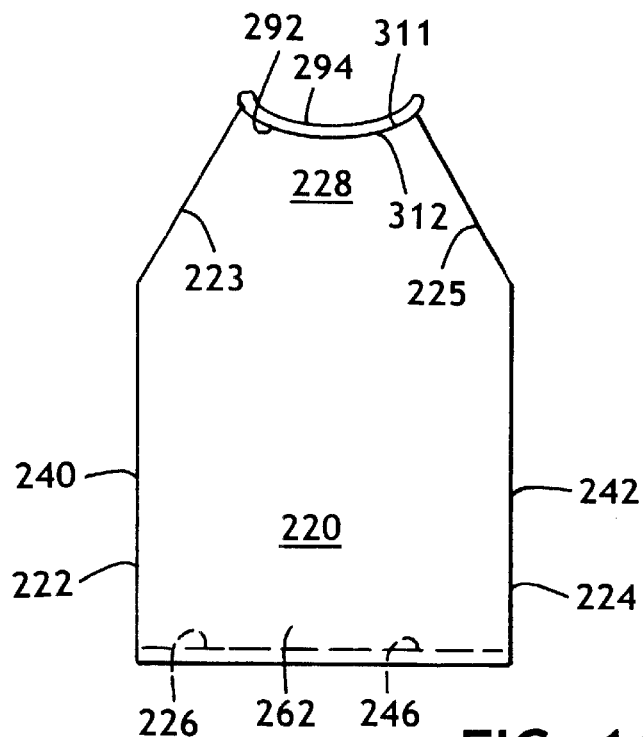
FIG. 11 is a front plan view of a garment made by the present invention in a post-assembled flat configuration.
Figure 12:
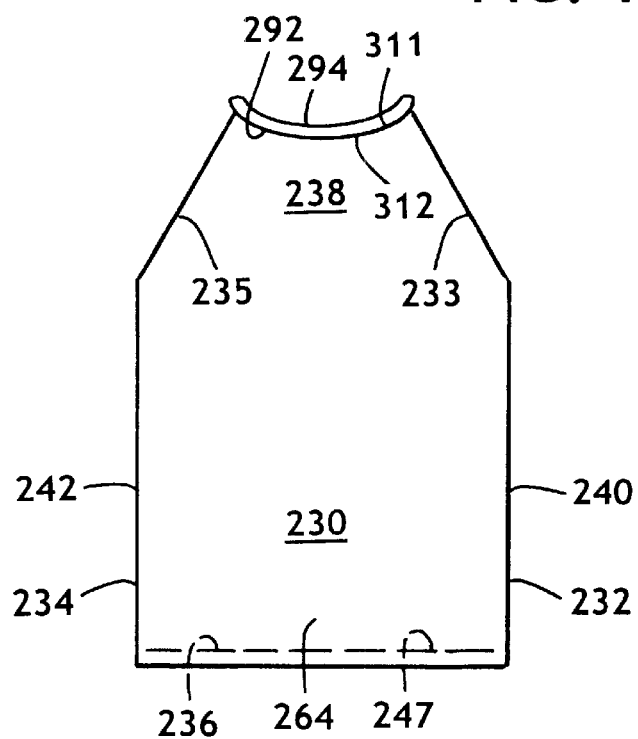
FIG. 12 is a back plan view of a garment made by the present invention in a post-assembled flat configuration.
Figure 13:
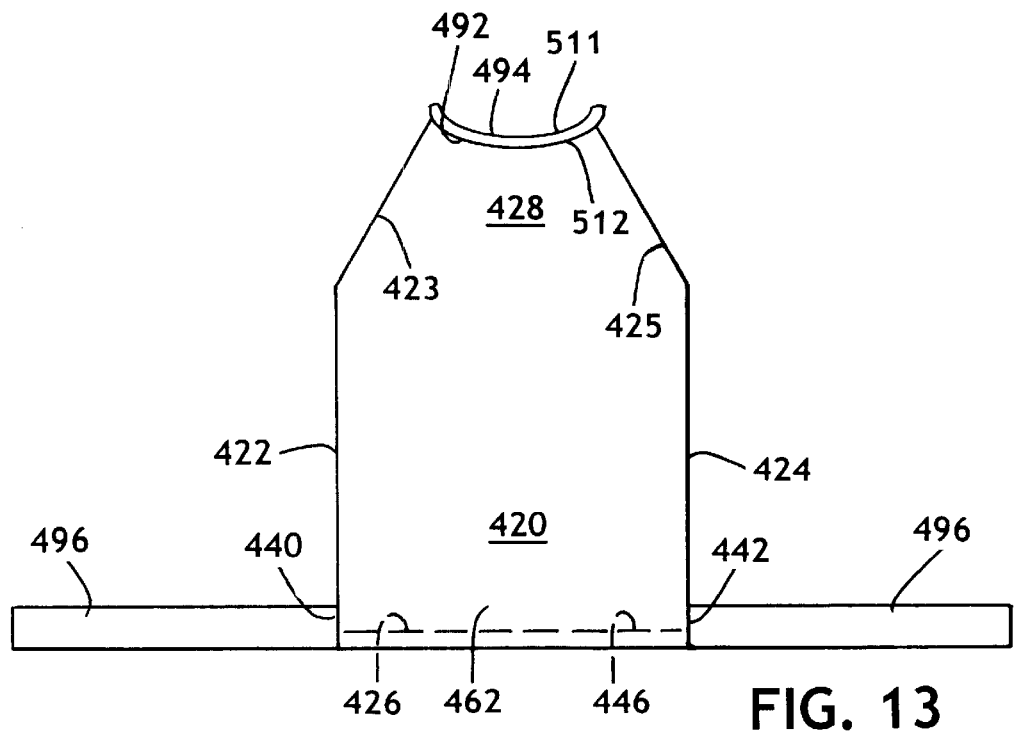
FIG. 13 is a front plan view of a garment made by the present invention in a post-assembled flat configuration.
Figure 14:
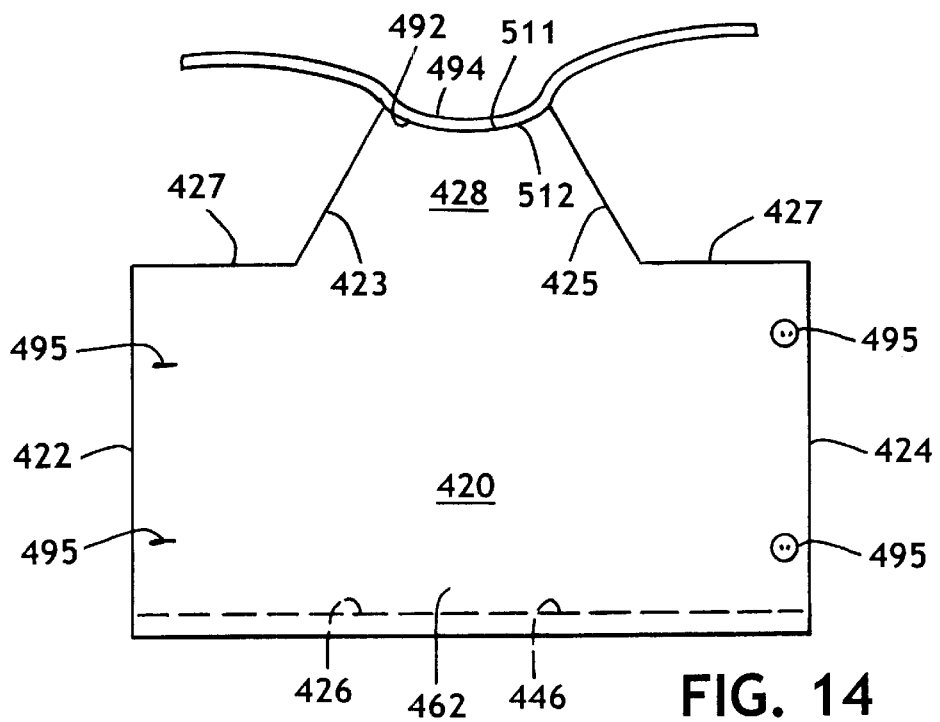
FIG. 14 is a front plan view of a garment made by the present invention in a post-assembled flat configuration.

In another embodiment of the present invention, see FIGS. 6, 11, and 12, the garment 210 desirably comprises a front panel 220 and a back panel 230. The front panel 220 has a pair of garment side edges 222 and 224, a garment bottom edge 226, a pair of shoulder side edges 223 and 225, and a shoulder region 228 positioned between the shoulder side edges 223 and 225. The back panel 230 has a pair of garment side edges 232 and 234, a garment bottom edge 236, a pair of shoulder side edges 233 and 235, and a shoulder region 238 positioned between the shoulder side edges 233 and 235.

The garment side edge 222 is joined to the garment side edge 232 to form the garment side seam 240. The garment side edge 224 is joined to the garment side edge 234 to form the garment side seam 242.

The embodiments of the garments 210 do not include sleeves. The shoulder side edges 223, 233, 225, and 235, more specifically, the arm opening edges 273 and 275 defining the arm openings 272 and 274, may be hemmed. For easier manufacture, the shoulder side edges 223, 233, 225, and 235 (or, alternately, the arm opening edges 273 and 275) may be left unhemmed, facilitating easy machine cutoff.

A neck opening 290, defined about its perimeter by an edge 292, is located in at least one of the shoulder regions 228 and 238. The neck opening 290 is typically centered between the shoulder side edges 223, 225, 233, and 235, although such placement of the neck opening 290 is not required. The neck opening 290 may take on a variety of sizes and shapes, such as circular, oval, triangular, square, rectangular, multi-faceted, asymmetric or irregular, or the like. While the placement of the neck opening 290 may be symmetrical between the shoulder regions 228 and 238, as well as between the shoulder side edges 223, 225, 233, and 235, typically, the placement of the neck opening 290 is configured so that a larger portion of the neck opening 290 is located within the front shoulder region 228.

Additionally, while the shape of the neck opening 290 may be symmetrical, typically, the shape of the neck opening 290 is asymmetrical as dictated by fashion and comfort. In some embodiments of the garment 210, the edge 292 of the neck opening 290 may be hemmed. For easier manufacture, the edge 292 of the neck opening 290 may be left unhemmed, facilitating easy machine cutoff.

Various styles of a collar 294 may also be attached to the edge 292 of the neck opening 290. The attachment of the collar 294 may be made non-refastenable by means as discussed above. In the alternative, the attachment of the collar 294 may be made refastenable by means as discussed above. The collars 294 include, but are not limited to, turtlenecks, mock turtlenecks, cowls, shirt collars, tee-shirt shirt ribbed edging, decorative edging, and the like known in the garment industry.

The garment bottom edges 226 and 236 of the garment 210 may also be hemmed. For easier manufacture, the garment bottom edges 226 and 236 of the garment 210 may be left unhemmed, facilitating easy machine cutoff.

The front panel 220, the back panel 230, or both may be cut or otherwise opened to form a slit 257 or 265, respectively (shown in FIG. 6) such as a placket. The garment 210, including one or both slits 257 and 265, can be used as a wrap gown, robe, or the like. The slit 257 includes two edges 258 and 259. The slit 265 includes two edges 266 and 267. Various fastening means, such as adhesive and mechanical type fasteners 295, see the discussion below, may be used to refastenably attach or secure the edges 258 and 259 or the edges 266 and 267 together to form reclosable or refastenable garments 210. The slits 257 and 265 of the front and back panels 220 and 230, respectively, may extend from the edge 292 of the neck opening 290 to the garment bottom edges 226 and 236, respectively. In the alternative, the slits 257 and 265 may extend over only a portion of the panels 220 and 230 between the edge 292 of the neck opening 290 to the garment bottom edges 226 and 236, respectively. When the garment 210 comprises both a slit 257 in the front panel 220 and a slit 265 in the back panel 230, the slits 257 and 265 may be similar or dissimilar in size, structure, shape, and the like. It is understood that the term 'similar' as used herein is interpreted to include identical and varying levels of similarity. It is also understood that the term 'dissimilar' as used herein is interpreted to include different and varying levels of dissimilarity.

Another embodiment of the present invention is a continuous process for the manufacture of a garment 210 (see FIG. 2) for wearing about the upper body comprising at least a front panel 220, a back panel 230, a neck opening 290 defined about its perimeter by edge 292, arm openings 272 and 274 defined about their perimeters by arm opening edges 273 and 275, respectively, a lower body opening 244 defined about its perimeter by garment bottom edges 226 and 236. The garment 210 comprises an inner surface 211 and an outer surface 213. The garment 210 may comprise a single layer web of fabric 215 or may comprise a multi-layer laminate web of fabric 215. In some embodiments, the garment 210 may comprise multiple layers of the web of fabric 215. The web of fabric 215 may be made up of multiple webs of fabric positioned in side by side alignment or other arrangements to make up a web of fabric 215. The present invention requires at least one web of fabric 215 in a single continuous process to create the garments 210.

Other embodiments of the present invention may include two fabric webs 216 and 218 in a single continuous process to create the garments 210. The fabric webs 216 and 218 may be made of the similar or dissimilar material to each other. The fabric webs 216 and 218 may be the result of cutting or otherwise severing the web of fabric 215. In other embodiments, various combinations of webs of fabric, overall having sufficient width of fabric to make the garments 210, may be used to provide the fabric webs 216 and 218. It is understood in the discussion above of the web of fabric 215, that the description of the web of fabric 215 also applies to the fabric webs 216 and 218 as well in the present invention.

In one embodiment of the present invention (see FIG. 2), one web of fabric 215 of sufficient width of fabric to make the garment 210 is provided to produce the garments 210. The desired web of fabric 215 is a nonwoven although any disposable or washable fabric may be used. (See the discussion above for the web of fabric 15). The web of fabric 215 is typically unwound from a roll or other source (not shown).

The web of fabric 215 includes a pair of opposing web side edges 246 and 247. The web of fabric 215 is cut or otherwise severed by a die cutter 214 into two separate fabric webs 216 and 218. (See FIG. 2). The cutting operation may be accomplished by a die cut operation, an ultrasonic operation, or any other suitable method of operation. In other embodiments, two fabric webs 216 and 218 may be provided separately.

The fabric web 216 includes a web side edge 221 which may in some embodiments correspond to the web side edge 246 of the web of fabric 215, the side edges 227, the edges 229, and the shoulder side edges 223 and 225 as well as an inner surface 211 and an outer surface 213. It is understood that while the web side edge 246 of the web of fabric 215 may typically become the web side edge 221 of the fabric web 216, fabric may be removed from or added to the web side edge 246 to create the web side edge 221. The fabric web 216 may be cut into other shapes having an overall appearance of the connected octagonal shapes including straight, curved, multi-faceted, asymmetric or irregular shoulder side edges 223 and 225, edges 229, and side edges 227.

In addition, the shape of the edges 229, the side edges 227, and the shoulder side edges 223 and 225 of the fabric web 216 may be different from each other or from any combination of the edges 229, the side edges 227, and the shoulder side edges 223 and 225. The portion of the connected octagonal shape of the fabric web 216 may take on a variety of sizes as well. In addition, the length of the shoulder side edges 223 and 225, the side edges 227, and the edges 229 of the fabric web 216 may be different from each other or from any combination of the shoulder side edges 223 and 225, the side edges 227, and the edges 229. The pattern of the material of the fabric web 216 is restricted only by fashion and the minimum amount of material of the fabric web 216 that is necessary to complete the remaining steps or operations of the process of manufacture.

The fabric web 218 includes a web side edge 231 which may in some embodiments correspond to the web side edge 247 of the web of fabric 215, the side edges 237, the edges 239, and the shoulder side edges 233 and 235 as well as an inner surface 211 and an outer surface 213. It is understood that while the web side edge 247 of the web of fabric 215 may typically become the web side edge 231 of the fabric web 218, fabric may be removed from or added to the web side edge 247 to create the web side edge 231. The shape formed by the side edges 237, the edges 239, and the shoulder side edges 233 and 235 of the fabric web 218 together typically form a shape complementary to the shape formed by the edges 229, the side edges 227, and the shoulder side edges 225 and 223 of the fabric web 216, respectively.

Figure 33:
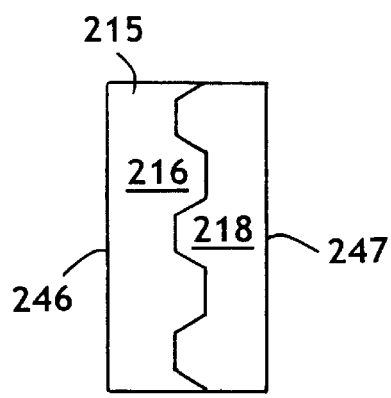
FIG. 33 is a top plan view of a web of fabric.

As discussed above, in the preferred embodiment of the present invention, the side edges 237, the edges 239, and the shoulder side edges 233 and 235 of the fabric web 218 form a portion of repeating connected octagonal shapes complimentary to the shape of the fabric web 216. The fabric webs 216 and 218 may be cut from one web of fabric 215 in a nested or a non-nested arrangement. (See FIGS. 2 and 33). It is also understood that while the shape of the fabric web 218 is complementary to the shape of the fabric web 216, the shapes of the fabric webs 216 and 218 may be similar or dissimilar, complementary or not to each other. In other embodiments, the fabric web 218 may be cut into other shapes having an overall appearance of the connected octagonal shapes including straight, curved, multi-faceted, asymmetric or irregular shoulder side edges 233 and 235, edges 239, and side edges 237.

In addition, the shape of the edges 239, the side edges 237, and the shoulder side edges 233 and 235 of the fabric web 218 may be different from each other or from any combination of the edges 239, the side edges 237, and the shoulder side edges 233 and 235. The portion of the connected octagonal shape of the fabric web 218 may take on a variety of sizes as well. In addition, the length of the shoulder side edges 233 and 235, the side edges 237 and the edges 239 of the fabric web 218 may be different from each other or from any combination of the shoulder side edges 233 and 235, the side edges 237, and the edges 239. The pattern of the material of the fabric web 218 is restricted only by fashion and the minimum amount of material of the fabric web 218 that is necessary to complete the remaining steps or operations of the process of manufacture.

The opposing web side edges 246 and 247 of the web of fabric 215, in the preferred embodiment, become the garment bottom edges 226 and 236, respectively, of the finished garment 210. It is understood that while the web side edges 246 and 247 of the web of fabric 215 may typically become the garment bottom edges 226 and 236, respectively, in the finished garment 210, fabric may be removed from or added to the web side edges 246 and 247 of the web of fabric 215 forming the garment bottom edges 226 and 236, respectively, in the finished garment 210. The resulting garment bottom edges 226 and 236 so formed are then proximate the web side edges 246 and 247 of the web of fabric 215.

Alternatively, the web side edges 221 and 231 of the fabric webs 216 and 218, respectively, in the preferred embodiment, become the garment bottom edges 226 and 236, respectively, of the finished garment 210. It is understood that while the web side edges 221 and 231 of the fabric webs 216 and 218, respectively, may typically become the garment bottom edges 226 and 236, respectively, in the finished garment 210, fabric may be removed from or added to the web side edges 221 and 231 of the fabric webs 216 and 218, respectively, forming the garment bottom edges 226 and 236, respectively, in the finished garment 210.

The web of fabric 215 is cut into discrete garment-sized pieces 219 by a die cutter 245. In some embodiments of the present invention, the web of fabric 215 is cut into the two fabric webs 216 and 218 prior to being cut into discrete garment-sized pieces 219. In other embodiments of the present invention, the web of fabric 215 is cut into discrete garment-sized pieces 219 prior to the web of fabric 215 being cut into the two fabric webs 216 and 218. The fabric webs 216 and 218 are then combined to form the discrete garment-sized pieces of fabric 219. In other embodiments, the two fabric webs 216 and 218 are provided as separate webs of fabric.

Each discrete garment-sized piece 219 contains at least an opening 289, one pair of opposing garment side edges 222 and 224, one pair of opposing garment side edges 232 and 234, and opposing garment end portions 262 and 264. The cutting operation may be accomplished by a die cut operation, an ultrasonic operation, or any other suitable method of operation. The location of the opposing garment end portions 262 and 264 corresponds to the garment bottom edge 226 of the front panel 220 and the garment bottom edge 236 of the back panel 230, respectively, in the finished garment 210. Each discrete garment-sized piece 219 of the fabric webs 216 and 218 is transported, typically by vacuum screens, belts, or conveyors, through hemming, folding, and fastening operations.

The edges 229 of the fabric web 216 may be attached to the edges 239 of the fabric web 218, respectively. The attachment of the edges 229 of the fabric web 216 to the edges 239 of the fabric web 218 form seams 342.

In various embodiments of the present invention, the seams 342 can be constructed as non-refastenable seams or as refastenable seams. Any excess material of the fabric webs 216 or 218 may be removed from the edges of the seams 342. The non-refastenable seams 342 may be formed by any suitable means such as ultrasonic sealing, adhesive bonding, tape, heat sealing, sewing, or any method of fastening known in the art. The seams 342 may be constructed on a continuous or intermittent basis. One suitable method of forming such seams 342 is disclosed in U.S. Pat. No. 4,938,753 issued Jul. 3, 1990, to Van Gompel et al., which is incorporated herein by reference. The seams 342 may be bonded together to form non-refastenable seams 342.

In other embodiments of the present invention, the edges 229 and 239 may be held together in the finished garment 210 to form refastenable seams 342, respectively. The refastenable means for securing the edges 229 and 239 of the garment 210 include refastenable adhesive and mechanical type fasteners 295. The adhesive and mechanical type fasteners 295 include buttons and button holes, snaps, buckles, clasps, hooks and loops, end extensions, tabs, tape, and the like which are designed or adapted to interlock or engage some type of a complimentary device or the outer surface 213 or the inner surface 211 of the garment 210.

In addition, elasticized fasteners 295 may also be used in assuring better fit of the garment 210. If the garment 210 includes refastenable seams 342, the refastenable means are desirably strategically placed on the web of fabric 215 (or, alternatively, the fabric webs 216 or 218) before the web of fabric 215 (or, alternatively, the fabric webs 216 and 218) is cut into discrete garment-sized pieces 219.

Figure 22:
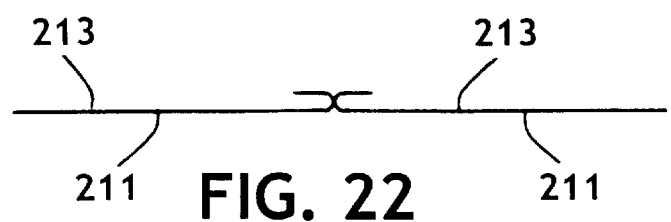
FIG. 22 is a cross sectional view of a seam.

The seams 342 of the present invention may take on a variety of structures or configurations known in the art. The seams 342 may be configured the same as each other or different from each other. One embodiment of the seams 342 is an out-turned configuration as illustrated in FIG. 22. Such configured seams 342 are formed by securing together at least a portion of the out-turned portions of the edges 229 and 239, respectively, of the garment 210. The inner surface 211 of the edges 229 are brought into contact with the inner surface 211 of the edges 239.

Figure 23:
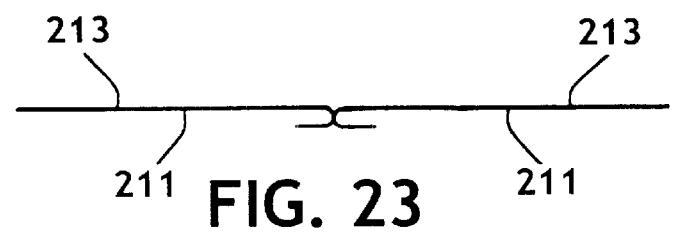
FIG. 23 is a cross sectional view of a seam.

Another embodiment of the seams 342 is an in-turned configuration as illustrated in FIG. 23. Such configured seams 342 are formed by securing together at least a portion of the in-turned portions of the edges 229 and 239 of the garment 210. The outer surface 213 of the edges 229 is brought into contact with the outer surface 213 of the edges 239.

Figure 21:
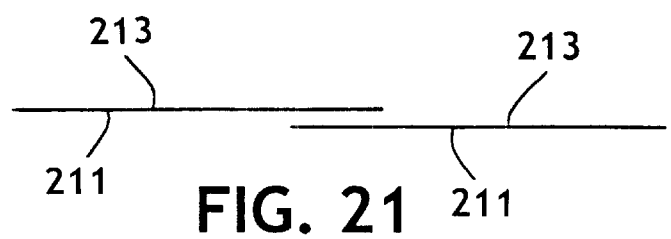
FIG. 21 is a cross sectional view of a seam.

Another embodiment of the seams 342 is an over-lapped configuration as illustrated in FIG. 21. Such configured seams 342 are formed by securing together at least a portion of the over-lapped portions of the edges 229 and the edges 239 of the garment 210. The inner surface 211 of one of the edges 229 and 239 is brought into contact with the outer surface 213 of the other edge 239 or 229.

Figure 24:
FIG. 24 is a cross sectional view of a seam.

Another embodiment of the seams 342 is an over-lapped configuration as illustrated in FIG. 24. Such a configured seam 342 is formed by folding the edge 229 or the edge 239. The outer surface 213 of the folded portion and the inner surface 211 of the unfolded portion of the edge 229 or the edge 239 and the corresponding portion of the fabric web 216 or the fabric web 218, respectively, is brought into contact with the inner surface 211 or the outer surface 213 of the non-folded edge 239 or the edge 229 and the corresponding portion of the fabric web 218 or the fabric web 216. It is understood that the folding back of an edge 229 and 239 could be performed such that the inner surface 211 would be exposed along the fold.

A repeating series of openings 289 is cut by a die cutter 241 into at least one of the fabric webs 216 and 218 (or, alternatively, the web of fabric 215). In some embodiments of the present invention, the openings 289 may be cut into both of the fabric webs 216 and 218, or any combination of the fabric webs 216 and 218. The location of the opening 289 corresponds to the neck opening 290 in the finished garment 210. The openings 289 may be produced by a die cut operation, an ultrasonic operation, or any other suitable method of operation. The material to be removed from the openings 289 may be removed by any method known in the art, desirably a vacuum source (not shown). The opening 289 may take on a variety of sizes and shapes, such as slit, circular, oval, triangular, square, rectangular, multi-faceted, asymmetric or irregular, or the like. The pattern of the opening 289 is restricted only by fashion and the minimum amount of fabric web 216 and/or the fabric web 218 (or, alternatively, the web of fabric 215 or any combination of the fabric webs 216 and 218) that must remain having a sufficient integrity to withstand the remaining steps or operations of the process of manufacture.

In the embodiments of the garment 210 wherein the edges 229 and 239 of the fabric webs 216 and 218,respectively, are not bonded to form seams 342, the opening 289 is formed by attaching the edge 229 of the fabric web 216 and the edge 239 of the fabric web 218 by the attachment of a collar 294. The edges 229 and 239 form the edge 292 of the neck opening 290. In other embodiments where the edges 229 and 239 are not bonded together, an opening 289 may still be cut into at least one of the fabric webs 216 and 218.

The placement of the opening 289 in relation to the shoulder side edges 223, 225, 233, and 235, while in a typical garment 210, the opening 289 is centrally located between or intermediate the shoulder side edges 223, 225, 233, and 235, is restricted only by fashion and the minimum amount of fabric webs 216 and 218 (or, alternatively, the web of fabric 215 or any combination of the fabric webs 216 and 218) that must remain having sufficient integrity to withstand the remaining steps or operations of the process of manufacture. For example, the placement of the opening 289 between the shoulder side edges 223, 225, 233, and 235 may be symmetrically or asymmetrically located.

The edge 292 of the neck opening 290 may be hemmed by any method or style known in the art. In some embodiments, it may be desirable to leave the edge 292 of the neck opening 290 unhemmed.

Figure 2:
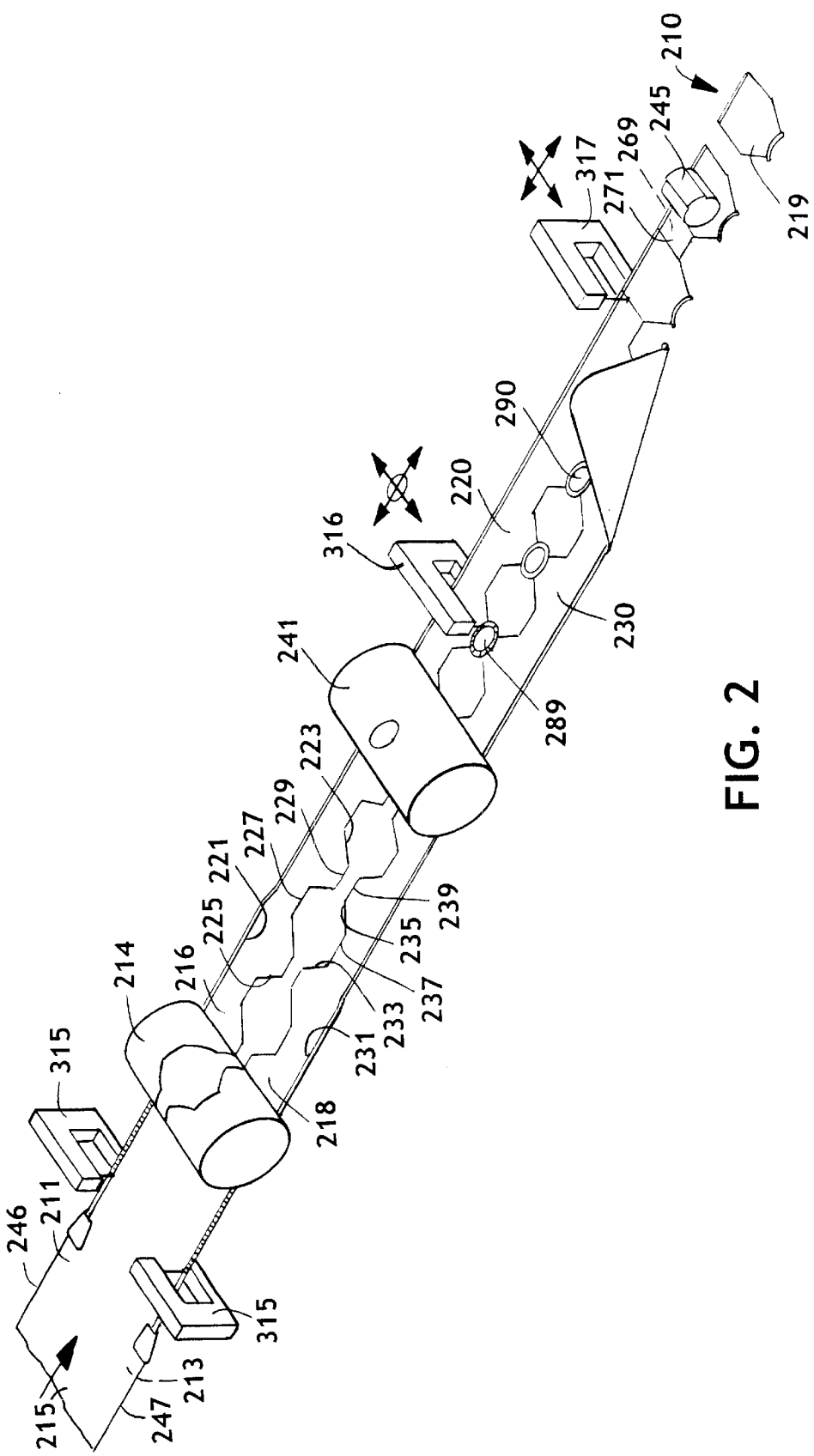
FIG. 2 is a diagram of another embodiment of the present invention.

In other embodiments, a collar 294 may be attached to the edge 292 of the neck opening 290 of the garment 210, thereby forming a collar seam 312. The attachment of the collar 294 may be made non-refastenable by means as discussed above. (Sewing equipment 316 is shown in FIG. 2). In the alternative, the attachment of the collar 294 may be made refastenable by means as discussed above. The collar seam 312 may be constructed on a continuous or intermittent basis. The collar 294 may take on a variety of sizes and shapes. The pattern of the collar 294 is restricted only by the fashion and the minimum amount of the material of the collar 294 that is necessary to complete the remaining steps or operations of the process of manufacture.

The collar seam 312 of the present invention may take on a variety of structures or configurations known in the art. One embodiment of the collar seam 312 is an out-turned configuration as illustrated in FIG. 22. Such a configured collar seam 312 is formed by securing together at least a portion of the out-turned portions of the collar edge 311 of the collar 294 and the edge 292 of the neck opening 290 of the garment 210. The inner surface 211 of the collar edge 311 of the collar 294 is brought into contact with the inner surface 211 of the edge 292 of the neck opening 290.

Another embodiment of the collar seam 312 is an in-turned configuration as illustrated in FIG. 23. Such a configured collar seam 312 is formed by securing together at least a portion of the in-turned portions of the collar edge 311 of the collar 294 and the edge 292 of the neck opening 290 of the garment 210. The outer surface 213 of the collar edge 311 of the collar 294 is brought into contact with the outer surface 213 of the edge 292 of the neck opening 290.

Another embodiment of the collar seam 312 is an over-lapped configuration as illustrated in FIG. 21. Such a configured collar seam 312 is formed by securing together at least a portion of the over-lapped portions of the collar edge 311 of the collar 294 and the edge 292 of the neck opening 290 of the garment 210. The inner surface 211 of the collar edge 311 of the collar 294 or the edge 292 of the neck opening 290 is brought into contact with the outer surface 213 of the other, the collar edge 311 or the edge 292.

Another embodiment of the collar seam 312 is an over-lapped configuration as illustrated in FIG. 24. Such a configured collar seam 312 is formed by folding back the collar edge 311 of the collar 294 or the edge 292 of the neck opening 290. The outer surface 213 of the folded portions and the inner surface 211 of the unfolded portions of the collar edge 311 of the collar 294 or the edge 292 of the neck opening 290 and the corresponding portions of the collar 294 or the front or back panels 220 and 230 are brought into contact with the inner surface 211 or the outer surface 213 of the unfolded collar edge 311 of the collar 294 or the edge 292 of the neck opening 290 and the corresponding portions of the collar 294 or the front and back panels 220 and 230. It is understood that the folding back of the collar edge 311 of the collar 294 or the edge 292 of the neck opening 290 could be performed such that the inner surface 211 would be exposed along the fold.

Figure 25:
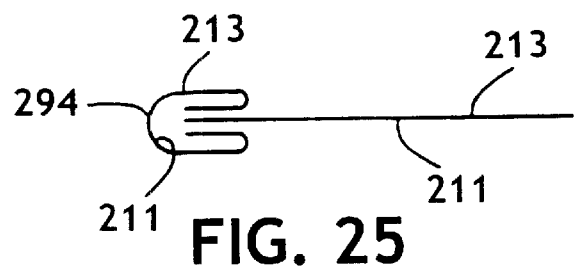
FIG. 25 is a cross sectional view of a seam.

Another embodiment of the collar seam 312 is an over-lapped configuration as illustrated in FIG. 25. Such a configured collar seam 312 is formed by folding the collar 294 about or over the edge 292 of the neck opening 290. The collar edges 311 of the collar 294 may be folded under bringing the outer surface 213 of the collar 294 into contact with the edge 292 of the neck opening and any portion of the adjacent material of the front panel 220, the back panel 230, or both as desired. The collar edges 311 may be left exposed by not being folding under.

Figure 26:
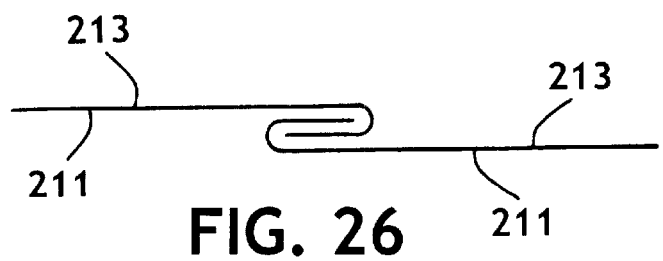
FIG. 26 is a cross sectional view of a seam.

Another embodiment of the collar seam 312 is an over-lapped configuration as illustrated in FIG. 26. Such a configured collar seam 312 is formed by folding the collar edge 311 such that the inner surface 211 of the collar 294 is brought into contact with itself. The edge 292 of the neck opening 290 is folded such that the outer surface 213 of the front panel 220, the back panel 230, or both are brought into contact with itself. The collar edge 311 is inserted into the fold of the edge 292 of the neck opening 290. The edge 292 of the neck opening 290 is inserted into the fold of the collar edge 311. In another embodiment, the collar edge 311 is folded such that the outer surface 213 of the collar 294 is brought into contact with itself. The edge 292 of the neck opening 290 is folded such that the inner surface 211 of the front panel 220, the back panel 230, or both are brought into contact with itself. This configured collar seam 312 may be used with any seam describe herein.

The materials used for the collar 294 may be the same as the materials used for the other portions of the garment 210. In some embodiments, it is desirable that the materials used for the collar 294 have an elastic element such that the collar 294 will conform to the portion of the wearer's neck that comes into contact with the collar 294.

The fabric webs 216 and 218 include a pair of opposing web side edges 221 and 231. A repeating series of pairs of opposing indentations 269 and 271 are cut by the die cutter 245 into the web side edges 221 and 231, respectively, of the fabric webs 216 and 218, respectively (or, alternatively, the web side edges 246 and 247 of the web of fabric 215). (See FIG. 2). The location of the pairs of opposing indentations 269 and 271 corresponds to the garment side edges 222 and 224, and 232 and 234 of the finished garment 210. The opposing indentations 269 and 271 may be produced by a die cut operation, an ultrasonic operation, or any other suitable method of operation. In addition, the opposing indentations 269 and 271 may be cut into the web side edges 246 and 247 of the web of fabric 215 prior to the web of fabric 215 being cut into the fabric webs 216 and 218 or after the web of fabric 215 is cut into the fabric webs 216 and 218. In some embodiments of the present invention, the opposing indentations 269 and 271 may be slits.

The pairs of opposing indentations 269 and 271 may take on a variety of sizes and shapes, such as oval, triangular, square, rectangular, multi-faceted, asymmetric or irregular, or the like. The pattern of the opposing indentations 269 and 271 is restricted only by fashion and the minimum amount of the fabric webs 216 and 218 (or, alternatively, the web of fabric 215) that must remain having a sufficient integrity to withstand the remaining steps or operations of the process of manufacture. The indentations 269 and 271 may be similar or dissimilar in shape, structure, size, and the like from each other within the finished garment 210.

In some embodiments, the operation of cutting the pairs of opposing indentations 269 and 271 into the side edges 221 and 231 of the fabric webs 216 and 218 (or, alternatively, the web side edges 246 and 247 of the web of fabric 215) may be eliminated. The material to be removed from the opposing indentations 269 and 271 may be removed by any method known in the art, desirably a vacuum source (not shown). As the pattern of the garment 210 is restricted only by fashion and the minimum amount of the fabric webs 216 and 218 (or, alternatively, the web of fabric 215) that must remain having a sufficient integrity to withstand the operations or steps of the process of manufacture, one can simply design the garment 210 such that this operation of cutting the opposing indentations 269 and 271 into the fabric webs 216 and 218 (or, alternatively, the web of fabric 215) is not required.

The fabric webs 216 and 218 are folded by a folder 243 so as to bring together the opposing garment end portions 262 and 264 of the garment 210 such that the garment side edge 222 of the front panel 220 and the garment side edge 232 of the back panel 230 are brought together. The folding operations are desirably carried out by tuckers and folders, as well as any other known means. The folding operations also bring together the garment side edge 224 of the front panel 220 and the garment side edge 234 of the back panel 230. The mating of the garment side edge 222 and the garment side edge 232 as well as the mating of the garment side edge 224 and the garment side edge 234 form the garment side seams 240 and 242, respectively, of the garment 210. It may be desirable to redirect (or reorient) the garment-sized piece 219 of the fabric webs 216 and 218 to allow easy bonding of the garment side seams 240 and 242 of the garment 210. Each discrete garment-sized piece 219 of the web of fabric 215 (or, alternatively, the fabric webs 216 and 218) is transported, typically by vacuum screens, belts, or conveyors, through hemming, folding, and fastening operations (not shown). The turning operations are desirably carried out by turn rolls and turn tables, as well as any other known means. The garment-sized piece 219 of the fabric webs 216 and 218 may be reoriented 90 degrees (not shown).

In various embodiments of the present invention, one or both of the garment side seams 240 and 242 may be constructed as non-refastenable seams or as refastenable seams. Any excess material of the fabric webs 216 and 218 may be removed from the edges of the garment side seams 240 and 242 to reduce and smooth out the garment side seams 240 and 242. The non-refastenable garment side seams 240 and 242 may be formed by any suitable means such as ultrasonic sealing, adhesive bonding, tape, heat sealing, sewing, or the like. (Sewing equipment 317 is shown in FIG. 2). The non-refastenable garment side seams 240 and 242 may be constructed on a continuous or intermittent basis. One suitable method of forming such garment side seams 240 and 242 is disclosed in U.S. Pat. No. 4,938,753 issued Jul. 3, 1990, to Van Gompel et al., which is incorporated herein by reference.

In other embodiments of the present invention, one or both of the garment side seams 240 and 242 may be refastenable. Refastenable means for securing the garment side edges 222 and 232 and the garment side edges 224 and 234 of the garment 210 include refastenable adhesive and mechanical type fasteners 295. The adhesive and mechanical type fasteners 295 include buttons and button holes, snaps, buckles, clasps, hooks and loops, end extensions, tabs, tape, and the like which are designed or adapted to interlock or engage some type of complementary device or the inner surface 211 or outer surface 213 of the garment 210.

In addition, elasticized fasteners 295 may also be used in assuring better fit of the garment 210. If the garment 210 includes refastenable garment side seams 240 and 242, the refastenable means are desirably strategically placed on the fabric webs 216 and 218 before the fabric webs 216 and 218 are cut into discrete garment-sized pieces 219. The folding and redirection operations may be eliminated when refastenable garment side seams 240 and 242 are included in the garment 210. However, there may be packaging reasons for which one would still carry out these two steps.

The garment side seams 240 and 242 of the present invention may take on a variety of structures or configurations known in the art. One embodiment of the garment side seams 240 and 242 is an out-turned configuration as illustrated in FIG. 22. Such configured garment side seams 240 and 242 are formed by securing together at least a portion of the out-turned portions of the garment side edges 222 and 232 and the garment side edges 224 and 234, respectively. The inner surface 211 of the garment side edges 222 and 224 of the front panel 220 and the garment side edges 232 and 234 of the back panel 230, respectively, are brought into contact with each other, respectively.

Another embodiment of the garment side seams 240 and 242 is an in-turned configuration as illustrated in FIG. 23. Such configured garment side seams 240 and 242 are formed by securing together at least a portion of the in-turned portions of the garment side edges 222 and 232 and the garment side edges 224 and 234, respectively. The outer surface 213 of the garment side edges 222 and 224 of the front panel 220 and the garment side edges 232 and 234 of the back panel 230 are brought into contact with each other, respectively.

Another embodiment of the garment side seams 240 and 242 is an over-lapped configuration as illustrated in FIG. 21. Such configured garment side seams 240 and 242 are formed by securing together at least a portion of the over-lapped portions of the garment side edges 222 and 232 and the garment side edges 224 and 234, respectively. The inner surface 211 of one of the garment side edges 222 and 232 and one of the garment side edges 224 and 234 are brought into contact with the outer surface 213 of the other garment side edge of each pair of garment side edges.

Another embodiment of the garment side seams 240 and 242 is an over-lapped configuration as illustrated in FIG. 24. Such a configured garment side seam 240 is formed by folding the garment side edge 222 or the garment side edge 232. The outer surface 213 of the folded portion and the inner surface 211 of the unfolded portion of the garment side edge 222 or the garment side edge 232 and the corresponding portion of the front panel 220 or the back panel 230, respectively, is brought into contact with the inner surface 211 or the outer surface 213 of the non-folded garment side edges 232 or the garment side edges 222 and the corresponding portion of the back panel 230 or the front panel 220.

The garment side seam 242 is formed by folding back the garment side edges 224 or the garment side edge 234. The outer surface 213 of the folded portion and the inner surface 211 of the unfolded portion of the garment side edges 224 or the garment side edge 234 and the corresponding portion of the front panel 220 or the back panel 230, respectively, is brought into contact with the inner surface 211 or the outer surface 213 of the non-folded garment side edge 234 or the garment side edge 224 and the corresponding portion of the back panel 230 or the front panel 220. It is understood that the folding back of a garment side edge 222, 224, 232, or 234 could be performed such that the inner surface 211 would be exposed along the fold.

The garment end portions 262 and 264 of the discrete garment-sized pieces 219 of the fabric webs 216 and 218 may be hemmed in the finished garment 210. The garment end portions 262 and 264 may be hemmed by any method or style known in the art. (Sewing equipment 315 is shown in FIG. 2). In some embodiments, it may be desirable to leave the garment end portions 262 and 264 unhemmed. The garment bottom edges 226 and 236 of the discrete garment-sized pieces 219 of the fabric webs 216 and 218 may be hemmed in the finished garment 210. The garment bottom edges 226 and 236 can be hemmed by any method or style known in the art. In some embodiments, it may be desirable to leave the garment end edges 226 and 236 unhemmed.

In various embodiments of the present invention, the front panel 220, the back panel 230, or both panels 220 and 230 may be cut or otherwise opened to form a slit 257 or 265 (shown in FIG. 6) such as a placket. The slits 257 and 265 may be produced by a die cut operation, an ultrasonic operation, or any other suitable means. The slit 257 has two edges 258 and 259. The slit 265 has two edges 266 and 267. The slits 257 and 265 of the front and back panels 220 and 230, respectively, may extend from the edge 292 of the neck opening 290 to the garment bottom edges 226 and 236, respectively. In the alternative, the slits 257 and 265 may extend over only a portion of the panels 220 and 230 between the edge 292 of the neck opening 290 to the garment bottom edges 226 and 236, respectively. When the garment 210 comprises both a slit 257 in the front panel 220 and a slit 265 in the back panel 230, the slits 257 and 265 may be similar or dissimilar in size, structure, shape, and the like.

In some embodiments, the edges 258 and 259 of the slit 257 and the edges 266 and 267 of the slit 265 may be refastenably attached or secured to each other. The edges 258 and 259 may be secured together to form the front seam 313. The edges 266 and 267 may be secured together to form the back seam 314. Various fastening means, such as adhesive or mechanical type fasteners 295, see the discussion above, may be used to refastenably attach or secure the edges 258 and 259 and the edges 266 and 267 together of the slits 257 and 265, respectively.

In another embodiment of the present invention, see FIGS. 7, 8, 13, and 14, the garment 410 desirably comprises a front panel 420. The front panel 420 has a pair of garment side edges 422 and 424, a garment bottom edge 426, a pair of shoulder side edges 423 and 425, and a shoulder region 428 positioned between the shoulder side edges 423 and 425.

The garment side edge 422 may be joined to the garment side edge 424 to form the garment seam 440. In some embodiments of the present invention, some type of strap structures 496 can be attached to each of the garment side edges 422 and 424. The attachment of the strap structures 496 may be made non-refastenable by means as discussed above. In the alternative, the attachment of the strap structures 496 may be made refastenable by means as discussed above.

The embodiments of the garments 410 do not include sleeves. The shoulder side edges 423 and 425 may be hemmed. For easier manufacture, the shoulder side edges 423 and 425 may be left unhemmed, facilitating easy machine cutoff.

A neck opening 490, defined about at least a portion of its perimeter by an edge 492, may be located in the shoulder region 428. The neck opening 490 is typically 35 centered between the shoulder side edges 423 and 425, although such placement of the neck opening 490 is not required. The neck opening 490 may take on a variety of sizes and shapes, such as circular, oval, triangular, square, rectangular, multi-faceted, asymmetric or irregular, or the like. While the placement of the neck opening 490 may be symmetrically located between the shoulder side edges 423 and 425, typically, the placement of the neck opening 490 is configured so that a portion of the neck opening 490 is located within the front shoulder region 428.

Additionally, while the shape of the neck opening 490 may be symmetrical, typically, the shape of the neck opening 490 is asymmetrical as dictated by fashion and comfort. In some embodiments of the garment 410, the edge 492 of the neck opening 490 may be hemmed. For easier manufacture, the edge 492 of the neck opening 490 may be left unhemmed, facilitating easy machine cutoff.

Various styles of a collar 494 may also be attached to the edge 492 of the neck opening 490. The attachment of the collar 494 may be made non-refastenable by means as discussed above. In the alternative, the attachment of the collar 494 may be made refastenable by means as discussed above. The collars 494 include, but are not limited to, turtlenecks, mock turtlenecks, cowls, shirt collars, tee-shirt shirt ribbed edging, decorative edging, and the like known in the garment industry.

Figure 3:
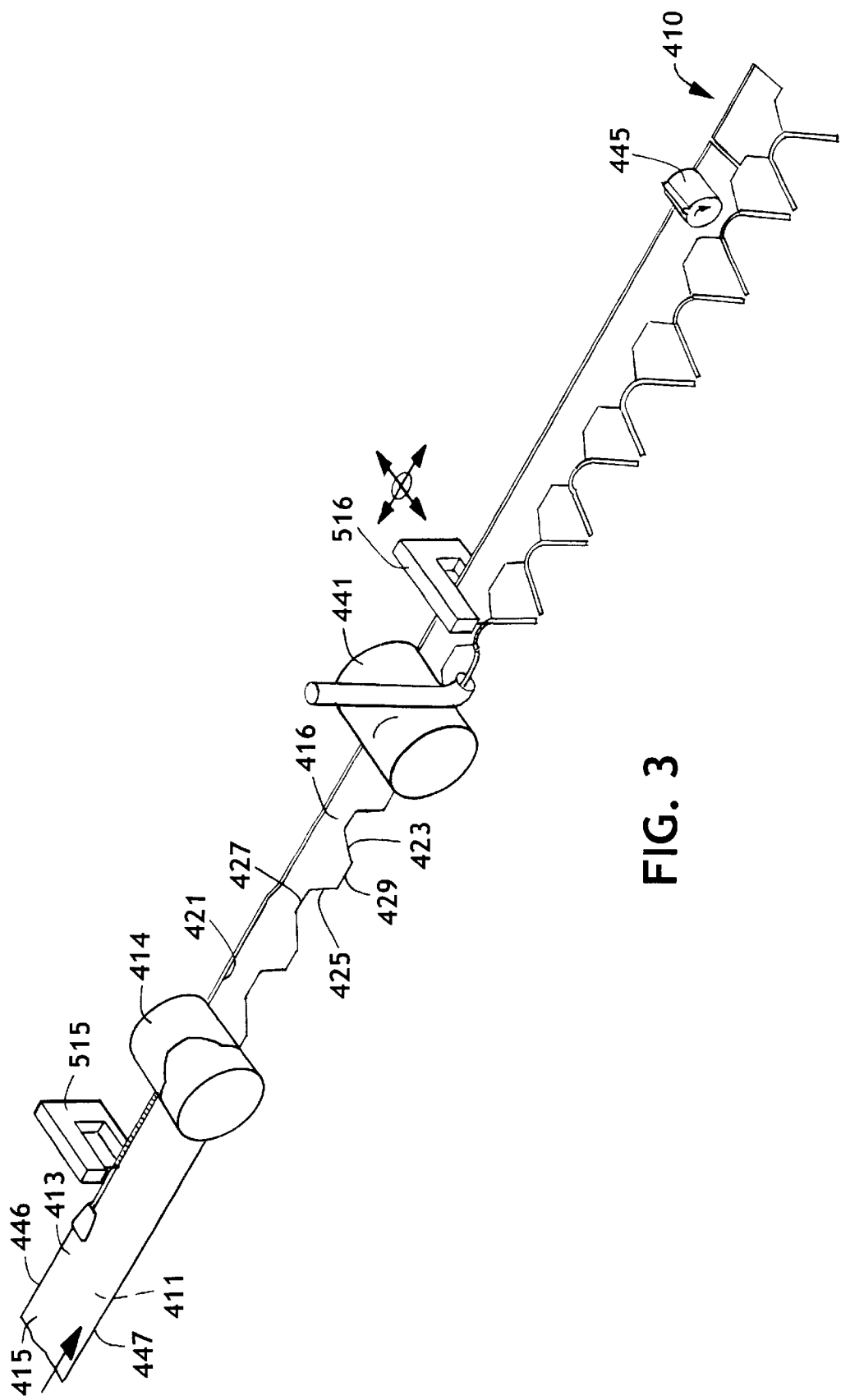
FIG. 3 is a diagram of another embodiment of the present invention.
Figure 4:
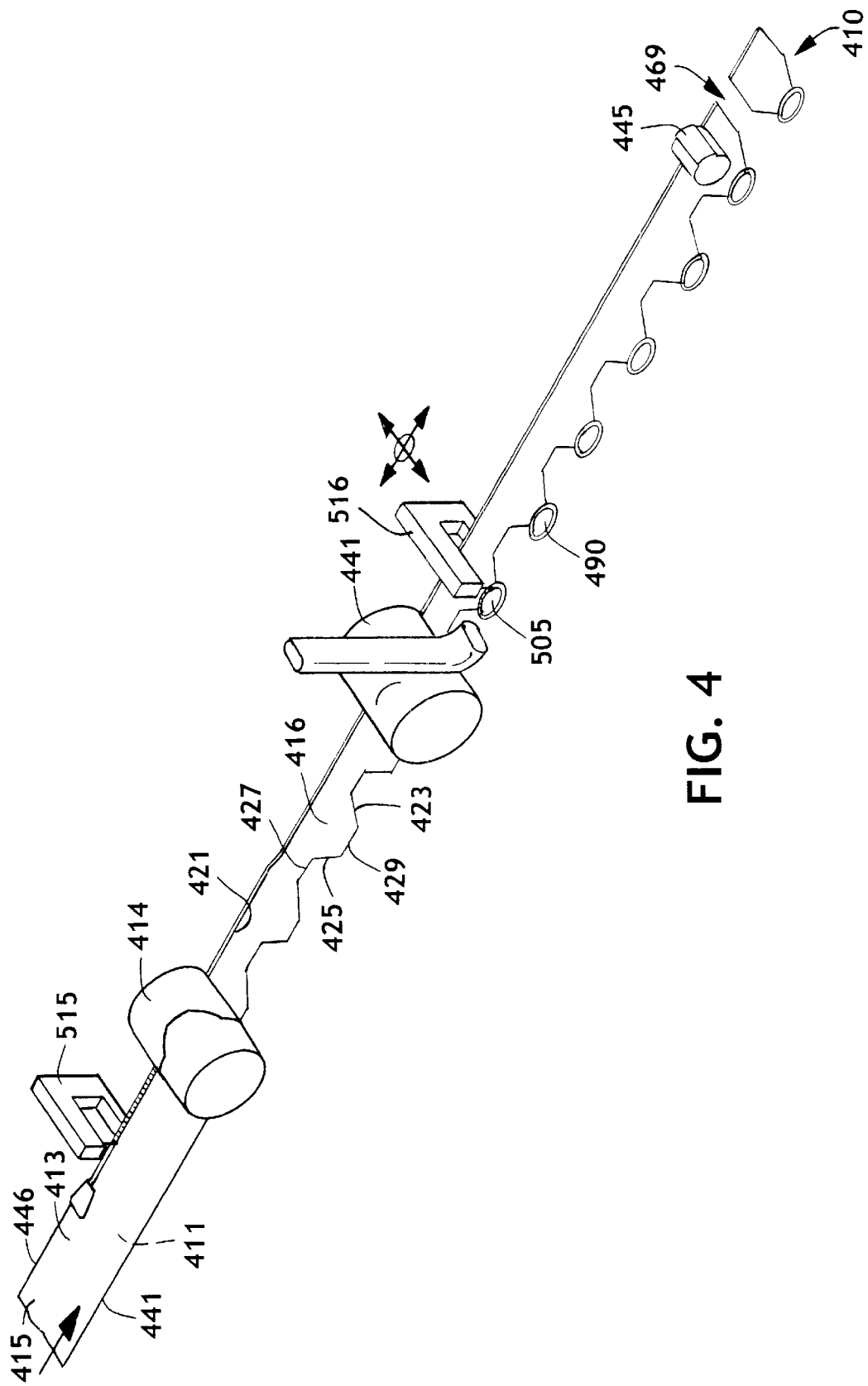
FIG. 4 is a diagram of another embodiment of the present invention.

The garment bottom edge 426 of the garment 410 may also be hemmed. (Sewing equipment 515 is shown in FIGS. 3 and 4). For easier manufacture, the garment bottom edge 426 of the garment 410 may be left unhemmed, facilitating easy machine cutoff.

The front panel 420 may be cut or otherwise opened to form a slit 457 (shown in FIGS. 7 and 8) such as a placket. The garment 410, including the slit 457, can be used as a wrap gown, robe, or the like. The slit 457 includes two edges 458 and 459. Various fastening means, such as adhesive and mechanical type fasteners 495, see the discussion below, may be used to refastenably attach or secure the edges 458 and 459 together to form reclosable or refastenable garments 410. The slit 457 of the front panel 420 may extend from the edge 492 of the neck opening 490 to the garment bottom edge 426. In the alternative, the slit 457 may extend over only a portion of the front panel 420 between the edge 492 of the neck opening 490 to the garment bottom edge 426.

Another embodiment of the present invention is a continuous process for the manufacture of a garment 410 (see FIGS. 3 and 4) for wearing about the upper body comprising at least a front panel 420, a neck opening 490 defined about at least a portion of its perimeter by edge 492, arm opening edges 473 and 475, a lower body opening 444 defined about its perimeter by garment bottom edge 426. The garment 410 comprises an inner surface 411 and an outer surface 413. The garment 410 may comprise a single layer web of fabric 415 or may comprise a multi-layer laminate web of fabric 415. In some embodiments, the garment 410 may comprise multiple layers of the web of fabric 415. The web of fabric 415 may be made up of multiple webs of fabric positioned in side by side alignment or other arrangements to make up a web of fabric 415. The present invention requires at least one web of fabric 415 in a single continuous process to create the garments 410.

In one type of embodiments of the present invention (see FIGS. 3 and 4), one web of fabric 415 of sufficient width of fabric to make the garment 410 is provided to produce the garments 410. The desired web of fabric 415 is a nonwoven although any disposable or washable fabric may be used. (See the discussion above for the web of fabric 15). The web of fabric 415 is typically unwound from a roll or other source (not shown).

Figure 34:
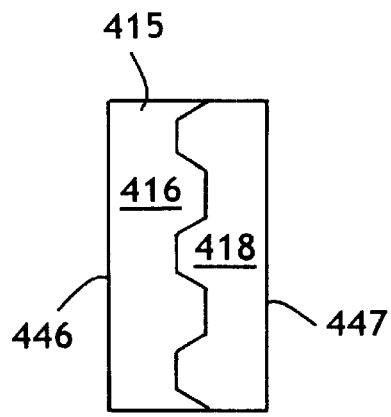
FIG. 34 is a top plan view of a web of fabric.
Figure 35:
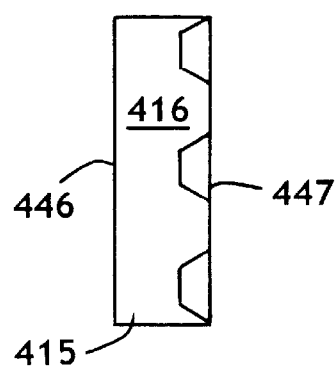
FIG. 35 is a top plan view of a web of fabric.

The web of fabric 415 includes a pair of opposing web side edges 446 and 447. The web of fabric 415 is cut or otherwise severed by a die cutter 414 producing a fabric web 416 having a repeating pattern. (See FIGS. 3 and 4). The cutting operation may be accomplished by a die cut operation, an ultrasonic operation, or any other suitable method of operation. The we fabric web 416 can be cut from one web of fabric 415 in a nested or a non-nested arrangement. (See FIGS. 34 and 35).

The fabric web 416 includes a web side edge 421 which may in some embodiments correspond to the web side edge 446 of the web of fabric 415, the side edges 427, the edges 429, and the shoulder side edges 423 and 425 as well as an inner surface 411 and an outer surface 413. It is understood that while the web side edge 446 of the web of fabric 415 may typically become the web side edge 421 of the fabric web 416, fabric may be removed from or added to the web side edge 446 to create the web side edge 421. The fabric web 416 may be cut into other shapes having an overall appearance of the connected octagonal shapes including straight, curved, multi-faceted, asymmetric or irregular shoulder side edges 423 and 425, edges 429, and side edges 427. It is understood that while the web side edge 447 of the web of fabric 415 may typically become the edges 429, fabric may be removed from or added to the web side typically become the edges 429, fabric may be removed from or added to the web side edge 447 to create the edges 429.

In addition, the shape of the edges 429, the side edges 427, and the shoulder side edges 423 and 425 of the fabric web 416 may be different from each other or from any combination of the edges 429, the side edges 427, and the shoulder side edges 423 and 425. The portion of the connected octagonal shape of the fabric web 416 may take on a variety of sizes as well. In addition, the length of the shoulder side edges 423 and 425, the side edges 427, and the edges 429 of the fabric web 416 may be different from each other or from any combination of the shoulder side edges 423 and 425, the side edges 427, and the edges 429. The pattern of the material of the fabric web 416 is restricted only by fashion and the minimum amount of material of the fabric web 416 that is necessary to complete the remaining steps or operations of the process of manufacture.

The opposing web side edge 446 of the web of fabric 415, in the preferred embodiment, becomes the garment bottom edge 426 of the finished garment 410. It is understood that while the web side edge 446 of the web of fabric 415 may typically become the garment bottom edge 426 in the finished garment 410, fabric may be removed from or added to the web side edge 446 of the web of fabric 415 forming the garment bottom edge 426 in the finished garment 410. The resulting garment bottom edge 426 so formed is then proximate the web side edge 446 of the web of fabric 415.

Alternatively, the web side edge 421 of the fabric web 416 in the preferred embodiment, becomes the garment bottom edge 426 of the finished garment 410. It is understood that while the web side edge 421 of the fabric web 416 may typically become the garment bottom edge 426 in the finished garment 410, fabric may be removed from or added to the web side edge 421 of the fabric web 416, forming the garment bottom edge 426 in the finished garment 410.

The web of fabric 415 (or, alternatively, the fabric web 416) is cut into discrete garment-sized pieces 419 by a die cutter 445. Each discrete garment-sized piece 419 contains at least one pair of opposing garment side edges 422 and 424, and a garment end portion 462. The cutting operation may be accomplished by a die cut operation, an ultrasonic operation, or any other suitable method of operation. The location of the garment end portion 462 corresponds to the garment bottom edge 426 of the front panel 420 in the finished garment 410. Each discrete garment-sized piece 419 is transported, typically by vacuum screens, belts, or conveyors, through hemming, folding, and fastening operations.

In some embodiments of the present invention, a repeating series of indentations 505 may be cut by a die cutter 441 into the fabric web 416 (or, alternatively, the web of fabric 415). The location of the opening 505 corresponds to at least a portion of the neck opening 490 in the finished garment 410. The indentations 505 may be produced by a die cut operation, an ultrasonic operation, or any other suitable method of operation. The material to be removed from the indentations 505 may be removed by any method known in the art, desirably a vacuum source (not shown). The indentation 505 may take on a variety of sizes and shapes, such as a slit, circular, oval, triangular, square, rectangular, multi-faceted, asymmetric or irregular, or the like. The pattern of the indentation 505 is restricted only by fashion and the minimum amount of fabric web 416 (or, alternatively, the web of fabric 415) that must remain having a sufficient integrity to withstand the remaining steps or operations of the process of manufacture.

The placement of the indentation 505 in relation to the shoulder side edge 423 and 425, while in a typical garment 410, the indentation 505 is centrally located between or intermediate the shoulder side edges 423 and 425, is restricted only by fashion and the minimum amount of fabric web 416 (or, alternatively, the web of fabric 415) that must remain having sufficient integrity to withstand the remaining steps or operations of the process of manufacture. For example, the placement of the indentation 505 between the shoulder side edges 223 and 225 may be symmetrically or asymmetrically located.

The edge 492 of the neck opening 490 may be hemmed by any method or style known in the art. In some embodiments, it may be desirable to leave the edge 492 of the neck opening 490 unhemmed. It is understood that in some embodiments of the present invention, the edge 429 of the fabric web 416 (or, alternatively, the web side edge 447 of the web of fabric 415) becomes the edge 492 of the neck opening 490.

In other embodiments, a collar 494 may be attached to the edge 492 of the neck opening 490 of the garment 410, thereby forming a collar seam 512. In other embodiments, the collar 494 may be attached to the edge 429, thereby forming the collar seam 512. The attachment of the collar 494 may be made non-refastenable by means as discussed above. (Sewing equipment 516 is shown in FIGS. 3 and 4). In the alternative, the attachment of the collar 494 may be made refastenable by means as discussed above. The collar seam 512 may be constructed on a continuous or intermittent basis. The collar 494 may take on a variety of sizes and shapes. The pattern of the collar 494 is restricted only by the fashion and the minimum amount of the material of the collar 494 that is necessary to complete the remaining steps or operations of the process of manufacture.

Figure 28:
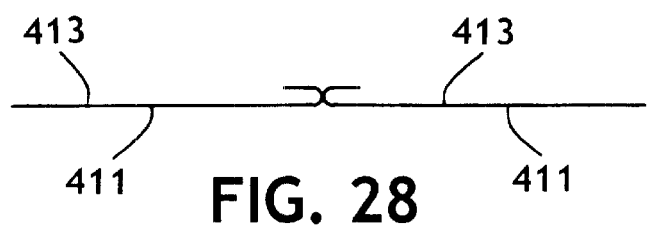
FIG. 28 is a cross sectional view of a seam.

The collar seam 512 of the present invention may take on a variety of structures or configurations known in the art. One embodiment of the collar seam 512 is an out-turned configuration as illustrated in FIG. 28. Such a configured collar seam 512 is formed by securing together at least a portion of the out-turned portions of the collar edge 511 of the collar 494 and the edge 492 of the neck opening 490 (or, alternatively, the edge 429) of the garment 410. The inner surface 411 of the collar edge 511 of the collar 494 is brought into contact with the inner surface 411 of the edge 492 of the neck opening 490 (or, alternatively, the edge 429).

Figure 29:
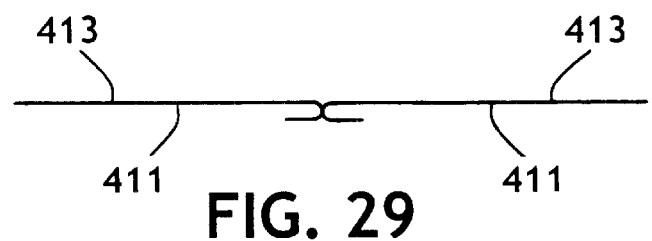
FIG. 29 is a cross sectional view of a seam.

Another embodiment of the collar seam 512 is an in-turned configuration as illustrated in FIG. 29. Such a configured collar seam 512 is formed by securing together at least a portion of the in-turned portions of the collar edge 511 of the collar 494 and the edge 492 of the neck opening 490 (or, alternatively, the edge 429) of the garment 410. The outer surface 413 of the collar edge 511 of the collar 494 is brought into contact with the outer surface 413 of the edge 492 of the neck opening 490 (or, alternatively, the edge 429).

Figure 27:
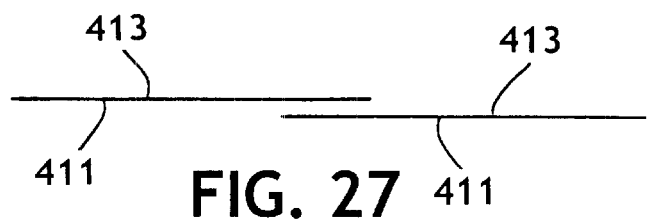
FIG. 27 is a cross sectional view of a seam.

Another embodiment of the collar seam 512 is an over-lapped configuration as illustrated in FIG. 27. Such a configured collar seam 512 is formed by securing together at least a portion of the over-lapped portions of the collar edge 511 of the collar 494 and the edge 492 of the neck opening 490 (or, alternatively, the edge 429) of the garment 410. The inner surface 411 of the collar edge 511 of the collar 494 or the edge 492 of the neck opening 490 (or, alternatively, the edge 429) is brought into contact with the outer surface 413 of the other, the collar edge 511 or the edge 492 (or, alternatively, the edge 429).

Figure 30:
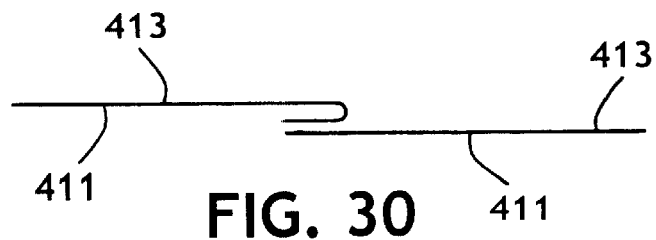
FIG. 30 is a cross sectional view of a seam.

Another embodiment of the collar seam 512 is an over-lapped configuration as illustrated in FIG. 30. Such a configured collar seam 512 is formed by folding back the collar edge 511 of the collar 494 or the edge 492 of the neck opening 490 (or, alternatively, the edge 429). The outer surface 413 of the folded portions and the inner surface 411 of the unfolded portions of the collar edge 511 of the collar 494 or the edge 492 of the neck opening 490 (or, alternatively, the edge 429) and the corresponding portions of the collar 494 or the front panel 420 are brought into contact with the inner surface 411 or the outer surface 413 of the unfolded collar edge 511 of the collar 494 or the edge 492 of the neck opening 490 (or, alternatively, the edge 429) and the corresponding portions of the collar 494 or the front panel 420. It is understood that the folding back of the collar edge 511 of the collar 494 or the edge 492 of the neck opening 490 (or, alternatively, the edge 429) could be performed such that the inner surface 411 would be exposed along the fold.

Figure 31:
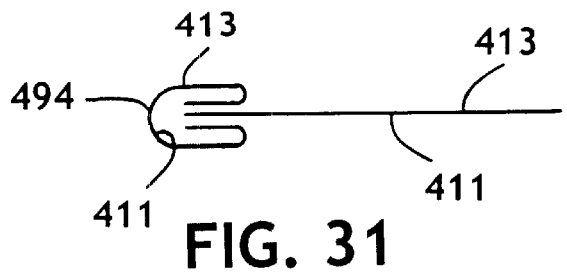
FIG. 31 is a cross sectional view of a seam.

Another embodiment of the collar seam 512 is an over-lapped configuration as illustrated in FIG. 31. Such a configured collar seam 512 is formed by folding the collar 494 about or over the edge 492 of the neck opening 490. The collar edges 511 of the collar 494 may be folded under, bringing the outer surface 413 of the collar 494 into contact with the edge 492 of the neck opening and any portion of the adjacent material of the front panel 420. The collar edges 511 may be left exposed by not being folding under.

Figure 32:
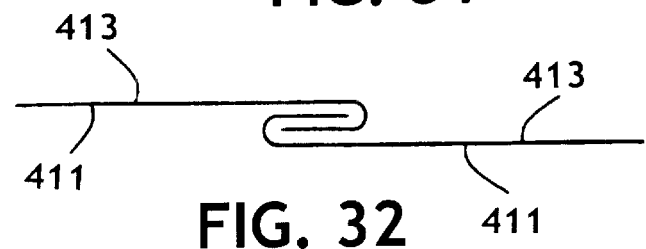
FIG. 32 is a cross sectional view of a seam.

Another embodiment of the collar seam 512 is an over-lapped configuration as illustrated in FIG. 32. Such a configured collar seam 512 is formed by folding the collar edge 511 such that the inner surface 411 of the collar 494 is brought into contact with itself. The edge 492 of the neck opening 490 is folded such that the outer surface 413 of the front panel 420 is brought into contact with itself. The collar edge 511 is inserted into the fold of the edge 492 of the neck opening 490. The edge 492 of the neck opening 490 is inserted into the fold of the collar edge 511. In another embodiment, the collar edge 511 is folded such that the outer surface 413 of the collar 494 is brought into contact with itself. The edge 492 of the neck opening 490 is folded such that the inner surface 411 of the front panel 420 is brought into contact with itself. This configured collar seam 512 may be used with any seam described herein.

The materials used for the collar 494 may be the same as the materials used for the other portions of the garment 410. In some embodiments, it is desirable that the materials used for the collar 494 have an elastic element such that the collar 494 will conform to the portion of the wearer's neck that comes into contact with the collar 494.

A repeating series of indentations 469 are cut by a die cutter 445 into the web side edge 446 of the web of fabric 415 (or, alternatively, web side edge 421 of the fabric web 416). (See FIG. 4). The location of the indentations 469 corresponds to the garment side edges 422 and 424 of the finished garment 210. The indentations 469 may be produced by a die cut operation, an ultrasonic operation, or any other suitable method of operation. In some embodiments of the present invention, the indentations 469 may be slits. The cutting operations producing indentations 469 in the fabric web 416 typically, although not in all cases, produce the discrete garment-sized pieces 419.

The indentations 469 may take on a variety of sizes and shapes, such as oval, triangular, square, rectangular, multi-faceted, slit, asymmetric or irregular, or the like. The pattern of the indentations 469 is restricted only by fashion and the minimum amount of the fabric web 416 (or, alternatively, the web of fabric 415) that must remain having a sufficient integrity to withstand the remaining steps or operations of the process of manufacture. The indentations 469 may be similar or dissimilar in shape, structure, size, and the like from each other within the finished garment 410.

The material to be removed from the indentations 469, if any, may be removed by any method known in the art, desirably a vacuum source (not shown). As the pattern of the garment 410 is restricted only by fashion and the minimum amount of the fabric web 416 (or, alternatively, the web of fabric 415) that must remain having a sufficient integrity to withstand the operations or steps of the process of manufacture, one can simply design the garment 410 such that this operation of cutting the indentations 469 into the fabric web 416 (or, alternatively, the web of fabric 415) is not required.

The discrete garment-sized pieces 419 may be folded by a folder 443 so as to bring together the garment side edges 422 and 424 of the garment 210. The folding operations are desirably carried out by tuckers and folders, as well as any other known means. The mating of the garment side edge 422 and the garment side edge 424 forms the garment seam 440 of the garment 410. It may be desirable to redirect (or reorient) the garment-sized piece 419 of the fabric web 416 (or, alternatively, the web of fabric 415) to allow easy bonding of the garment seam 440 of the garment 410. Each discrete garment-sized piece 419 of the web of fabric 415 (or, alternatively, the fabric web 416) is transported, typically by vacuum screens, belts, or conveyors, through hemming, folding, and fastening operations (not shown). The turning operations are desirably carried out by turn rolls and turn tables, as well as any other known means. The garment-sized piece 419 of the fabric web 416 (or, alternatively, the web of fabric 415) may be reoriented 90 degrees (not shown).

In various embodiments of the present invention, the garment seam 440 may be constructed as non-refastenable seams or as refastenable seams. Any excess material of the fabric web 416 (or, alternatively, the web of fabric 415) may be removed from the edges of the garment seam 440 to reduce and smooth out the garment seam 440. The non-refastenable garment seam 440 may be formed by any suitable means such as ultrasonic sealing, adhesive bonding, tape, heat sealing, sewing, or the like. The non-refastenable garment seam 440 may be constructed on a continuous or intermittent basis. One suitable method of forming such garment seams 440 is disclosed in U.S. Pat. No. 4,938,753 issued Jul. 3, 1990, to Van Gompel et al., which is incorporated herein by reference.

In other embodiments of the present invention, one or both of the garment seam 440 may be refastenable. Refastenable means for securing the garment side edges 422 and 424 of the garment 410 include refastenable adhesive and mechanical type fasteners 495. The adhesive and mechanical type fasteners 495 include buttons and button holes, snaps, buckles, clasps, hooks and loops, end extensions, tabs, tape, and the like which are designed or adapted to interlock or engage some type of complementary device or the inner surface 411 or outer surface 413 of the garment 410.

In addition, elasticized fasteners 495 may also be used in assuring better fit of the garment 410. If the garment 410 includes refastenable garment seam 440, the refastenable means are desirably strategically placed on the fabric web 416 (or, alternatively, the web of fabric 415) before the fabric web 416 (or, alternatively, the web of fabric 415) is cut into discrete garment-sized pieces 419. The folding and redirection operations may be eliminated when refastenable garment seam 440 is included in garment 410. However, there may be packaging reasons for which one would still carry out these two steps.

The garment seam 440 of the present invention may take on a variety of structures or configurations known in the art. One embodiment of the garment seam 440 is an out-turned configuration as illustrated in FIG. 28. Such a configured garment seam 440 is formed by securing together at least a portion of the out-turned portions of the garment side edges 422 and 424. The inner surface 411 of the garment side edges 422 and 424 of the front panel 420 are brought into contact with each other.

Another embodiment of the garment seam 440 is an in-turned configuration as illustrated in FIG. 29. Such a configured garment seam 440 is formed by securing together at least a portion of the in-turned portions of the garment side edges 422 and 424. The outer surface 413 of the garment side edges 422 and 424 of the front panel 420 are brought into contact with each other.

Another embodiment of the garment seam 440 is an over-lapped configuration as illustrated in FIG. 27. Such a configured garment seam 440 is formed by securing together at least a portion of the over-lapped portions of the garment side edges 422 and 424. The inner surface 411 of one of the garment side edges 422 and 424 is brought into contact with the outer surface 413 of the other garment side edge of the pair of garment side edges 422 and 424.

Another embodiment of the garment seam 440 is an over-lapped configuration as illustrated in FIG. 30. Such a configured garment seam 440 is formed by folding the garment side edge 422 or the garment side edge 424. The outer surface 413 of the folded portion and the inner surface 411 of the unfolded portion of the garment side edge 422 or the garment side edge 424 and the corresponding portion of the front panel 420 are brought into contact with the inner surface 411 or the outer surface 413 of the non-folded garment side edges 424 or the garment side edges 422 and the corresponding portion of the front panel 420.

The garment end portion 462 of the discrete garment-sized pieces 419 of the fabric web 416 (or, alternatively, the web of fabric 415) may be hemmed in the finished garment 410. The garment end portion 462 may be hemmed by any method or style known in the art. In some embodiments, it may be desirable to leave the garment end portion 462 unhemmed. The garment bottom edge 426 of the discrete garment-sized pieces 419 of the fabric web 416 (or, alternatively, the web of fabric 415) may be hemmed in the finished garment 410. The garment bottom edge 426 can be hemmed by any method or style known in the art. In some embodiments, it may be desirable to leave the garment end edges 426 unhemmed.

In various embodiments of the present invention, the front panel 420 may be cut or otherwise opened to form a slit 457 (shown in FIGS. 7 and 8) such as a placket. The slit 457 may be produced by a die cut operation, an ultrasonic operation, or any other suitable means. The slit 457 has two edges 458 and 459. The slit 457 of the front panel 420, respectively, may extend from the edge 492 of the neck opening 490 (or, alternatively, the edge 429) to the garment bottom edge 426. In the alternative, the slit 457 may extend over only a portion of the front panel 420 between the edge 492 of the neck opening 490 (or, alternatively, the edge 429) to the garment bottom edge 426.

In some embodiments, the edges 458 and 459 of the slit 457 may be refastenably attached or secured to each other. The edges 458 and 459 may be secured together to form the front seam 513. Various fastening means, such as adhesive or mechanical type fasteners 495, see the discussion above, may be used to refastenably attach or secure the edges 458 and 459 together of the slit 457.

One embodiment of the present invention is a continuous process for the manufacture of a garment comprising the following steps. A web of fabric, including opposing web side edges wherein the opposing web side edges are proximate a pair of opposing garment bottom edges of the garment, is provided. The web of fabric is cut, thereby forming three separate fabric webs. One of the fabric webs has the overall appearance of a connected octagonal shape pattern defining pairs of shoulder side edges having a side edge located between the shoulder side edges of each pair of the shoulder side edges and edges located between the pairs of shoulder side edges. Each of the other two fabric webs include one of the opposing web side edges opposed to a complementary octagonal shape pattern defining pairs of shoulder side edges having a side edge located between the shoulder side edges of each pair of the shoulder side edges and edges located between the pairs of shoulder side edges. The fabric web having the overall appearance of a connected octagonal shape pattern into pieces through the edges is cut, thereby forming sleeve flaps. The side edges of the three fabric webs are cut, thereby forming edges defining neck openings in the fabric webs. The fabric webs are folded such that one of the garment bottom edges of the pair of opposing garment bottom edges of the web of fabric is brought into contact with the other garment bottom edge. The web of fabric is cut, thereby defining discrete garment-sized pieces wherein each of the discrete garment-sized pieces of the web of fabric includes at least one neck opening, a front panel having a pair of opposing garment side edges, a back panel having a pair of opposing garment side edges, a pair of sleeve flaps, two garment end portions, and a pair of opposing bottom edges. At least a portion of the opposing garment side edges of the front panel to at least a portion of the pair of opposing garment side edges of the back panel are fastened to form a pair of garment side seams.

The process may further comprise the step of folding the web of fabric, defining an arrangement of having the web of fabric wherein the opposing web side edges are adjacent each other; the step of hemming at least a portion of at least one of the opposing garment bottom edges; the step of hemming at least a portion of at least one of the sleeve opening end edges of the sleeve flaps; the step of providing a collar; the step of fastening at least a portion of the collar to at least a portion of the edge of the neck opening; the step of slitting the front panel at least a portion of the distance between the edge of the neck opening and the garment bottom edge thereby defining a pair of edges of a slit; the step of fastening at least a portion of the edges of the slit to form a front seam; the step of slitting the back panel at least a portion of the distance between the edge of the neck opening and the garment bottom edge thereby defining a pair of edges of a slit; the step of fastening at least a portion of the edges of the slit to form a back seam; or, the step of hemming at least a portion of the edge of the neck opening. Each of the sleeve flaps may include at least a sleeve opening end edge and a pair of opposing sleeve side edges. At least a portion of the collar may be a ribbed knit collar. At least a portion of at least one of the garment side seams may be refastenable or may be non-refastenable. At least a portion of the front seam may be refastenable or may be non-refastenable. At least a portion of the back seam may be refastenable or may be non-refastenable.

Another embodiment of the present invention is a continuous process for the manufacture of a garment comprising the following steps. A web of fabric including opposing web side edges wherein the opposing web side edges are proximate a pair of opposing garment bottom edges of the garment is provided. The web of fabric is intermittently cut, thereby forming edges defining neck openings in the web of fabric. The web of fabric is cut, thereby defining discrete garment-sized pieces. Each of the discrete garment-sized pieces of the web of fabric includes at least one neck opening, a front panel having a pair of opposing garment side edges, a back panel having a pair of opposing garment side edges, a pair of sleeve flaps, two garment end portions, and a pair of opposing bottom edges. The discrete garment-sized pieces of the web of fabric is cut, thereby forming three separate fabric webs. One of the fabric webs has the overall appearance of an octagonal shape pattern defining pairs of shoulder side edges having a side edge located between the shoulder side edges of each pair of the shoulder side edges and edges located between the pairs of shoulder side edges. Each of the other two fabric webs include one of the opposing web side edges opposed to a complementary octagonal shape pattern defining pairs of shoulder side edges having a side edge located between the shoulder side edges of each pair of the shoulder side edges and edges located between the pairs of shoulder side edges. The fabric webs are folded such that one of the garment bottom edges of the pair of opposing garment bottom edges of web of fabric is brought into contact with the other garment bottom edge. At least a portion of the opposing garment side edges of the front panel are fastened to at least a portion of the pair of opposing garment side edges of the back panel to form a pair of garment side seams.

The process may further comprise the step of folding the web of fabric, defining an arrangement of having the web of fabric wherein the opposing web side edges are adjacent each other; the step of hemming at least a portion of at least one of the opposing garment bottom edges; the step of hemming at least a portion of at least one of the sleeve opening end edges of the sleeve flaps; the step of providing a collar; the step of fastening at least a portion of the collar to at least a portion of the edge of the neck opening; the step of slitting the front panel at least a portion of the distance between the edge of the neck opening and the garment bottom edge thereby defining a pair of edges of a slit; the step of fastening at least a portion of the edges of the slit to form a front seam; the step of slitting the back panel at least a portion of the distance between the edge of the neck opening and the garment bottom edge thereby defining a pair of edges of a slit; the step of fastening at least a portion of the edges of the slit to form a back seam; or, the step of hemming at least a portion of the edge of the neck opening. Each of the sleeve flaps may include at least a sleeve opening end edge and a pair of opposing sleeve side edges. At least a portion of the collar may be a ribbed knit collar. At least a portion of at least one of the garment side seams may be refastenable or may be non-refastenable. At least a portion of the front seam may be refastenable or may be non-refastenable. At least a portion of the back seam may be refastenable or may be non-refastenable.

Another embodiment of the present invention is a continuous process for the manufacture of a garment comprising the following steps. Three separate fabric webs are provided. One of the fabric webs has the overall appearance of a connected octagonal shape pattern defining pairs of shoulder side edges having a side edge located between the shoulder side edges of each pair of the shoulder side edges and edges located between the pairs of shoulder side edges. Each of the other two fabric webs include one of the opposing web side edges opposed to a complementary octagonal shape pattern defining pairs of shoulder side edges having a side edge located between the shoulder side edges of each pair of the shoulder side edges and edges located between the pairs of shoulder side edges. The fabric web having the overall appearance of a connected octagonal shape pattern into pieces through the edges is cut, thereby forming sleeve flaps. The side edges of the three fabric webs is cut, thereby forming edges defining neck openings in the fabric webs. The fabric webs are folded such that one of the garment bottom edges of the pair of opposing garment bottom edges of the fabric webs is brought into contact with the other garment bottom edge. The fabric webs are cut, thereby defining discrete garment-sized pieces wherein each of the discrete garment-sized pieces of the fabric webs includes at least one neck opening, a front panel having a pair of opposing garment side edges, a back panel having a pair of opposing garment side edges, a pair of sleeve flaps, two garment end portions, and a pair of opposing bottom edges. At least a portion of the opposing garment side edges of the front panel are fastened to at least a portion of the pair of opposing garment side edges of the back panel to form a pair of garment side seams.

The process may further comprise the step of folding the web of fabric, defining an arrangement of having the web of fabric wherein the opposing web side edges are adjacent each other; the step of hemming at least a portion of at least one of the opposing garment bottom edges; the step of hemming at least a portion of at least one of the sleeve opening end edges of the sleeve flaps; the step of providing a collar; the step of fastening at least a portion of the collar to at least a portion of the edge of the neck opening; the step of slitting the front panel at least a portion of the distance between the edge of the neck opening and the garment bottom edge thereby defining a pair of edges of a slit; the step of fastening at least a portion of the edges of the slit to form a front seam; the step of slitting the back panel at least a portion of the distance between the edge of the neck opening and the garment bottom edge thereby defining a pair of edges of a slit; the step of fastening at least a portion of the edges of the slit to form a back seam; or, the step of hemming at least a portion of the edge of the neck opening. Each of the sleeve flaps may include at least a sleeve opening end edge and a pair of opposing sleeve side edges. At least a portion of the collar may be a ribbed knit collar. At least a portion of at least one of the garment side seams may be refastenable or may be non-refastenable. At least a portion of the front seam may be refastenable or may be non-refastenable. At least a portion of the back seam may be refastenable or may be non-refastenable.

An additional embodiment of the present invention is a continuous process for the manufacture of a garment comprising the following steps. A web of fabric including opposing web side edges wherein the opposing web side edges are proximate a pair of opposing garment bottom edges of the garment is provided. The web of fabric is cut, thereby forming two separate fabric webs wherein each of the fabric webs includes one of the opposing web side edges opposed to an octagonal shape pattern defining pairs of shoulder side edges having a side edge located between the shoulder side edges of each pair of the shoulder side edges and edges located between the pairs of shoulder side edges. The side edges of the two fabric webs are cut, thereby forming edges defining neck openings in the fabric webs. The two fabric webs are folded such that one of the garment bottom edges of the pair of opposing garment bottom edges of the web of fabric is brought into contact with the other garment bottom edge. The two fabric webs are cut, thereby defining discrete garment-sized pieces wherein each of the discrete garment-sized pieces of the fabric webs include at least one neck opening, a front panel having a pair of opposing garment side edges, a back panel having a pair of opposing garment side edges, two garment end portions, and a pair of opposing bottom edges. At least a portion of the opposing garment side edges of the front panel are fastened to at least a portion of the pair of opposing garment side edges of the back panel to form a pair of garment side seams.

The process may further comprise the step of folding the fabric webs, defining an arrangement of having the fabric webs wherein the opposing web side edges are adjacent each other; the step of hemming at least a portion of at least one of the opposing garment bottom edges; the step of providing a collar; the step of fastening at least a portion of the collar to at least a portion of the edge of the neck opening; step of slitting the front panel at least a portion of the distance between the edge of the neck opening and the garment bottom edge thereby defining a pair of edges of a slit; the step of fastening at least a portion of the edges of the slit to form a front seam; the step of slitting the back panel at least a portion of the distance between the edge of the neck opening and the garment bottom edge thereby defining a pair of edges of a slit; the step of fastening at least a portion of the edges of the slit to form a back seam; or, the step of hemming at least a portion of the edge of the neck opening. At least a portion of the collar may be a ribbed knit collar. At least a portion of at least one of the garment side seams may be refastenable or may be non-refastenable. At least a portion of the front seam may be refastenable or non-refastenable. At least a portion of the back seam may be refastenable or may be non-refastenable.

Another embodiment of the present invention is a continuous process for the manufacture of a garment comprising the following steps. A web of fabric including opposing web side edges wherein the opposing web side edges are proximate a pair of opposing garment bottom edges of the garment is provided. The web of fabric is intermittently cut, thereby forming edges defining neck openings in the web of fabric. The web of fabric is cut, thereby defining discrete garment-sized pieces. Each of the discrete garment-sized pieces of the web of fabric includes at least one neck opening, a front panel having a pair of opposing garment side edges, a back panel having a pair of opposing garment side edges, two garment end portions, and a pair of opposing bottom edges. The cutting the discrete garment-sized pieces of the web of fabric is cut, thereby forming two separate fabric webs. Each of the two fabric webs includes one of the opposing web side edges opposed to an octagonal shape pattern defining pairs of shoulder side edges having a side edge located between the shoulder side edges of each pair of the shoulder side edges and edges located between the pairs of shoulder side edges. The fabric webs are folded such that one of the garment bottom edges of the pair of opposing garment bottom edges of the web of fabric is brought into contact with the other garment bottom edge. At least a portion of the opposing garment side edges of the front panel are fastened to at least a portion of the pair of opposing garment side edges of the back panel to form a pair of garment side seams.

The process may further comprise the step of folding the fabric webs, defining an arrangement of having the fabric webs wherein the opposing web side edges are adjacent each other; the step of hemming at least a portion of at least one of the opposing garment bottom edges; the step of providing a collar; the step of fastening at least a portion of the collar to at least a portion of the edge of the neck opening; step of slitting the front panel at least a portion of the distance between the edge of the neck opening and the garment bottom edge thereby defining a pair of edges of a slit; the step of fastening at least a portion of the edges of the slit to form a front seam; the step of slitting the back panel at least a portion of the distance between the edge of the neck opening and the garment bottom edge thereby defining a pair of edges of a slit; the step of fastening at least a portion of the edges of the slit to form a back seam; or, the step of hemming at least a portion of the edge of the neck opening. At least a portion of the collar may be a ribbed knit collar. At least a portion of at least one of the garment side seams may be refastenable or may be non-refastenable. At least a portion of the front seam may be refastenable or non-refastenable. At least a portion of the back seam may be refastenable or may be non-refastenable.

Another embodiment of the present invention is a continuous process for the manufacture of a garment comprising the following steps. Two separate fabric webs are provided. Each of the two fabric webs includes one of the opposing web side edges opposed to a complementary octagonal shape pattern defining pairs of shoulder side edges having a side edge located between the shoulder side edges of each pair of the shoulder side edges and edges located between the pairs of shoulder side edges. The side edges of the two fabric webs are cut, thereby forming edges defining neck openings in the fabric webs. The fabric webs are folded such that one of the garment bottom edges of the pair of opposing garment bottom edges of the fabric webs is brought into contact with the other garment bottom edge. The fabric webs are cut, thereby defining discrete garment-sized pieces. Each of the discrete garment-sized pieces of the fabric webs includes at least one neck opening, a front panel having a pair of opposing garment side edges, a back panel having a pair of opposing garment side edges, two garment end portions, and a pair of opposing bottom edges. At least a portion of the opposing garment side edges of the front panel are fastened to at least a portion of the pair of opposing garment side edges of the back panel to form a pair of garment side seams.

The process may further comprise the step of folding the fabric webs, defining an arrangement of having the fabric webs wherein the opposing web side edges are adjacent each other; the step of hemming at least a portion of at least one of the opposing garment bottom edges; the step of providing a collar; the step of fastening at least a portion of the collar to at least a portion of the edge of the neck opening; step of slitting the front panel at least a portion of the distance between the edge of the neck opening and the garment bottom edge thereby defining a pair of edges of a slit; the step of fastening at least a portion of the edges of the slit to form a front seam; the step of slitting the back panel at least a portion of the distance between the edge of the neck opening and the garment bottom edge thereby defining a pair of edges of a slit; the step of fastening at least a portion of the edges of the slit to form a back seam; or, the step of hemming at least a portion of the edge of the neck opening. At least a portion of the collar may be a ribbed knit collar. At least a portion of at least one of the garment side seams may be refastenable or may be non-refastenable. At least a portion of the front seam may be refastenable or non-refastenable. At least a portion of the back seam may be refastenable or may be non-refastenable.

An additional embodiment of the present invention is a continuous process for the manufacture of a garment comprising the following steps. A web of fabric including opposing web side edges wherein one of the opposing web side edges is proximate the garment bottom edge of the garment is provided. The web of fabric is cut, thereby forming a fabric web wherein the fabric web includes one of the opposing web side edges opposed to an octagonal shape pattern defining pairs of shoulder side edges having a side edge located between the shoulder side edges of each pair of the shoulder side edges and edges located between the pairs of shoulder side edges. The side edges of the fabric web are cut, thereby forming edges defining neck openings in the fabric web. The fabric web is cut, thereby defining discrete garment-sized pieces wherein each of the discrete garment-sized pieces of the fabric web includes at least one neck opening, a front panel having a pair of opposing garment side edges, a garment end portion, and a bottom edge.

The process may further comprise the step of hemming at least a portion of the garment bottom edge; the step of providing a collar; the step of fastening at least a portion of the collar to at least a portion of the edge of the neck opening; the step of fastening at least a portion of the pair of opposing garment side edges of the front panel to form a garment side seam; the step of slitting the front panel at least a portion of the distance between the edge of the neck opening and the garment bottom edge thereby defining a pair of edges of a slit; the step of fastening at least a portion of the edges of the slit to form a front seam; the step of hemming at least a portion of the edge of the neck opening. At least a portion of the collar may be a ribbed knit collar. At least a portion of the collar may be a tie. At least a portion of the garment side seam may be refastenable or may be non-refastenable. At least a portion of the front seam may be refastenable or may be non-refastenable.

Another embodiment of the present invention is a continuous process for the manufacture of a garment comprising the following steps. A web of fabric including opposing web side edges wherein one of the opposing web side edges is proximate a garment bottom edge of the garment is provided. The web of fabric is intermittently cut, forming edges defining neck openings in the web of fabric. The web of fabric is cut, thereby defining discrete garment-sized pieces. Each of the discrete garment-sized pieces of the web of fabric includes at least one neck opening, a front panel having a pair of opposing garment side edges, one garment end portion, and one bottom edge. The discrete garment-sized pieces of the web of fabric are cut, thereby forming a fabric web. The fabric web includes one of the opposing web side edges opposed to an octagonal shape pattern defining pairs of shoulder side edges having a side edge located between the shoulder side edges of each pair of the shoulder side edges and edges located between the pairs of shoulder side edges.

The process may further comprise the step of hemming at least a portion of the garment bottom edge; the step of providing a collar; the step of fastening at least a portion of the collar to at least a portion of the edge of the neck opening; the step of fastening at least a portion of the pair of opposing garment side edges of the front panel to form a garment side seam; the step of slitting the front panel at least a portion of the distance between the edge of the neck opening and the garment bottom edge thereby defining a pair of edges of a slit; the step of fastening at least a portion of the edges of the slit to form a front seam; the step of hemming at least a portion of the edge of the neck opening. At least a portion of the collar may be a ribbed knit collar. At least a portion of the collar may be a tie. At least a portion of the garment side seam may be refastenable or may be non-refastenable. At least a portion of the front seam may be refastenable or may be non-refastenable.

Another embodiment of the present invention is a continuous process for the manufacture of a garment comprising the following steps. A fabric web is provided. The fabric web includes a web side edge proximate a garment bottom edge of the garment opposed to a complementary octagonal shape pattern defining pairs of shoulder side edges having a side edge located between the shoulder side edges of each pair of the shoulder side edges and edges located between the pairs of shoulder side edges. The side edge of the fabric web is cut, thereby forming edges defining neck openings in the fabric web. The fabric web is cut, thereby defining discrete garment-sized pieces wherein each of the discrete garment-sized pieces of the fabric web includes at least one neck opening, a front panel having a pair of opposing garment side edges, one garment end portion, and one bottom edge.

The process may further comprise the step of hemming at least a portion of the garment bottom edge; the step of providing a collar; the step of fastening at least a portion of the collar to at least a portion of the edge of the neck opening; the step of fastening at least a portion of the pair of opposing garment side edges of the front panel to form a garment side seam; the step of slitting the front panel at least a portion of the distance between the edge of the neck opening and the garment bottom edge thereby defining a pair of edges of a slit; the step of fastening at least a portion of the edges of the slit to form a front seam; the step of hemming at least a portion of the edge of the neck opening. At least a portion of the collar may be a ribbed knit collar. At least a portion of the collar may be a tie. At least a portion of the garment side seam may be refastenable or may be non-refastenable. At least a portion of the front seam may be refastenable or may be non-refastenable.

While the invention has been described in detail with respect to the specific aspects thereof, it will be appreciated that those skilled in the art, upon attaining an understanding of the foregoing, may readily conceive of alterations to, variations of, and equivalents to these aspects. Accordingly, the scope of the present invention should be assessed as that of the appended claims and any equivalents thereto.

We claim:

1. A continuous process for the manufacture of a garment comprising:
   a. providing a web of fabric including opposing web side edges wherein the opposing web side edges are proximate a pair of opposing garment bottom edges of the garment;
   b. cutting the web of fabric, forming three separate fabric webs wherein one of the fabric webs has the overall appearance of a connected octagonal shape pattern defining pairs of shoulder side edges having a side edge located between the shoulder side edges of each pair of the shoulder side edges and edges located between the pairs of shoulder side edges and each of the other two fabric webs each include one of the opposing web side edges opposed to a complementary octagonal shape pattern defining pairs of shoulder side edges having a side edge located between the shoulder side edges of each pair of the shoulder side edges and edges located between the pairs of shoulder side edges;
   c. cutting the fabric web having the overall appearance of a connected octagonal shape pattern into pieces through the edges, forming sleeve flaps;
   d. cutting the side edges of the three fabric webs, forming edges defining neck openings in the fabric webs;
   e. folding the fabric webs whereby one of the garment bottom edges of the pair of opposing garment bottom edges of the web of fabric is brought into contact with the other garment bottom edge;
   f. cutting the web of fabric, defining discrete garment-sized pieces wherein each of the discrete garment-sized pieces of the web of fabric includes a neck opening, a front panel having a pair of opposing garment side edges, a back panel having a pair of opposing garment side edges, a pair of sleeve flaps, two garment end portions, and a pair of opposing bottom edges; and,
   g. fastening at least a portion of the opposing garment side edges of the front panel to at least a portion of the pair of opposing garment side edges of the back panel to form a pair of garment side seams.

2. The continuous process according to claim 1, further comprising the step of folding the web of fabric, defining an arrangement of having the web of fabric wherein the opposing web side edges are adjacent each other.

3. The continuous process according to claim 1, further comprising the step of hemming at least a portion of at least one of the opposing garment bottom edges.

4. The continuous process according to claim 1, wherein each sleeve flap includes at least a sleeve opening end edge and a pair of opposing sleeve side edges.

5. The continuous process according to claim 4, further comprising the step of hemming at least a portion of at least one of the sleeve opening end edges of the sleeve flaps.

6. The continuous process according to claim 1, further comprising the step of providing a collar.

7. The continuous process according to claim 6, further comprising the step of fastening at least a portion of the collar to at least a portion of the edge of the neck opening.

8. The continuous process according to claim 6, wherein at least a portion of the collar is a ribbed knit collar.

9. The continuous process according to claim 1, wherein at least a portion of at least one of the garment side seams is refastenable.

10. The continuous process according to claim 1, wherein at least a portion of at least one of the garment side seams is non-refastenable.

11. The continuous process according to claim 1, further comprising the step of slitting the front panel at least a portion of the distance between the edge of the neck opening and the garment bottom edge thereby defining a pair of edges of a slit.

12. The continuous process according to claim 11, further comprising the step of fastening at least a portion of the edges of the slit to form a front seam.

13. The continuous process according to claim 12, wherein at least a portion of the front seam is refastenable.

14. The continuous process according to claim 12, wherein at least a portion of the front seam is non-refastenable.

15. The continuous process according to claim 1, further comprising the step of slitting the back panel at least a portion of the distance between the edge of the neck opening and the garment bottom edge thereby defining a pair of edges of a slit.

16. The continuous process according to claim 15, further comprising the step of fastening at least a portion of the edges of the slit to form a back seam.

17. The continuous process according to claim 16, wherein at least a portion of the back seam is refastenable.

18. The continuous process according to claim 16, wherein at least a portion of the back seam is non-refastenable.

19. The continuous process according to claim 1, further comprising the step of hemming at least a portion of the edge of the neck opening.

20. A continuous process for the manufacture of a garment comprising:
   a. providing a web of fabric including opposing web side edges wherein the opposing web side edges are proximate a pair of opposing garment bottom edges of the garment;

b. intermittently cutting the web of fabric, forming edges defining neck openings in the web of fabric;

c. cutting the web of fabric, defining discrete garment-sized pieces wherein each of the discrete garment-sized pieces of the web of fabric includes a neck opening, a front panel having a pair of opposing garment side edges, a back panel having a pair of opposing garment side edges, a pair of sleeve flaps, two garment end portions, and a pair of opposing bottom edges;

d. cuffing the discrete garment-sized pieces of the web of fabric, forming three separate fabric webs wherein one of the fabric webs has the overall appearance of an octagonal shape pattern defining pairs of shoulder side edges having a side edge located between the shoulder side edges of each pair of the shoulder side edges and edges located between the pairs of shoulder side edges and each of the other two fabric webs each include one of the opposing web side edges opposed to a complementary octagonal shape pattern defining pairs of shoulder side edges having a side edge located between the shoulder side edges of each pair of the shoulder side edges and edges located between the pairs of shoulder side edges;

e. folding the fabric webs whereby one of the garment bottom edges of the pair of opposing garment bottom edges of web of fabric is brought into contact with the other garment bottom edge; and, f. fastening at least a portion of the opposing garment side edges of the front panel to at least a portion of the pair of opposing garment side edges of the back panel to form a pair of garment side seams.

21. A continuous process for the manufacture of a garment comprising:

a. providing three separate fabric webs wherein one of the fabric webs has the overall appearance of a connected octagonal shape pattern defining pairs of shoulder side edges having a side edge located between the shoulder side edges of each pair of the shoulder side edges and edges located between the pairs of shoulder side edges and each of the other two fabric webs each include one of the opposing web side edges opposed to a complementary octagonal shape pattern defining pairs of shoulder side edges having a side edge located between the shoulder side edges of each pair of the shoulder side edges and edges located between the pairs of shoulder side edges;

b. cutting the fabric web having the overall appearance of a connected octagonal shape pattern into pieces through the edges, forming sleeve flaps;

c. cutting the side edges of the three fabric webs, forming edges defining neck openings in the fabric webs;

d. folding the fabric webs whereby one of the garment bottom edges of the pair of opposing garment bottom edges of the fabric webs is brought into contact with the other garment bottom edge;

e. cutting the fabric webs, defining discrete garment-sized pieces wherein each of the discrete garment-sized pieces of the fabric webs includes a neck opening, a front panel having a pair of opposing garment side edges, a back panel having a pair of opposing garment side edges, a pair of sleeve flaps, two garment end portions, and a pair of opposing bottom edges; and, f. fastening at least a portion of the opposing garment side edges of the front panel to at least a portion of the pair of opposing garment side edges of the back panel to form a pair of garment side seams.

22. A continuous process for the manufacture of a garment comprising:

a. providing a web of fabric including opposing web side edges wherein the opposing web side edges are proximate a pair of opposing garment bottom edges of the garment;

b. cutting the web of fabric, forming two separate fabric webs wherein each of the fabric webs includes one of the opposing web side edges opposed to an octagonal shape pattern defining pairs of shoulder side edges having a side edge located between the shoulder side edges of each pair of the shoulder side edges and edges located between the pairs of shoulder side edges;

c. cutting the side edges of the two fabric webs, forming edges defining neck openings in the fabric webs;

d. folding the two fabric webs whereby one of the garment bottom edges of the pair of opposing garment bottom edges of the web of fabric is brought into contact with the other garment bottom edge;

e. cutting the two fabric webs, defining discrete garment-sized pieces wherein each of the discrete garment-sized pieces of the fabric webs include a neck opening, a front panel having a pair of opposing garment side edges, a back panel having a pair of opposing garment side edges, two garment end portions, and a pair of opposing bottom edges; and, f. fastening at least a portion of the opposing garment side edges of the front panel to at least a portion of the pair of opposing garment side edges of the back panel to form a pair of garment side seams.

23. The continuous process according to claim 22, further comprising the step of folding the fabric webs, defining an arrangement of having the fabric webs wherein the opposing web side edges are adjacent each other.

24. The continuous process according to claim 22, further comprising the step of hemming at least a portion of at least one of the opposing garment bottom edges.

25. The continuous process according to claim 22, further comprising the step of providing a collar.

26. The continuous process according to claim 25, further comprising the step of fastening at least a portion of the collar to at least a portion of the edge of the neck opening.

27. The continuous process according to claim 25, wherein at least a portion of the collar is a ribbed knit collar.

28. The continuous process according to claim 22, wherein at least a portion of at least one of the garment side seams is refastenable.

29. The continuous process according to claim 22, wherein at least a portion of at least one of the garment side seams is non-refastenable.

30. The continuous process according to claim 22, further comprising the step of slitting the front panel at least a portion of the distance between the edge of the neck opening and the garment bottom edge thereby defining a pair of edges of a slit.

31. The continuous process according to claim 30, further comprising the step of fastening at least a portion of the edges of the slit to form a front seam.

32. The continuous process according to claim 31, wherein at least a portion of the front seam is refastenable.

33. The continuous process according to claim 31, wherein at least a portion of the front seam is non-refastenable.

34. The continuous process according to claim 22, further comprising the step of slitting the back panel at least a portion of the distance between the edge of the neck opening and the garment bottom edge thereby defining a pair of edges of a slit.

35. The continuous process according to claim 34, further comprising the step of fastening at least a portion of the edges of the slit to form a back seam.

36. The continuous process according to claim 35, wherein at least a portion of the back seam is refastenable.

37. The continuous process according to claim 35, wherein at least a portion of the back seam is non-refastenable.

38. The continuous process according to claim 22, further comprising the step of hemming at least a portion of the edge of the neck opening.

39. A continuous process for the manufacture of a garment comprising:
   a. providing a web of fabric including opposing web side edges wherein the opposing web side edges are proximate a pair of opposing garment bottom edges of the garment;
   b. intermittently cutting the web of fabric, forming edges defining neck openings in the web of fabric;
   c. cutting the web of fabric, defining discrete garment-sized pieces wherein each of the discrete garment-sized pieces of the web of fabric includes a neck opening, a front panel having a pair of opposing garment side edges, a back panel having a pair of opposing garment side edges, two garment end portions, and a pair of opposing bottom edges;
   d. cutting the discrete garment-sized pieces of the web of fabric, forming two separate fabric webs wherein each of the two fabric webs includes one of the opposing web side edges opposed to an octagonal shape pattern defining pairs of shoulder side edges having a side edge located between the shoulder side edges of each pair of the shoulder side edges and edges located between the pairs of shoulder side edges;
   e. folding the fabric webs whereby one of the garment bottom edges of the pair of opposing garment bottom edges of the web of fabric is brought into contact with the other garment bottom edge; and,
   f. fastening at least a portion of the opposing garment side edges of the front panel to at least a portion of the pair of opposing garment side edges of the back panel to form a pair of garment side seams.

40. A continuous process for the manufacture of a garment comprising:
   a. providing two separate fabric webs wherein each of the two fabric webs includes one of the opposing web side edges opposed to a complementary octagonal shape pattern defining pairs of shoulder side edges having a side edge located between the shoulder side edges of each pair of the shoulder side edges and edges located between the pairs of shoulder side edges;
   b. cutting the side edges of the two fabric webs, forming edges defining neck openings in the fabric webs;
   c. folding the fabric webs whereby one of the garment bottom edges of the pair of opposing garment bottom edges of the fabric webs is brought into contact with the other garment bottom edge;
   d. cutting the fabric webs, defining discrete garment-sized pieces wherein each of the discrete garment-sized pieces of the fabric webs includes a neck opening, a front panel having a pair of opposing garment side edges, a back panel having a pair of opposing garment side edges, two garment end portions, and a pair of opposing bottom edges; and,
   e. fastening at least a portion of the opposing garment side edges of the front panel to at least a portion of the pair of opposing garment side edges of the back panel to form a pair of garment side seams.

41. A continuous process for the manufacture of a garment comprising:
   a. providing a web of fabric including opposing web side edges wherein one of the opposing web side edges is proximate the garment bottom edge of the garment;
   b. cutting the web of fabric, forming a fabric web wherein the fabric web includes one of the opposing web side edges opposed to an octagonal shape pattern defining pairs of shoulder side edges having a side edge located between the shoulder side edges of each pair of the shoulder side edges and edges located between the pairs of shoulder side edges;
   c. cutting the side edges of the fabric web, forming edges defining neck openings in the fabric web; and,
   d. cutting the fabric web, defining discrete garment-sized pieces wherein each of the discrete garment-sized pieces of the fabric web includes a neck opening, a front panel having a pair of opposing garment side edges, a garment end portion, and a bottom edge.

42. The continuous process according to claim 41, further comprising the step of hemming at least a portion of the garment bottom edge.

43. The continuous process according to claim 41, further comprising the step of providing a collar.

44. The continuous process according to claim 43, further comprising the step of fastening at least a portion of the collar to at least a portion of the edge of the neck opening.

45. The continuous process according to claim 43, wherein at least a portion of the collar is a ribbed knit collar.

46. The continuous process according to claim 43, wherein at least a portion of the collar is a tie.

47. The continuous process according to claim 41, further comprising the step of fastening at least a portion of the pair of opposing garment side edges of the front panel to form a garment side seam.

48. The continuous process according to claim 47, wherein at least a portion of the garment side seam is refastenable.

49. The continuous process according to claim 47, wherein at least a portion of the garment side seam is non-refastenable.

50. The continuous process according to claim 41, further comprising the step of slitting the front panel at least a portion of the distance between the edge of the neck opening and the garment bottom edge thereby defining a pair of edges of a slit.

51. The continuous process according to claim 50, further comprising the step of fastening at least a portion of the edges of the slit to form a front seam.

52. The continuous process according to claim 51, wherein at least a portion of the front seam is refastenable.

53. The continuous process according to claim 51, wherein at least a portion of the front seam is non-refastenable.

54. The continuous process according to claim 41, further comprising the step of hemming at least a portion of the edge of the neck opening.

55. A continuous process for the manufacture of a garment comprising:
   a. providing a web of fabric including opposing web side edges wherein one of the opposing web side edges is proximate a garment bottom edge of the garment;
   b. intermittently cutting the web of fabric, forming edges defining neck openings in the web of fabric;
   c. cutting the web of fabric, defining discrete garment-sized pieces wherein each of the discrete garment-sized pieces of the web of fabric includes a neck opening, a front panel having a pair of opposing garment side edges, one garment end portion, and one bottom edge; and,
   d. cutting the discrete garment-sized pieces of the web of fabric, forming a fabric web wherein the fabric web includes one of the opposing web side edges opposed to an octagonal shape pattern defining pairs of shoulder side edges having a side edge located between the shoulder side edges of each pair of the shoulder side edges and edges located between the pairs of shoulder side edges.

56. A continuous process for the manufacture of a garment comprising:
   a. providing a fabric web wherein the fabric web includes a web side edge proximate a garment bottom edge of the garment opposed to a complementary octagonal shape pattern defining pairs of shoulder side edges having a side edge located between the shoulder side edges of each pair of the shoulder side edges and edges located between the pairs of shoulder side edges;
   b. cutting the side edge of the fabric web, forming edges defining neck openings in the fabric web; and,
   c. cutting the fabric web, defining discrete garment-sized pieces wherein each of the discrete garment-sized pieces of the fabric web includes a neck opening, a front panel having a pair of opposing garment side edges, one garment end portion, and one bottom edge.

* * * * *